US012406132B2

(12) United States Patent
Johnson et al.

(10) Patent No.: US 12,406,132 B2
(45) Date of Patent: Sep. 2, 2025

(54) SYSTEM AND METHOD FOR GENERATING AUGMENTED CHECKLIST

(71) Applicant: Mitchell Repair Information Company, LLC, Poway, CA (US)

(72) Inventors: Lester B. Johnson, Escondido, CA (US); John H. Dwulet, Lakeside, CA (US)

(73) Assignee: Mitchell Repair Information Company, LLC, San Diego, CA (US)

( * ) Notice: Subject to any disclaimer, the term of this patent is extended or adjusted under 35 U.S.C. 154(b) by 0 days.

(21) Appl. No.: 16/175,523

(22) Filed: Oct. 30, 2018

(65) Prior Publication Data

US 2019/0130668 A1    May 2, 2019

Related U.S. Application Data

(63) Continuation-in-part of application No. 15/798,371, filed on Oct. 30, 2017, now Pat. No. 10,650,615.

(51) Int. Cl.
*G06F 40/143* (2020.01)
*G06Q 10/20* (2023.01)
(Continued)

(52) U.S. Cl.
CPC ........... *G06F 40/143* (2020.01); *G06Q 10/20* (2013.01); *G07C 5/006* (2013.01); *G07C 5/008* (2013.01); *G07C 5/0808* (2013.01); *G07C 5/085* (2013.01)

(58) Field of Classification Search
CPC ........ G07C 5/085; G07C 5/006; G07C 5/008; G07C 5/0808; G06F 40/14; G06Q 10/20
See application file for complete search history.

(56) References Cited

U.S. PATENT DOCUMENTS 5,477,827 A * 12/1995 Weisman, II ....... F02D 41/0085
                                                        123/436
6,301,531 B1 * 10/2001 Pierro .................. G07C 5/0841
                                                         701/19
(Continued)

OTHER PUBLICATIONS

Bridgestone Americas Tire Operations, LLC; Maintenance Schedule—Firestone Complete Auto Care, Your 2013 Ford Mustang Shelby GT500 Scheduled Maintenance; downloaded from the World Wide Web at https://www.firestonecompleteautocare.com/maintain/schedule/maintenance-schedule/ on Jul. 13, 2016, 3 pages.
(Continued)

*Primary Examiner* — Naeem Taslim Alam
(74) *Attorney, Agent, or Firm* — McDonnell Boehnen Hulbert & Berghoff LLP

(57) ABSTRACT

A method performed by a computing system includes determining a vehicle identifier indicative of a group of like vehicles. The group of like vehicles includes a first vehicle. The method also includes determining a first odometer reading for the first vehicle and determining a first baseline checklist including multiple original checklist items. Determining the first baseline checklist includes determining the first baseline checklist is associated with a range of odometer readings including the first odometer reading for the first vehicle. Furthermore, the method includes determining one or more supplemental checklist items, and generating an augmented checklist based on the first baseline checklist and the one or more supplemental checklist items. Furthermore still, the method includes outputting the augmented checklist.

24 Claims, 29 Drawing Sheets

(51) Int. Cl.
  G07C 5/00 (2006.01)
  G07C 5/08 (2006.01)

(56) References Cited

U.S. PATENT DOCUMENTS

| | | | |
|---|---|---|---|
| 6,927,682 B1* | 8/2005 | Touhey | B60K 35/81 |
| | | | 701/32.5 |
| 7,359,775 B2* | 4/2008 | Strege | G01B 21/26 |
| | | | 701/34.3 |
| 7,565,306 B2* | 7/2009 | Apostolides | G06Q 10/06395 |
| | | | 705/7.26 |
| 7,930,268 B2* | 4/2011 | Starkey | G06Q 10/0633 |
| | | | 707/791 |
| 7,945,438 B2 | 5/2011 | Balmelli et al. | |
| 8,150,721 B2 | 4/2012 | Apostolides | |
| 8,185,446 B1* | 5/2012 | Kuznetsova | G06Q 30/016 |
| | | | 705/26.1 |
| 8,924,071 B2* | 12/2014 | Stanek | G07C 5/008 |
| | | | 701/31.4 |
| 8,977,423 B2* | 3/2015 | Merg | G07C 5/006 |
| | | | 701/32.7 |
| 9,141,935 B2 | 9/2015 | Apostolides | |
| 9,355,549 B2 | 5/2016 | McClintic et al. | |
| 9,444,860 B1* | 9/2016 | Jammula | G06Q 10/06316 |
| 9,530,121 B2* | 12/2016 | Brauer | G06Q 10/20 |
| 10,445,758 B1* | 10/2019 | Bryer | G06Q 40/08 |
| 10,713,717 B1* | 7/2020 | Hanson | G06Q 40/04 |
| 2002/0007289 A1 | 1/2002 | Malin et al. | |
| 2002/0080022 A1* | 6/2002 | Edwards | G07C 5/006 |
| | | | 340/457 |
| 2002/0111844 A1 | 8/2002 | Vanstory et al. | |
| 2002/0133271 A1* | 9/2002 | McDermott | G07C 5/008 |
| | | | 701/1 |
| 2002/0195503 A1* | 12/2002 | Allen, Jr. | G06K 19/077 |
| | | | 239/311 |
| 2003/0095038 A1* | 5/2003 | Dix | G07C 5/008 |
| | | | 340/425.5 |
| 2003/0163233 A1* | 8/2003 | Song | G06Q 10/06 |
| | | | 701/31.4 |
| 2004/0249531 A1* | 12/2004 | Kelly | G01M 17/007 |
| | | | 340/457.4 |
| 2006/0020477 A1 | 1/2006 | Retzbach et al. | |
| 2006/0095174 A1* | 5/2006 | Sonnenrein | G07C 5/008 |
| | | | 701/31.5 |
| 2006/0206807 A1* | 9/2006 | Rosner | G06F 40/186 |
| | | | 707/999.1 |
| 2007/0100529 A1* | 5/2007 | Blythe | G01C 22/02 |
| | | | 701/33.4 |
| 2007/0174284 A1* | 7/2007 | Hashimoto | G06F 21/6209 |
| | | | 707/999.009 |
| 2008/0208609 A1* | 8/2008 | Preece | G06Q 10/06 |
| | | | 705/1.1 |
| 2008/0243488 A1 | 10/2008 | Balmelli et al. | |
| 2008/0270477 A1* | 10/2008 | Starkey | G06Q 10/103 |
| 2008/0288346 A1* | 11/2008 | Shames | G06Q 30/06 |
| | | | 705/14.23 |
| 2011/0258654 A1* | 10/2011 | Lee | H04N 21/4516 |
| | | | 725/1 |
| 2012/0296513 A1* | 11/2012 | Ramseyer | G06Q 10/02 |
| | | | 701/29.6 |
| 2013/0138467 A1* | 5/2013 | Small | G06Q 10/06 |
| | | | 705/7.26 |
| 2014/0085086 A1 | 3/2014 | Knapp et al. | |
| 2014/0188329 A1* | 7/2014 | Chen | G07C 5/008 |
| | | | 701/29.6 |
| 2014/0297097 A1* | 10/2014 | Hurwitz | G07C 5/0858 |
| | | | 701/31.4 |
| 2015/0039522 A1* | 2/2015 | Dillard | G06Q 10/20 |
| | | | 705/305 |
| 2015/0066781 A1* | 3/2015 | Johnson | G06Q 10/00 |
| | | | 705/305 |
| 2015/0081161 A1* | 3/2015 | Chapman | G06Q 10/00 |
| | | | 701/31.5 |
| 2016/0042576 A1* | 2/2016 | Fischer | G07C 5/008 |
| | | | 701/29.4 |
| 2016/0071334 A1* | 3/2016 | Johnson | G07C 5/0808 |
| | | | 701/29.1 |
| 2016/0104127 A1 | 4/2016 | Apostolides | |
| 2016/0124587 A1* | 5/2016 | Covington | G01R 31/006 |
| | | | 345/440 |
| 2016/0133066 A1 | 5/2016 | Lavie | |
| 2016/0216849 A1* | 7/2016 | Kawalkar | G06F 3/0482 |
| 2016/0314103 A1* | 10/2016 | Fox | G06F 40/197 |
| 2016/0335816 A1* | 11/2016 | Thoppae | H04L 67/12 |
| 2017/0124525 A1 | 5/2017 | Johnson et al. | |
| 2017/0263120 A1* | 9/2017 | Durie, Jr. | G08G 1/205 |
| 2017/0277204 A1* | 9/2017 | Hutchins | F15B 13/0857 |
| 2017/0345227 A1* | 11/2017 | Allen, Jr. | G06F 16/951 |
| 2018/0018642 A1* | 1/2018 | Schmitz | G06Q 30/0255 |
| 2019/0130658 A1 | 5/2019 | Johnson et al. | |
| 2019/0251759 A1* | 8/2019 | Lora | H04W 4/44 |

OTHER PUBLICATIONS

Total Auto Business Solutions, Inc.; AutoFluent Manual; Sep. 14, 2016, cover sheet, 4 pages of table of content, and pp. 4 to 228 (document uploaded via 12 PDF files).

Autocare Association; Welcome to Auto Care Insider 101, Auto Care Insider magazine, vol. 101, www.autocare.org, Aug. 2016 (25 pages).

Best Connected Car Devices of 2017; Connected Car Devices, OBD2 Monitoring and Driving Assistance Devices and Apps, catalog downloaded Nov. 6, 2017 from the world wide web at https:\\www.postscapes.com/connected-car-devices/ (11 pages).

Chabot, B., The Vehicle Communication Interface Revolution, MACS Service Reports, article, The Mobile Air Conditioning Society Worldwide, Nov. 2016 (9 pages).

Geotab GO7; Expandable Plug-&-Play Telematics Device, Geotab Inc., Management by Measurement, data sheets and instructions downloaded Nov. 6, 2017 from the world wide web at goo.gl/5zcEWm (6 pages).

How Connected Vehicles Work; U.S. Department of Transportation brochure, Oct. 2015 (2 pages).

IMC Your Quality Source; Steps to install IMC Catalog in Mitchell1, Interamerican Motor Corporation, instruction sheets downloaded Nov. 6, 2017 from the world wide web at http://www.imcparts.net/shopMgmt/index.shtml, ( 7 pages).

Automatic Pro—Automatic: Connect Your Car to Your Digital Life; archived at https://web.archive.org/web/20170623022612/https://www.automatic.com/pro/, Jun. 23, 2017 (10 pages).

Mitchell 1 and ShopKey, Version 7 Shop Management Software, Installation and Registration Guide, Mitchell Repair Information Company, LLC, Jun. 2017 (12 pages).

Mitchell 1, Manager SE, ShopKey Management Solutions, Setup: Configuring Your Live SE Software, Guide to system setting for the Live version of SE 7.x program, Mitchell Repair Information Company, LLC, Sep. 2017 (44 pages).

Mitchell 1, Manager SE, Auto Shop Management, online brochure, downloaded Nov. 6, 2017 from the world wide web at http://www.mitchellone.ca/manager-se/truck-edition/, Mitchell Repair Information Company, LLC, (3 pages).

Mitchell 1, Manager SE, In your shop, at your side, brochure, Mitchell Repair Information Company, LLC, Feb. 2016 (6 pages).

Mitchell 1/ShopKey Schedule Configuration and User's Guide, Version 7.1x Update, Mitchell Repair Information Company, LLC, Feb. 2017 (22 pages).

Mitchell 1 Top 20 Tips for Manager SE, in your shop, at your side, instruction sheets, Mitchell Repair Information Company, LLC, Apr. 2016 (24 pages).

PubNub, What is HTTP Long Polling?, information sheets downloaded from the world wide web at https://www.pubnub.com/blog/2014-12-01-http-long-polling/, Dec. 1, 2014, (6 pages).

Voyomotive, Voyo and Passport Advanced Data Parameters, specification sheets, Voyomotive.com, Sep. 2017 (3 pages).

(56) References Cited

OTHER PUBLICATIONS

Zubie Fact Sheet, Zubie, Inc., downloaded from the world wide web at zubie.com/wp-content/uploads/2014/04/Zubie-Fact-Sheet.pdf, Apr. 2014 (3 pages).
U.S. Appl. No. 15/798,371, filed Oct. 30, 2017; inventors: Lester B. Johnson and John H. Dwulet.
Keywork Protocol 2000 Task Force; "Keyword Protocol 2000 Data Link Layer Recommended Practice", version 1.5; Oct. 1, 1997; pp. 1-71.
Mechanic, Dan; Total Car Diagnostics; "The KWP2000 Protocol in Automotive Diagnostic Applications"; May 8, 2019; 6 pages.
U.S. Government Publishing Office; 42 U.S.C., United States Code, 2013 Edition, Title 42—The Public Health and Welfare, Chapter 85—Air Pollution Prevention and Control, Subchapter II—Emission Standards for Moving Sources, Part A—Motor Vehicle Emissions and Fuel Standards, Sec. 7251—Emission standards for new motor vehicles or new motor vehicle engines (model year definition on p. 5 of 25); 2013.
U.S. Government Publishing Office; Federal Register / vol. 76, No. 179 / Thursday, Sep. 15, 2011 / Rules and Regulations; pp. 57106-57513 (discussion of "model year" found at least on p. 57254).
Auto Cheat Sheet; "End-of-Model-Year Car Buying Tips You Need to Know", Retrieved from Internet: https://www.autocheatsheet.com/blog/end-model-year-new-car-buying-tips/ on Apr. 11, 2025; 24 pages,.

* cited by examiner

Vehicle: 2005 Lexus ES 330
VIN: JTHBA30G955087040 ← 202
Engine: 3.3L, V6 (202 CI) VIN(A)

Odometer: 7,400 miles - Date: 05-MAY-2006 ⎫ 204A
Replace engine oil, replace engine oil filter ⎭

Odometer: 15,200 miles - Date: 07-NOV-2006 ⎫ 204B
Replace engine oil, replace engine oil filter ⎭

Odometer: 23,121 miles - Date: 13-MAR-2007 ⎫ 204C
Replace engine oil, replace engine oil filter, replace air filter element ⎭

Odometer: 30,499 miles - Date: 15-DEC-2007 ⎫ 204D
Replace engine oil, replace engine oil filter ⎭

Odometer: 36,450 miles - Date: 06-APR-2009 ⎫ 204E
Replace engine oil, replace engine oil filter ⎭

Odometer: 43,576 miles - Date: 29-JAN-2010 ⎫ 204F
Replace engine oil, replace engine oil filter, align wheels ⎭

Odometer: 51,668 miles - Date: 22-NOV-2010 ⎫ 204G
Replace engine oil, replace engine oil filter, replace tires ⎭

Odometer: 59,029 miles - Date: 01-JUN-2013 ⎫ 204H
Replace engine oil, replace engine oil filter ⎭

Odometer: 66,444 miles - Date: 18-JAN-2015 ⎫ 204I
Replace engine oil, replace engine oil filter ⎭

Odometer: 73,113 miles - Date: 22-SEP-2015 ⎫ 204J
Replace engine oil, replace engine oil filter ⎭

Odometer: 80,217 miles - Date: 07-JUL-2016 ⎫ 204K
Replace engine oil, replace engine oil filter, ⎭

Odometer: 87,521 miles - Date: 05-FEB-2017 ⎫ 204L
Replace engine oil, replace engine oil filter ⎭

Odometer: 92,302 miles - Date: 07-AUG-2018 ⎫ 204M
Replace engine oil, replace engine oil filter, replace cabin air filter ⎭

| VEHICLE CHECKLISTS | VEHICLE GROUP | ODOMETER RANGE |
| --- | --- | --- |
| C1 | G1 | R1 |
| C2 | G1 | R2 |
| C3 | G1 | R3 |
| C4 | G1 | R4 |
| C5 | G1 | R5 |
| C6 | G1 | R6 |
| C7 | G1 | R7 |
| C8 | G1 | R8 |
| C9 | G1 | R9 |
| C10 | G1 | R10 |
| C11 | G2 | R1 |
| C12 | G2 | R2 |
| C13 | G2 | R3 |
| C14 | G2 | R4 |
| C15 | G2 | R5 |
| C16 | G2 | R6 |
| C17 | G2 | R7 |
| C18 | G2 | R8 |
| C19 | G2 | R9 |
| C20 | G2 | R10 |
| C21 | G3 | R11 |
| C22 | G3 | R12 |
| C23 | G3 | R13 |
| C24 | G3 | R14 |
| C25 | G3 | R15 |
| C26 | G3 | R16 |
| C27 | G3 | R17 |
| C28 | G3 | R18 |
| C29 | G3 | R19 |
| C30 | G3 | R20 |

FIG. 21

2005 LEXUS ES 330
HIGHEST FREQUENCY REPAIRS  ← 431

427 {
REPLACE ENGINE OIL --- EVERY 6,000 MILES
REPLACE OIL FILTER --- EVERY 6,000 MILES
REPLACE AIR FILTER ELEMENT --- EVERY 20,000 MILES
REPLACE PCV VALVE --- 60,000 TO 65,000 MILES ← 428
REPLACE IGNITION COIL --- 49,000 TO 57,000 MILES ← 428
}

REPLACE CABIN AIR FILTER --- 60,000 TO 70,000 MILES ← 428
REPLACE BRAKE PADS --- 60,000 MILES, 120,000 MILES
REPLACE SPARK PLUGS --- 120,000 MILES ← 428
LUBRICATE DOOR HINGES --- 90,000 TO 98,000 MILES ← 428, 429
REPLACE ENGINE COOLANT --- 75,000 MILES, 150,000 MILES
REPLACE TRANSMISSION FLUID --- 85,000 TO 100,000 MILES ← 429
REPLACE SHOCK ABSORBERS --- 91,000 TO 104,000 MILES ← 429
BALANCE WHEELS --- 60,000 MILES, 120,000 MILES
REPLACE TPMS BATTERY --- 90,000 TO 107,000 MILES ← 429
REPLACE BRAKE MASTER CYLINDER --- 140,000 MILES
REPLACE LICENSE PLATE LIGHT --- 89,000 TO 101,000 MILES ← 429
ALIGN FRONT WHEELS --- 60,000 MILES, 120,000 MILES
REPLACE ACCESSORY DRIVE BELT --- 78,000 MILES
REPLACE BATTERY --- 60,000 MILES, 120,000 MILES 432
433
426

FIG. 22

```
752 → <Baseline checklist>
    754 → <YMM>2005 Lexus ES 330</YMM>
    756 → <Checklist_category>Inspect</Checklist_category>
        758 → <OCI>Air cleaner element</OCI>
            760 → <Result>P/F</Result>
        758 → <OCI>Ball Joint & Dust Covers</OCI>
            760 → <Result>P/F</Result>
        758 → <OCI>Brake Discs/Rotors</OCI>
            760 → <Result>P/F</Result>
        758 → <OCI>Brake Pads</OCI>
            760 → <Result>P/F</Result>
        758 → <OCI>Chassis Body Nuts & Bolts</OCI>
            760 → <Result>P/F</Result>
        758 → <OCI>Drive Shaft/Propeller Shaft Dust Boots</OCI>
            760 → <Result>P/F</Result>
        758 → <OCI>Steering Linkage & Boots</OCI>
            760 → <Result>P/F</Result>
    756 → <Checklist_category>Replace</Checklist_category>
        758 → <OCI>Engine Oil</OCI>
            762 → <Result>Complete</Result>
        758 → <OCI>Engine Oil Filter</OCI>
            762 → <Result>Complete</Result>
    756 → <Checklist_category>Reset</Checklist_category>
        758 → <OCI>Engine Oil Replacement Reminder Light</OCI>
            762 → <Result>Complete</Result>
    756 → <Checklist_category>Road Test</Checklist_category>
        758 → <OCI>Vehicle</OCI>
            762 → <Result>Complete</Result>
    756 → <Checklist_category>Rotate</Checklist_category>
        758 → <OCI>Tires</OCI>
            762 → <Result>Complete</Result>
```

```
772 → <Augmented checklist>
    754 → <YMM>2005 Lexus ES 330</YMM>
    756 → <Checklist_category>Inspect</Checklist_category>
        758 → <OCI>Air cleaner element</OCI>
            760 → <Result>P/F</Result>
            774 → <F>Vehicles Driven in Dusty Conditions Only</F>
        758 → <OCI>Ball Joint & Dust Covers</OCI>
            760 → <Result>P/F</Result>
        758 → <OCI>Brake Discs/Rotors</OCI>
            760 → <Result>P/F</Result>
        758 → <OCI>Brake Pads</OCI>
            760 → <Result>P/F</Result>
        758 → <OCI>Chassis Body Nuts & Bolts</OCI>
            760 → <Result>P/F</Result>
        758 → <OCI>Drive Shaft/Propeller Shaft Dust Boots</OCI>
            760 → <Result>P/F</Result>
        758 → <OCI>Steering Linkage & Boots</OCI>
            760 → <Result>P/F</Result>
        776 → <SCI>PCV Valve</SCI>
            760 → <Result>P/F</Result>
        776 → <SCI>Ignition Coil</SCI>
            760 → <Result>P/F</Result>
        776 → <SCI>Cabin Air Filter</SCI>
            760 → <Result>P/F</Result>
        776 → <SCI>Spark Plugs</SCI>
            760 → <Result>P/F</Result>
        776 → <SCI>Door Hinges Needing Lubricaton</SCI>
            760 → <Result>P/F</Result>
    756 → <Checklist_category>Replace</Checklist_category>
        758 → <OCI>Engine Oil</OCI>
            762 → <Result>Complete</Result>
        758 → <OCI>Engine Oil Filter</OCI>
            762 → <Result>Complete</Result>
    756 → <Checklist_category>Reset</Checklist_category>
        758 → <OCI>Engine Oil Replacement Reminder Light</OCI>
            762 → <Result>Complete</Result>
    756 → <Checklist_category>Road Test</Checklist_category>
        758 → <OCI>Vehicle</OCI>
            762 → <Result>Complete</Result>
    756 → <Checklist_category>Rotate</Checklist_category>
        758 → <OCI>Tires</OCI>
            762 → <Result>Complete</Result>
```

SYSTEM AND METHOD FOR GENERATING AUGMENTED CHECKLIST

CROSS REFERENCE TO RELATED APPLICATION

This application is a continuation-in-part application of U.S. patent application Ser. No. 15/798,371, filed Oct. 30, 2017, which is hereby incorporated by reference in its entirety.

BACKGROUND

Most vehicles are serviced at least once during their useful life. In many instances, a vehicle is serviced at a repair shop by a professional mechanic (e.g., a repair technician). The repair shop may be referred to by various names such as a service shop, a vehicle shop, or more simply a shop.

The technician at a repair shop may use any of a variety of hand tools to service (e.g., repair) a mechanical component on a vehicle. The technician may also use an electronic diagnostic device to service (e.g., diagnose) an electrical component on a vehicle. The technician may use another shop resource or equipment at the repair shop to service a vehicle. In some instances, the technician demand for tools, equipment or shop resources may be greater than the available supply of the tools, equipment or shop resources at the shop where the technicians needing the tools, equipment or shop resources are located.

Typically, a vehicle owner or a vehicle user places a telephone call to make a vehicle service appointment at a repair shop. In the past, a service advisor or service manager would list a vehicle service appointment on a paper schedule located at the repair shop. More recently, the service advisor or service manager might add the vehicle service appointment into a scheduler application operating on a local computing device based on information gathered from the telephone call with the vehicle owner or vehicle user. Under these typical circumstances, the schedule application is not updated based on data indicative of a vehicle condition of a vehicle reported by the vehicle.

During at least some service appointments at the repair shop, the technician uses a baseline checklist while servicing the vehicle. The use of the baseline checklist can include inspecting the vehicle and recording results of inspecting the vehicle. In some cases, a result of inspecting the vehicle includes pass or fail.

Overview

In a first implementation, a method is provided. The method includes determining a vehicle identifier indicative of a group of like vehicles. The group of like vehicles includes a first vehicle. The method also includes determining a first odometer reading for the first vehicle and determining a first baseline checklist including multiple original checklist items. Determining the first baseline checklist includes determining the first baseline checklist is associated with a range of odometer readings including the first odometer reading for the first vehicle. The method further includes determining one or more supplemental checklist items, generating an augmented checklist based on the first baseline checklist and the one or more supplemental checklist items, and outputting the augmented checklist.

In a second implementation, a computing system is provided. The computing system includes a computer-readable memory having stored thereon a first baseline checklist including multiple original checklist items, one or more processors, and program instructions stored on the computer-readable memory. The program instructions are executable to determine a vehicle identifier indicative of a group of like vehicles. The group of like vehicles includes a first vehicle. The program instructions are also executable to determine a first odometer reading for the first vehicle and determine the first baseline checklist including multiple original checklist items. Determining the first baseline checklist includes determining the first baseline checklist is associated with a range of odometer readings including the first odometer reading for the first vehicle. The program instructions are further executable to determine one or more supplemental checklist items, generate an augmented checklist based on the first baseline checklist and the one or more supplemental checklist items, and output the augmented checklist.

In a third implementation, a non-transitory computer-readable memory is provided. The memory has stored thereon instructions executable by one or more processors to cause a computing system to perform functions. The functions include determining a vehicle identifier indicative of a group of like vehicles. The group of like vehicles includes a first vehicle. The functions also include determining a first odometer reading for the first vehicle and determining a first baseline checklist including multiple original checklist items. Determining the first baseline checklist includes determining the first baseline checklist is associated with a range of odometer readings including the first odometer reading for the first vehicle. The functions further include determining one or more supplemental checklist items, generating an augmented checklist based on the first baseline checklist and the one or more supplemental checklist items, and outputting the augmented checklist.

Other implementations will become apparent to those of ordinary skill in the art by reading the following detailed description, with reference where appropriate to the accompanying drawings.

BRIEF DESCRIPTION OF THE DRAWINGS

Example implementations are described herein with reference to the drawings.

FIG. 9, FIG. 10, FIG. 11, FIG. 12, FIG. 13, FIG. 14, and FIG. 15 show display outputs in accordance with the example implementations.

FIG. 20 shows a service history in accordance with the example implementations.

FIG. 21 shows a list of baseline checklists in accordance with the example implementations.

FIG. 22 shows a list of highest frequency repairs in accordance with the example implementations.

FIG. 26 and FIG. 27 show markup language files in accordance with an example implementation.

DETAILED DESCRIPTION

I. Introduction

Figure 1:
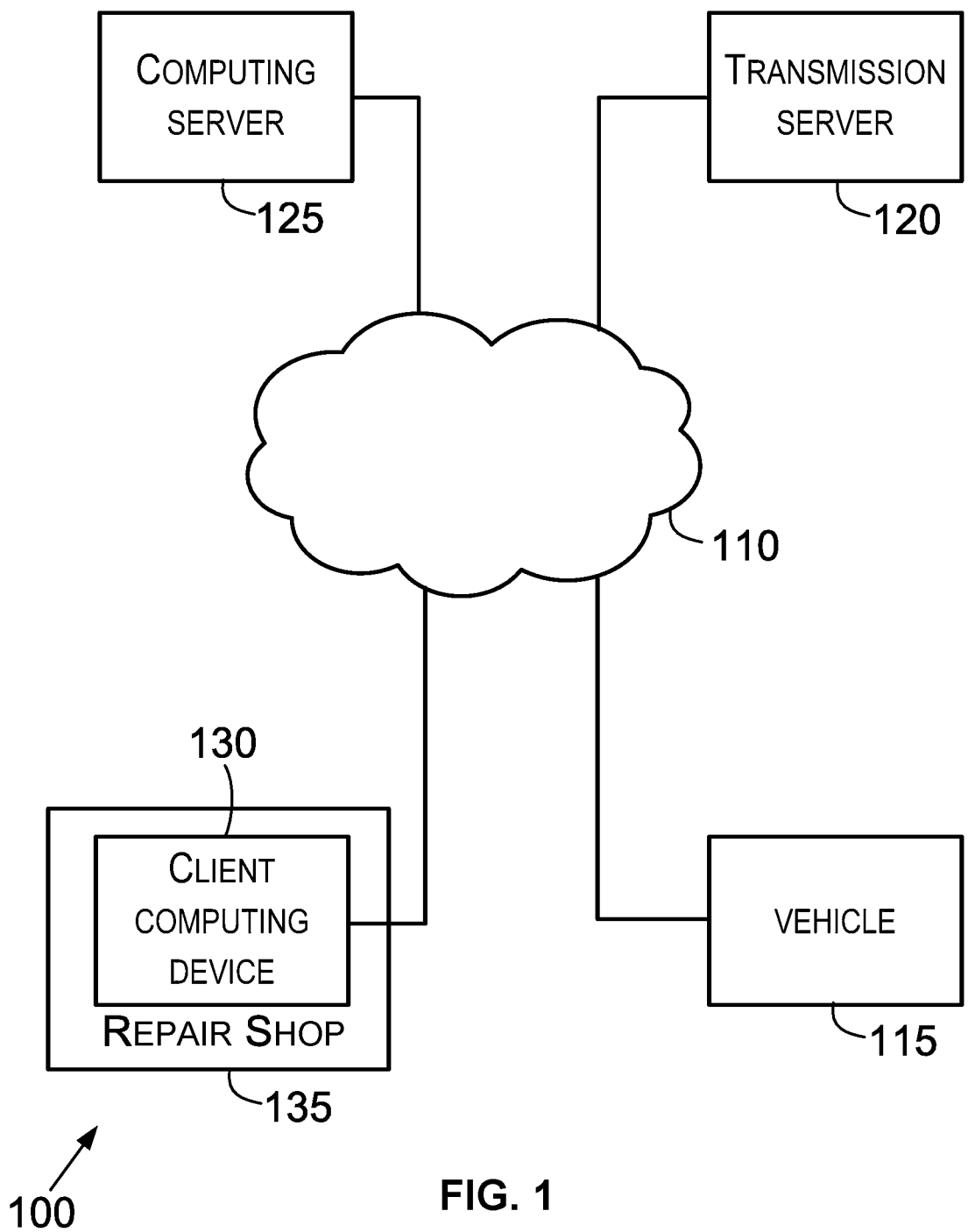
FIG. 1 is a diagram showing an example operating environment in which the example implementations can operate.

This description describes example implementations pertaining to generating an augmented checklist from a baseline checklist. Both the baseline checklist and the augmented checklist are computer-readable checklists.

In some implementations, the baseline checklist is a generic checklist intended to be used on different groups of like vehicles, including groups of vehicles manufactured by different manufacturers. A problem with using such a generic checklist is that the generic checklist can include original checklist items that are not applicable to a particular group of like vehicles. For instance, using a generic checklist to service a vehicle including a diesel engine may include an original checklist item (e.g., check spark plugs) that is not applicable to that vehicle. Moreover, that generic checklist may not include an original checklist item that covers a typical service procedure performed on vehicles in a group of vehicles including the vehicle including the diesel engine.

In other implementations, the baseline checklist is specific to a group of like vehicles. In these implementations, the baseline checklist may include original checklist items based on a maintenance schedule determined by a vehicle manufacturer. Typically, the vehicle manufacturer determines the maintenance schedule prior to most vehicles of the group of vehicles being manufactured. Unfortunately, these baseline checklists do not include checklist items based on one or more common repairs determined to be made to vehicles of the group of like vehicles after the maintenance schedule was determined.

In accordance with the example implementations, generating the augmented checklist includes generating a checklist based on a baseline checklist and one or more supplemental checklist items. In accordance with at least some of the example implementations, the baseline checklist pertains to a vehicle of the group of like vehicles and the one or more supplemental checklist items are based on highest frequency repairs previously performed to vehicles of the group of like vehicles. As an example, the one or more supplemental checklists items consists of the ten highest frequency repairs previously performed to vehicles of the group of like vehicles. Moreover, a computing system that generates the augmented checklist determines that each supplemental checklist items is not a duplicate of an original checklist item on the baseline checklist.

Moreover, in at least some of those implementations, the baseline checklist may pertain to a particular odometer range and the computing system determines the one or more checklist items based on highest frequency repairs previously performed to vehicles of the group of like vehicles having odometer readings within a range of odometer readings including an odometer reading of a vehicle to be serviced using the augmented checklist.

In accordance with at least some example implementations, the computing system generating the augmented checklist adds supplemental checklist items within a section of the augmented checklist having checklist items pertaining to a common vehicle system or common vehicle component or to a common service action (e.g., inspect or replace). The section of the checklist can be included within the baseline checklist or could be newly added by the computing system when generating the augmented checklist.

This description also describes example implementations pertaining to a scheduler application. The scheduler application can be referred to as a "vehicle shop scheduler," a "shop scheduler," a "scheduler," or by another term. The scheduler of the example implementations may enable a shop to improve its management of workflow within the shop including scheduling technician time, service appointments, and shop resources.

The scheduler application can be executed by a computing server. The computing server can transmit network communications including data for a client computing device. The computing server can receive data for modifying a schedule from the client computing device. The computing server can receive data reported by a vehicle for modifying a schedule, such as a schedule maintained for a repair shop where the client computing device is located.

II. Example Systems

A. Operating Environment

FIG. 1 is a diagram showing an operating environment 100 in which the example implementations can operate. The operating environment 100 includes a computer network 110, a vehicle 115, a transmission server 120, a computing server 125, a client computing device 130, and a repair shop 135.

The computer network 110 can include a computer network component such as a switch, a modem, a gateway, an antenna, a cable, a transmitter, a receiver, a router, an access point, a wiring hub, or an Ethernet switch to allow devices at various locations of the computer network 110 to operatively connect to one another. The computer network 110 can include a wireless communication link, such as a WI-FI® communication link, and/or a wired communication link, such as an Integrated Service Digital Network, a Digital Subscriber Link, a coaxial cable, or a fiber optic cable. The computer network 110 can include a wide area network (WAN). The WAN or some other portion of the computer network 110 can carry data using one or both of a packet-switched technology and a circuit-switched technology. The WAN can include an air interface or wire to carry the data. The computer network 110 can include a local area network (LAN) that is operatively connected to other portions of the computer network 110 via the computer network component. The computer network 110 can include a metropolitan area network (MAN). The computer network 110 carries communications. The computer network 110 can carry communications in accordance with a network protocol. As an example, the network protocol can include a protocol such as an Internet Protocol (IP) or a Transmission Control Protocol (TCP). The computer network 110 can include a communication network commonly referred to as the Internet.

The repair shop 135 is a facility at which a vehicle can be repaired. As an example, the repair shop 135 can include a vehicle transmission repair shop, a manufacturer's dealer repair shop, an independent repair shop, a vehicle oil change repair shop, or some other type of repair shop at which a vehicle may be taken for servicing. A typical repair shop includes one or more shop tools, such as a vehicle lift, a brake lathe, a wheel alignment machine, a wheel balancer, or a diagnostic computing device for diagnosing a vehicle. The repair shop 135 can include a LAN and a computer network component to operatively connect that LAN to the computer network 110. Although FIG. 1 represents the client computing device 130 within the repair shop 135, the client computing device 130 can operate at, within, or remote from the repair shop 135. The client computing device 130 can be configured as a vehicle scan tool including a vehicle communication transceiver configured to communicate with a vehicle using vehicle data messages. In some implementations, the vehicle 115 is located outside of the repair shop 135. In other implementations, the vehicle is located inside of the repair shop 135.

B. Vehicle

Figure 2:
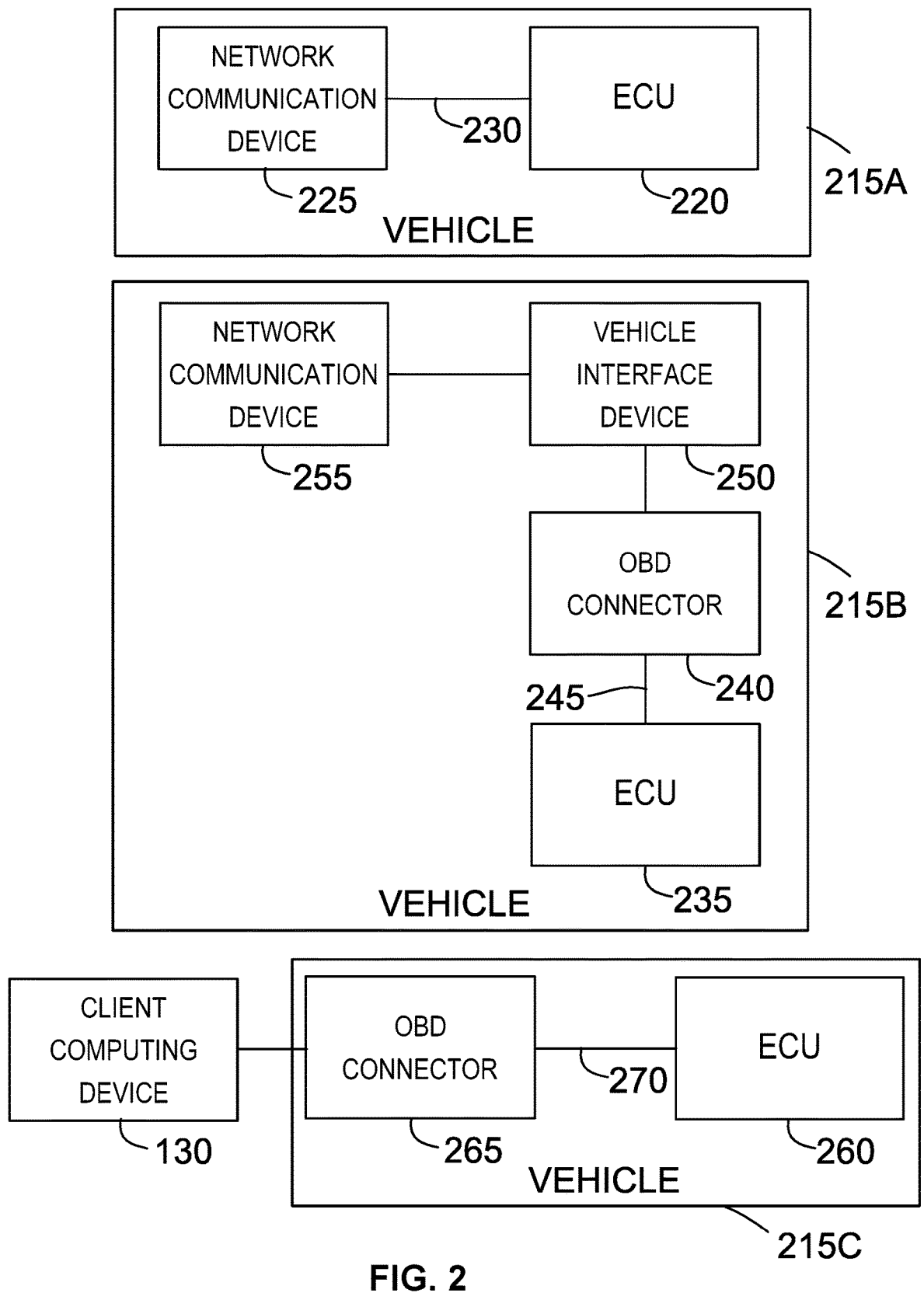
FIG. 2 shows simple block diagrams of vehicles in accordance with the example implementations.

Next, FIG. 2 shows vehicle 215A, vehicle 215B, and vehicle 215C in accordance with the example implementations. A vehicle, such as the vehicle 115, 215A, 215B, 215C is a mobile machine that can be used to transport a person, people, or cargo. A vehicle can be driven or otherwise guided along a path (e.g., a paved road or otherwise) on land, in water, or in the air or outer space. A vehicle can be wheeled, tracked, railed, or skied. A vehicle can be guided by a user within the vehicle or by a user outside of the vehicle by use of a remote control. A vehicle can be guide at least partially autonomously. In the case of an autonomous vehicle, the vehicle can at least sometimes be guided along a path without any person or cargo inside or on the vehicle. A vehicle, such as a wheeled motor vehicle, can include an automobile, a motorcycle, an all-terrain vehicle (ATV) defined by ANSI/SVIA-1-2007, a light-duty truck, a medium-duty truck, a heavy-duty truck, a semi-tractor, a farm machine, a van (such as a dry or refrigerated van), a tank trailer, a platform trailer, or an automobile carrier. A vehicle can include a snowmobile or a personal watercraft (e.g., a JET SKI® personal watercraft). A vehicle can include or use any appropriate voltage or current source, such as a battery, an alternator, a fuel cell, and the like. A vehicle can include or use any desired drive system or engine. That drive system or engine can include items that use fossil fuels, such as gasoline, natural gas, propane, and the like, electricity, such as that generated by a battery, magneto, fuel cell, solar cell and the like, wind and hybrids or combinations thereof.

The vehicle 215A includes an electronic control unit (ECU) 220, a network communication device 225, and a vehicle communication link (VCL) 230 that operatively connects the ECU 220 and the network communication device 225. The network communication device 225 is configured to carry out communications using the computer network 110. The network communication device 225 can be connected directly to the ECU 220 via the VCL 230. The network communication device 225 can include a network communication device installed into the vehicle 215A by the vehicle manufacturer or by an aftermarket source. The network communication device 225 can, for example, operatively connect to the computer network 110 using a cellular network protocol, such as a cellular wireless communication standard such as a long term evolution (LTE) standard, a code division multiple access (CDMA) standard, an integrated digital enhanced network (IDEN) standard, a global system for mobile communications (GSM) standard, a general packet radio service (GPRS) standard, a UMTS standard, an enhanced data rates for GSM evolution (EDGE) standard, or a multichannel multipoint distribution service (MMDS) standard. Additionally or alternatively, the network communication device 225 can operatively connect to the computer network 110 using a wireless communication standard or protocol other than a cellular network standard or protocol, such as an Institute of Electrical and Electronics Engineers (IEEE) 802.11 standard (e.g., 802.11a, 802.11b, 802.11g, or 802.1n).

The vehicle 215B includes an ECU 235, an on-board diagnostic (OBD) connector 240, a VCL 245, a vehicle interface device 250 removably connectable to the OBD connector 240, and a network communication device 255. The VCL 245 operatively connects the ECU 235 to the OBD connector 240.

The vehicle 215C includes an ECU 260, an OBD connector 265, a VCL 270 that operatively connects the ECU 260 and the OBD connector 265. FIG. 2 shows the client computing device 130. The client computing device 130 is removably connectable to the vehicle 215C via the OBD connector 265. The connection of the vehicle 215C and the client computing device 130 can be wired or wireless.

An ECU, such as the ECU 220, 235, 260 can detect a malfunction in a vehicle and set a diagnostic trouble code (DTC) to an active status. A vehicle, such as the vehicle 115, 215A, 215B, 215C can be a "connected vehicle" (e.g., a vehicle connected to the computer network 110).

A vehicle manufacturer can build various quantities of vehicles each calendar year (i.e., January $1^{st}$ to December $31^{st}$). In some instances, a vehicle manufacturer defines a model year for a particular vehicle model to be built. The model year can start on a date other than January $1^{st}$ or can end on a date other than December $31^{st}$. The model year can span portions of two calendar years. A vehicle manufacturer can build one vehicle model or multiple different vehicle models. Two or more different vehicle models built by a vehicle manufacturer during a particular calendar year can have the same of different defined model years. The vehicle manufacturer can build vehicles of a vehicle model with different vehicle options. For example, the particular vehicle model can include vehicles with six-cylinder engines and vehicles with eight-cylinder engines. The vehicle manufacturer or another entity can define vehicle identifying information for each vehicle built by the vehicle manufacturer. Particular vehicle identifying information identifies particular sets of vehicles (e.g., all vehicles of a particular vehicle model for a particular vehicle model year or all vehicles of a particular vehicle model for a particular vehicle model year with a particular set of one or more vehicle options).

As an example, the particular vehicle identifying information can 12110252 indicators of characteristics of the vehicle such as when the vehicle was built (e.g., a vehicle model year), who built the vehicle (e.g., a vehicle make (i.e., vehicle manufacturer)), marketing names associated with vehicle (e.g., a vehicle model name, or more simply "model"), and features of the vehicle (e.g., an engine type). In accordance with that example, the particular vehicle identifying information can be referred to by an abbreviation YMME, where each letter in the order shown represents a model year identifier, vehicle make identifier, vehicle model name identifier, and engine type identifier, respectively, or an abbreviation YMM, where each letter in the order shown represents a model year identifier, vehicle make identifier, and vehicle model name identifier, respectively. An example YMME is 2004/Toyota/Camry/4Cyl, in which "2004" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (i.e., a four cylinder internal combustion engine (ICE)) within the vehicle. A person skilled in the art will understand that other features (such as a vehicle system) in addition to or as an alternative to "engine type" can be used to identify a vehicle using particular vehicle identifying information, and for some purposes, a vehicle could be identified by its make and model (MM), or by its make, model, and engine (MME), or by its make, model, and vehicle system (MMS), or by its make, model, engine, and vehicle system (MMSE), or by its year, make, mode, and vehicle system (YMMS), or by its year, make, model, engine, and vehicle system (YMMES), where the "S" in the foregoing abbreviations represents the vehicle system. The other features can be identified in various manners, such as a regular production option (RPO) code, such as the RPO codes defined by the General Motors Company LLC, Detroit Michigan Furthermore, the vehicle identifying information can be combined and displayed as a vehicle identification number (VIN). The VIN can be displayed on a VIN label.

A vehicle manufacturer can manufacture a group of like vehicles. As an example, a group of like vehicles can include all vehicles identified by a common MM, YMM, MME, MMS, YMME, MMSE, YMMS, or YMMES. In some implementations, a vehicle manufacturer makes two or more vehicle models that use one or more common vehicle components. In those or other implementations, vehicle leveraging is two or more groups of like vehicles, such as a group of like vehicles identified by a first YMM and another group of like vehicles identified by a second YMM different than the first YMM. As an example, the first YMM can be 2015 Chevrolet Tahoe and the second YMM can be 2015 GMC Yukon. As another example, the first YMM can be 2015 Chevrolet Tahoe and the second YMM can be 2016 Chevrolet Tahoe.

A VCL, such as the VCL 230, 245, 270, can include one or more conductors (e.g., copper wire conductors) or can be wireless. As an example, a VCL can include one or more conductors for carrying vehicle data messages in accordance with a vehicle data message (VDM) protocol. A VDM protocol can include a Society of Automotive Engineers (SAE) J1850 (pulse width modulation or variable pulse width) VDM protocol, an International Organization of Standardization (ISO) 15764-4 controller area network (CAN) VDM protocol, an ISO 9141-2 K-Line VDM protocol, an ISO 14230-4 KWP2000 K-Line VDM protocol, local interconnect network (LIN), or some other VDM protocol defined for performing communications over a VCL with or within the vehicle 115, 215A, 215B, 215C. Each and every VDM discussed in this description is arranged according to a VDM protocol.

An ECU, such as the ECU 220, 235, 260 can control various aspects of vehicle operation and/or other components within a vehicle. For example, the ECU 220, 235, 260 can include a powertrain (PT) system ECU, an engine control module (ECM) ECU, a powertrain control module (PCM) ECU, a supplemental inflatable restraint (SIR) system (e.g., an air bag system) ECU, an entertainment system ECU, or some other ECU. The ECU 220, 235, 260 can receive inputs (e.g., a sensor input), control output devices (e.g., a solenoid), generate a vehicle data message (VDM) (such as a VDM based on a received input or a controlled output), and set a DTC as being active or history for a detected fault or failure condition within a vehicle. The ECU 220, 235, 260 can perform a functional test can or a reset procedure in response to receiving a VDM requesting performance of the functional test or the reset procedure. A VDM received by the ECU 220, 235, 260 can include a parameter identifier (PID) to request a parameter data value associated with the PID. A VDM transmitted by the ECU 220, 235, 260 can include a response including the PID and the PID data value associated with the PID. The ECU 220, 235, 260 can be operatively connected to a vehicle component, such as a vehicle battery, a sensor, a vehicle chassis, a solenoid, a fuel injector, a fuel pump, or some other vehicle component via a circuit, such as an electrical or optical circuit.

The OBD connector 240, 265 can, but need not necessarily, include an OBD I connector, an OBD II connector, an assembly line diagnostic link (ALDL) connector, or a data link connector (DLC). An OBD I connector can include slots for retaining up to twelve connector terminals. An OBD II connector can include slots for retaining up to sixteen connector terminals. As an example, an OBD II connector that meets the SAE J1962 specification is a 16-way connector, part number 12110252, available from Aptiv LLC of Dublin, Ireland. The OBD connector 240, 265 can include conductor terminals that connect to a respective conductor in the vehicle 115, 215A, 215B, 215C. For instance, the OBD connector 240, 265 can include connector terminals that connect to conductors that respectively connect to positive and negative terminals of a vehicle battery. The OBD connector 240, 265 can include one or more conductor terminals that connect to a conductor of the VCL 245, 270 such that the OBD connector 240, 265 is operatively connected to the ECU 235, 260. The vehicle 215A can include an OBD connector, such an OBD connector in parallel with the ECU 220 and/or the network communication device 225.

The vehicle interface device 250 can include a transceiver and a connector that mates with the OBD connector 240. The vehicle interface device 250 can be removably connectable to the OBD connector 240. As an example, a vehicle owner or vehicle user can operatively connect the vehicle interface device 250 to the OBD connector 240 in response to the ECU 235 detecting a vehicle malfunction and causing a malfunction indicator lamp (MIL) to be illuminated in the vehicle 215A. The vehicle interface device 250 is typically removed after the vehicle malfunction has been repaired and/or after the network communication device 255 has communicated with the transmission server 120. As an example, the vehicle interface device 250 can include a ZUBIE® vehicle monitoring device model number GL700C sold by the BEST BUY® retail store, an AUDIOVOX car connection elite monitor sold by the BEST BUY® retail store with SKU 6365119, a GEOTAB® G07® expandable plug-and-play telematics device sold by Geotab, Inc., Oakville, Ontario, Canada. Other examples of the vehicle interface device 250 are also possible.

The vehicle interface device 250 can communicate with the network communication device 255 in various ways. As an example, the vehicle interface device 250 can communicate wirelessly with the network communication device 255. Those wireless communications between the vehicle interface device 250 and the network communication device 255 can be arranged in accordance with one or more wireless communication standards or protocols such as an IEEE standard, such as an IEEE 802.11 standard (e.g., 802.11a, 802.11b, 802.11g, or 802.11n) or an IEEE 802.15 standard (e.g., 802.15.1, 802.15,3, 802.15.4 (ZigBee), or 802.15.5) for wireless personal area networks (PANs), a Bluetooth version 4.1 or 4.2 standard developed by the Bluetooth Special Interest Group (SIG) of Kirkland, Washington, or an IEEE 802.11 standard for wireless LAN (which is sometimes referred to as a Wi-Fi standard), an International Organization for Standardization (ISO/International Electrotechnical Commission (IEC) standard such as the ISO/IEC 18000-3 standard for Near Field Communication (NFC), the Sigfox communication standard, the Neul communication standard, or the LoRaWAN communication standard.

As an example, the network communication device 255 can include or be implemented as a portion of a small-form factor portable (i.e., mobile) electronic device such as a smartphone (e.g., an IPHONE® smartphone from Apple Inc. of Cupertino, California, or a GALAXY S® smartphone from Samsung Electronics Co., Ltd. of Maetan-Dong, Yeongtong-Gu Suwon-Si, Gyeonggi-Do, Republic of Korea), a tablet device (e.g., an IPAD® tablet device from Apple Inc., or a SAMSUNG GALAXY TAB tablet device from Samsung Electronics Co., Ltd.), or a wearable computing device (e.g., a wireless web-watch device or a personal headset device). The network communication device 255 can include an executable application downloaded to a transceiver of the network communication device 255 from the APP STORE® online retail store, from the GOOGLE PLAY® online retail store, or another source of an application or the CRPI executable by the network communication device 255.

As another example, the vehicle interface device 250 and the network communication device 255 can be co-located in a single casing. In accordance with this example, the vehicle interface device 250 and the network communication device 255 can be operatively coupled via a wired circuit such as a system bus or a printed circuit. The network communication device 255 can operatively connect to the computer network 110 in any of the ways in which the network communication device 225 is described as connecting the computer network 110.

C. Transmission Server

Figure 3:
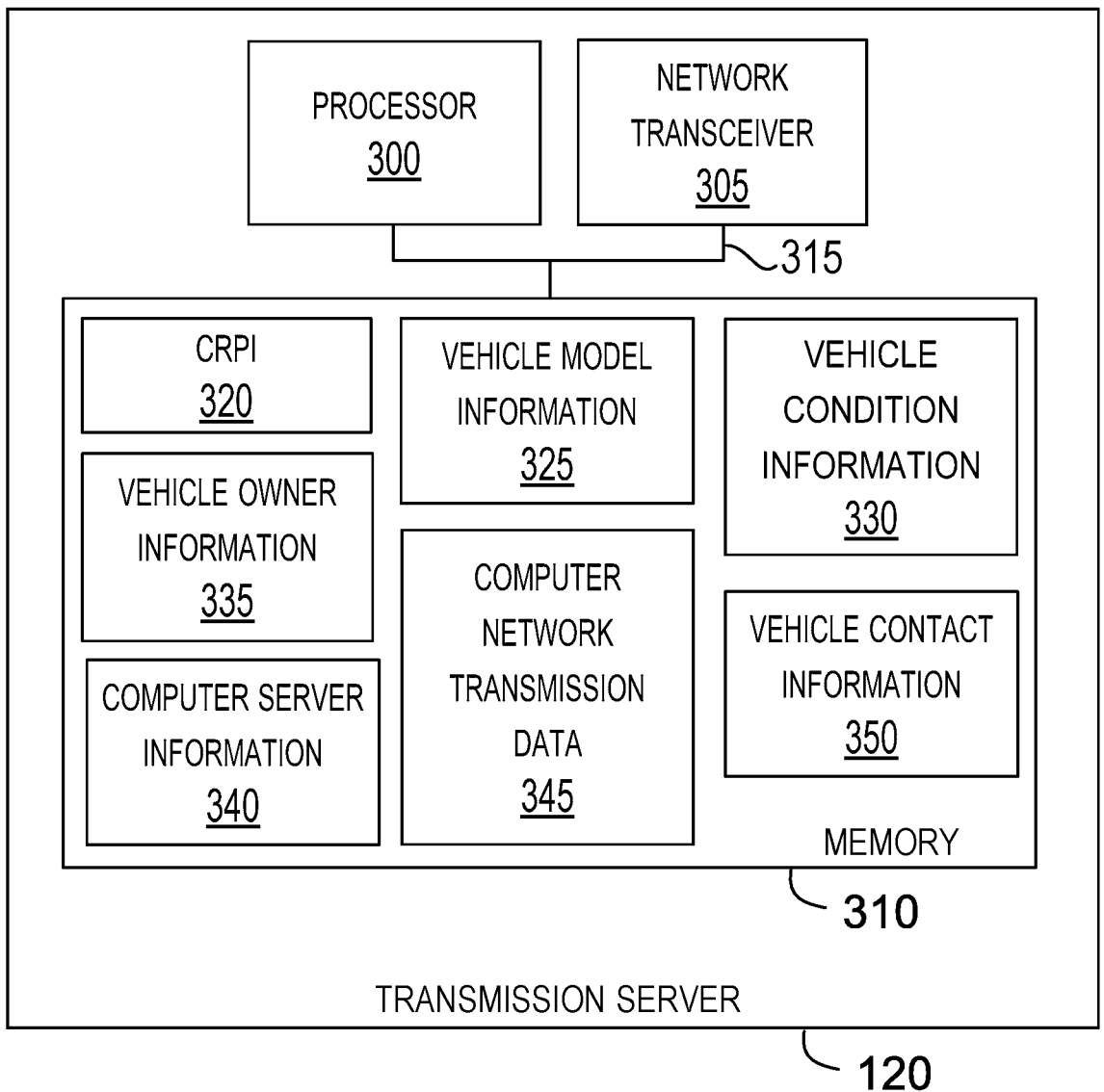
FIG. 3 and FIG. 4 are simple block diagrams of a server in accordance with the example implementations.

Next, FIG. 3 is a simple block diagram of the transmission server 120 in accordance with the example implementations. As shown in FIG. 3, the transmission server 120 includes a processor 300, a network transceiver 305, and a memory 310. Two or more of the aforementioned components may be operatively coupled together via a system bus, network, or other connection mechanism 315. The transmission server 120 can include a component of the computing device 1600 shown in FIG. 16. The transmission server 120 can include a component of the computer program product 1700 shown in FIG. 17.

The memory 310 includes CRPI 320, vehicle model information 325, vehicle condition information 330, vehicle owner information 335, computing server information 340, computer network transmission data 345, and vehicle contact information 350. The CRPI 320 include programs instruction executable by the processor 300.

1. Processor

A processor, such as the processor 300 or any other processor (e.g., a processor 400 or a processor 500) discussed in this description or included within a device or system described in this description, can include one or more processors, such as one or more general purpose processors (e.g., an INTEL® single core microprocessors or an INTEL® multicore microprocessors) or one or more special purpose processors (e.g., a digital signal processor, a graphics processor, an embedded processor, or an application specific integrated circuit (ASIC) processor). A graphics processor may be configured to access and use a memory for creating, or retrieving GUI to display on a display. An embedded processor can include a central processing unit chip used in a system that is not a general-purpose workstation, laptop, or desktop computer. A processor may be configured to execute computer-readable program instructions (CRPI) stored in a memory. A processor may be configured to execute hard-coded functionality in addition to or as an alternative to software-coded functionality (e.g., via CRPI).

2. Network Transceiver

The network transceiver, such as the network transceiver 305 or any other transceiver (e.g., a network transceiver 405, 505 or a vehicle communication transceiver 506) discussed in this description or included within a device or system described in this description, can include one or more transceivers. Each transceiver includes one or more transmitters configured to transmit data or a communication onto a network, such as the computer network 110 and/or a vehicle communication link. The network transceiver 305 can transmit any data or computer network transmission discussed as being transmitted, output, or provided by the transmission server 120 or the network transceiver 305. Each transceiver (e.g., the network transceiver 305, 405, 505 and the vehicle communication transceiver 506) includes one or more receivers configured to receive data or a computer network transmission carried over a computer network, such as the computer network 110 and/or a vehicle communication link. The network transceiver 305 can receive any data or computer network transmission discussed as being received by the transmission server 120.

Each transceiver can include a wireless transceiver to communicate with a separate wireless transceiver or wireless receiver. A transmitter, such as a transmitter in the network transceiver 305, 405, 505 or the vehicle communication transceiver 506, can transmit a radio signal carrying data or a computer network transmission, and a receiver, such as a receiver in the network transceiver 305, 405, 505 or the vehicle communication transceiver 506, can receive a radio signal carrying data or a computer network transmission. A transceiver with a radio transmitter and radio receiver can include one or more antennas and can be referred to as a "radio transceiver," an "RF transceiver," or a "wireless transceiver."

A radio signal transmitted or received by a radio transceiver can be arranged in accordance with one or more wireless communication standards or protocols such as an IEEE standard, such as (i) an IEEE 802.11 standard for wireless LAN (which is sometimes referred to as a Wi-Fi standard) (e.g., 802.11a, 802.11b, 802.11g, or 802.11n), (ii) an IEEE 802.15 standard (e.g., 802.15.1, 802.15,3, 802.15.4 (ZigBee), or 802.15.5) for wireless personal area networks (PANs), (iii) a Bluetooth version 4.1 or 4.2 standard developed by the Bluetooth Special Interest Group (SIG) of Kirkland, Washington, (iv) a cellular wireless communication standard such as an LTE standard, (v) a CDMA standard, (vi) an IDEN standard, (vii) a GSM standard, (viii) a GPRS standard, (ix) a UMTS standard, (x) an EDGE standard, (xi) a MMDS standard, (xii) an ITU standard, such as the ITU-T G.9959 standard referred to as the Z-Wave standard, (xiii) a 6LoWPAN standard, (xiv) a Thread networking protocol, (xv) an ISO/IEC standard such as the ISO/IEC 18000-3 standard for NFC, (xvi) the Sigfox communication standard, (xvii) the Neul communication standard, or (xviii) the LoRaWAN communication standard. Other examples of the wireless communication standards or protocols are possible.

Additionally or alternatively, a transmitter, such as a transmitter in the network transceiver 305, 405, 505 or the vehicle communication transceiver 506, can transmit a signal (e.g., one or more signals or one or more electrical waves) carrying or representing data or a communication onto a wire (e.g., one or more wires) and a receiver, such as a receiver in the network transceiver 305, 405, 505 or the vehicle communication transceiver 506, can receive via a wire a signal carrying or representing data or a communication over the wire. The wire can be part of a computer network, such as the computer network 110. The signal carried over a wire can be arranged in accordance with a wired communication standard such as a Transmission Control Protocol/Internet Protocol (TCP/IP), an IEEE 802.3 Ethernet communication standard for a LAN, a data over cable service interface specification (DOCSIS standard), such as DOCSIS 3.1, a universal serial bus (USB) specification, or some other wired communication standard.

The data or communication transmitted by a network transceiver, such as the network transceiver 305, 405, 505 or the vehicle communication transceiver 506, can include a destination identifier or address of a network device to which the data or communication is to be transmitted. The data or communication transmitted by a network transceiver can include a source identifier or address of the system component including the network transceiver. The source identifier or address can be used to send a response to the network device that includes the network transceiver that sent the data or communication.

A network transceiver that is configured to carry out communications over the computer network 110, such as the network transceiver 305, 405, 505, can include at least one of the following: a modem, a network interface card, or a chip mountable on a circuit board. As an example the chip can include a CC3100 Wi-Fi® network processor available from Texas Instruments, Dallas, Texas, a CC256MODx Bluetooth® Host Controller Interface (HCI) module available from Texas instruments, or a different chip for communicating via Wi-Fi®, Bluetooth® or another communication protocol.

A device within or coupled to the computer network 110 or that communicates via the computer network 110 using a packet-switched technology can be locally configured for a next 'hop' in the network (e.g., a device or address where to send data to, and where to expect data from). As an example, a device (e.g., a transceiver) configured for communicating using an IEEE 802.11 standard can be configured with a network name, a network security type, and a password. Some devices auto-negotiate this information through a discovery mechanism (e.g., a cellular phone technology).

3. Memory

A memory, such as the memory 310 or any other memory (e.g., a memory 410, 510, 511) discussed in this description, can include one or more memories. Any memory discussed in this description can thus be referred to as least one memory or one or more memories. A memory can include a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A non-transitory memory can include a volatile or non-volatile storage component, such as an optical, magnetic, organic or other memory or disc storage component. Additionally or alternatively, a non-transitory memory can include or be configured as a random-access memory (RAM), a read-only memory (ROM), a programmable read-only memory (PROM), an erasable programmable read-only memory (EPROM), an electrically erasable programmable read-only memory (EEPROM), or a compact disk read-only memory (CD-ROM). The RAM can include static RAM or dynamic RAM. A transitory memory can include, for example, CRPI provided over a communication link, such as the computer network 110.

A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable medium." Any of those alternative terms can be preceded by the prefix "transitory" if the memory is transitory or "non-transitory" if the memory is non-transitory. For a memory including multiple memories, two or more of the multiple memories can be the same type of memory or different types of memories.

The CRPI 320 can include program instructions executable by the processor 300 to carry out any one or more functions described herein and/or represented by the figures as being performed, at least in part, by the transmission server 120 or a component of the transmission server 120. In general, CRPI, such as the CRPI 320 or any other CRPI (e.g., CRPI 420, 530, 531) described herein, include program instructions executable by a processor. Further, and in general, CRPI can include various structures, modules, routines, or some other computer-readable logic. Further still, and in general, CRPI may be written using a computer-programming language such as C++ or some other programming language.

The CRPI 320 can include program instructions to receive CNT via the computer network 110 and parse the received CNT to obtain data contained within the received CNT. The data contained within the received CNT can include vehicle model information that the processor 300 causes to be stored in the vehicle model information 325, vehicle owner information that the processor 300 causes to be stored in the vehicle owner information 335, or vehicle condition information that the processor 300 causes to be stored in the vehicle condition information 330.

The vehicle model information 325 can include a variety of data regarding a vehicle. As an example, the vehicle model information 325 can include any of the vehicle model information 925 shown in FIG. 9, the vehicle model information 1025 shown in FIG. 10, or the vehicle model information 1110 shown in FIG. 11.

The vehicle condition information 330 can include a variety of data regarding an operating condition of a vehicle. As an example, the vehicle condition information 330 can include a DTC identifier reported by an ECU within a vehicle, or a PID and PID data value associated with the PID from an ECU within the vehicle. As another example, the vehicle condition information 330 can include a vehicle condition regarding the vehicle reported via a user comment contained in a computer network transmission.

The vehicle owner information 335 can include data regarding a vehicle owner. As an example, the vehicle owner information 335 can include any of the vehicle owner information 920 shown in FIG. 9, the vehicle model information shown in FIG. 10, or the vehicle owner information 1105 shown in FIG. 11.

The computing server information 340 can include data regarding a computing server, such as the computing server 125. As an example, the computing server information 340 can include data (e.g., an IP address and port of the computing server 125) the processor 300 uses to determine where to send a CNT so that the computing server can alert a repair shop regarding a vehicle condition. The data regarding a computing server can be associated with vehicle owner information or vehicle model information associated with the vehicle.

Figure 6:
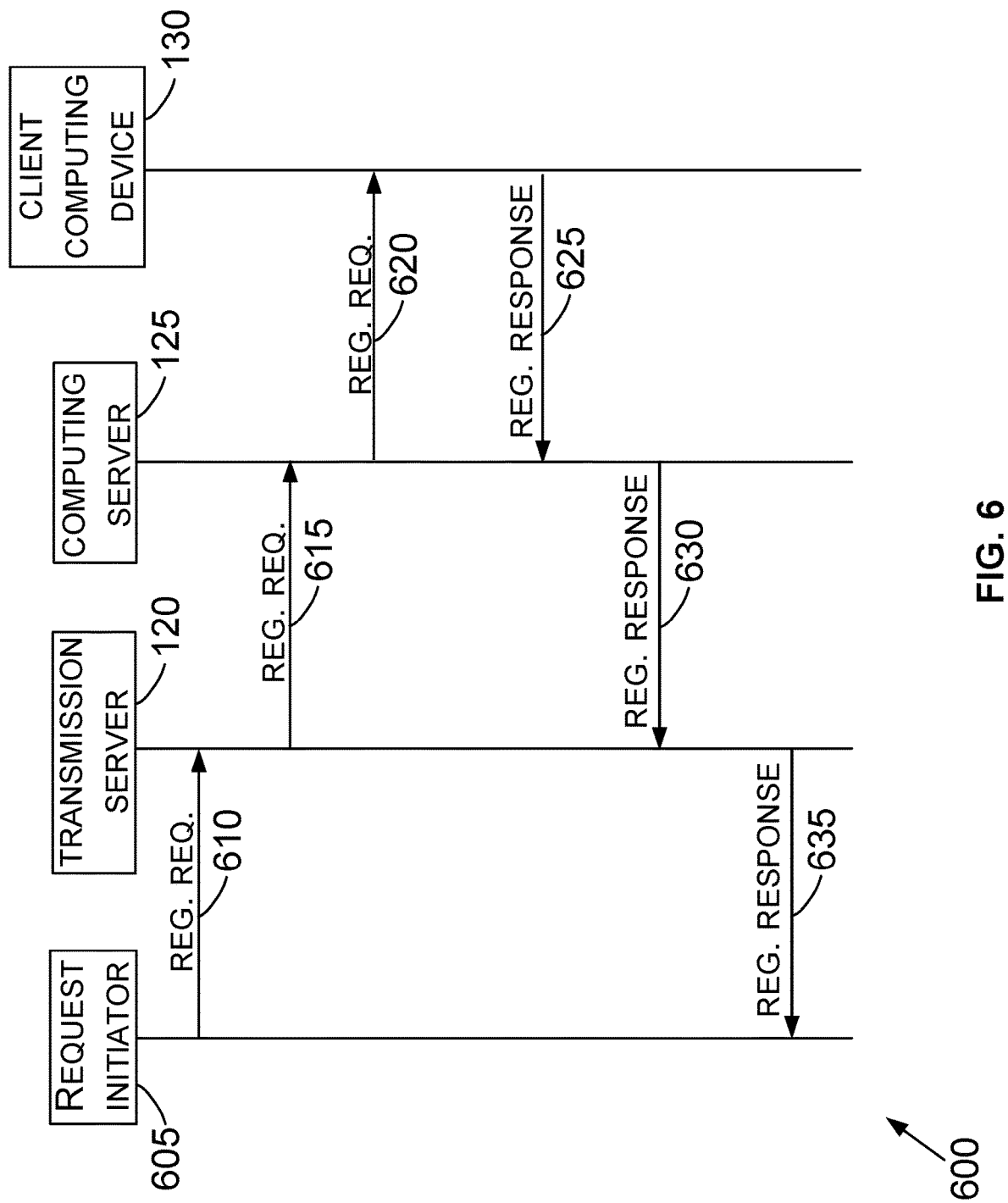
FIG. 6 and FIG. 7 show communication flows in accordance with the example implementations.
Figure 7:
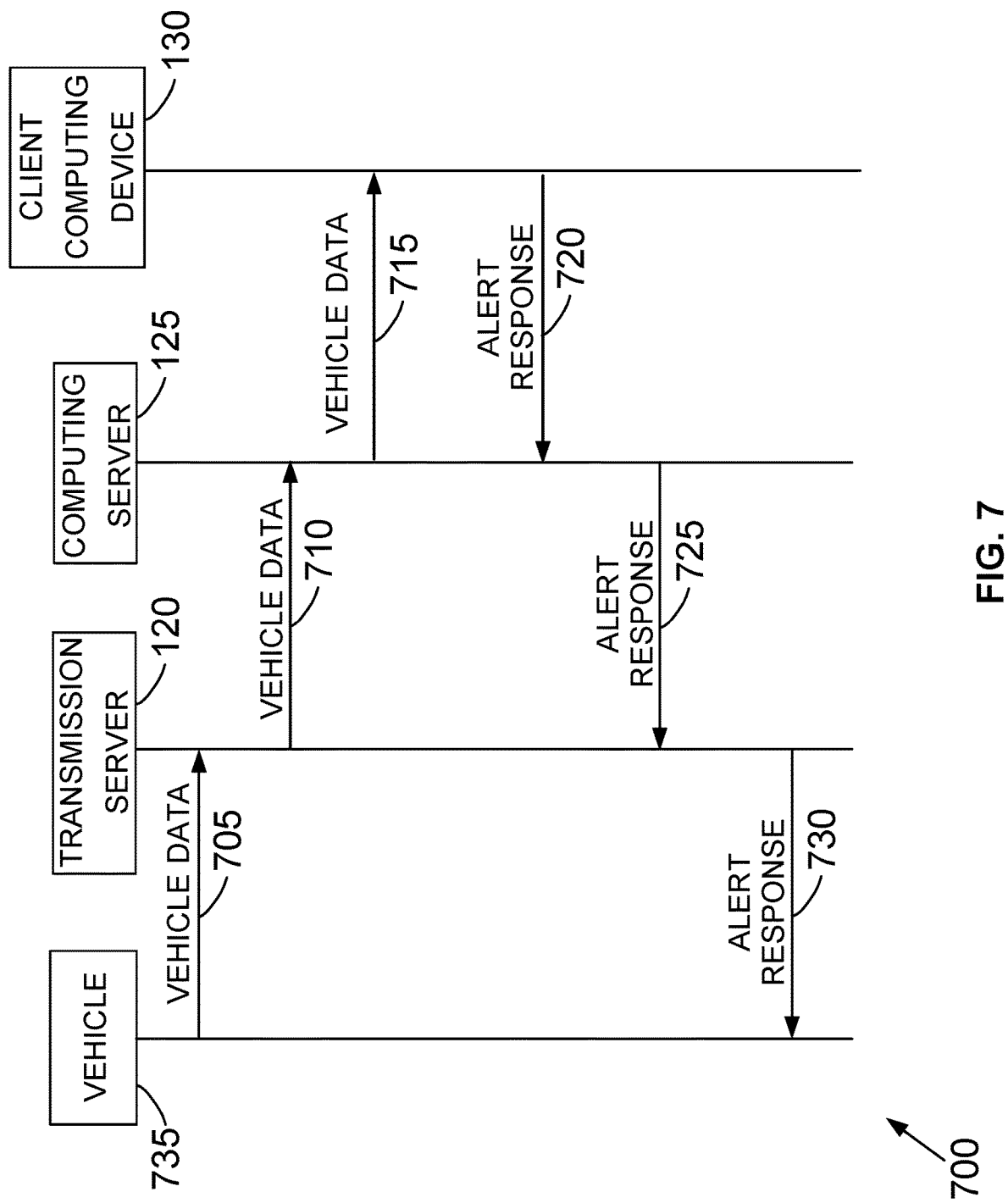

The computer network transmission data 345 can include data of a CNT received by the transmission server 120, which can include data contained within a CNT 610, 630 shown in FIG. 6, or a CNT 705, 725 shown in FIG. 7. The computer network transmission data 345 can include data of a CNT to be transmitted by the transmission server 120, which can include data contained within a CNT 615, 635 shown in FIG. 6, or a CNT 710, 730 shown in FIG. 7. In other words, computer network transmission data 345 can include data selected from vehicle owner information, vehicle model information, or vehicle condition information.

The vehicle contact information 350 can include data the processor 300 uses to determine where to send a CNT to the vehicle, such as an IP address of the network communication device 225, 255. The vehicle contact information for a vehicle can be associated with vehicle owner information or vehicle model information associated with the vehicle.

Figure 4:
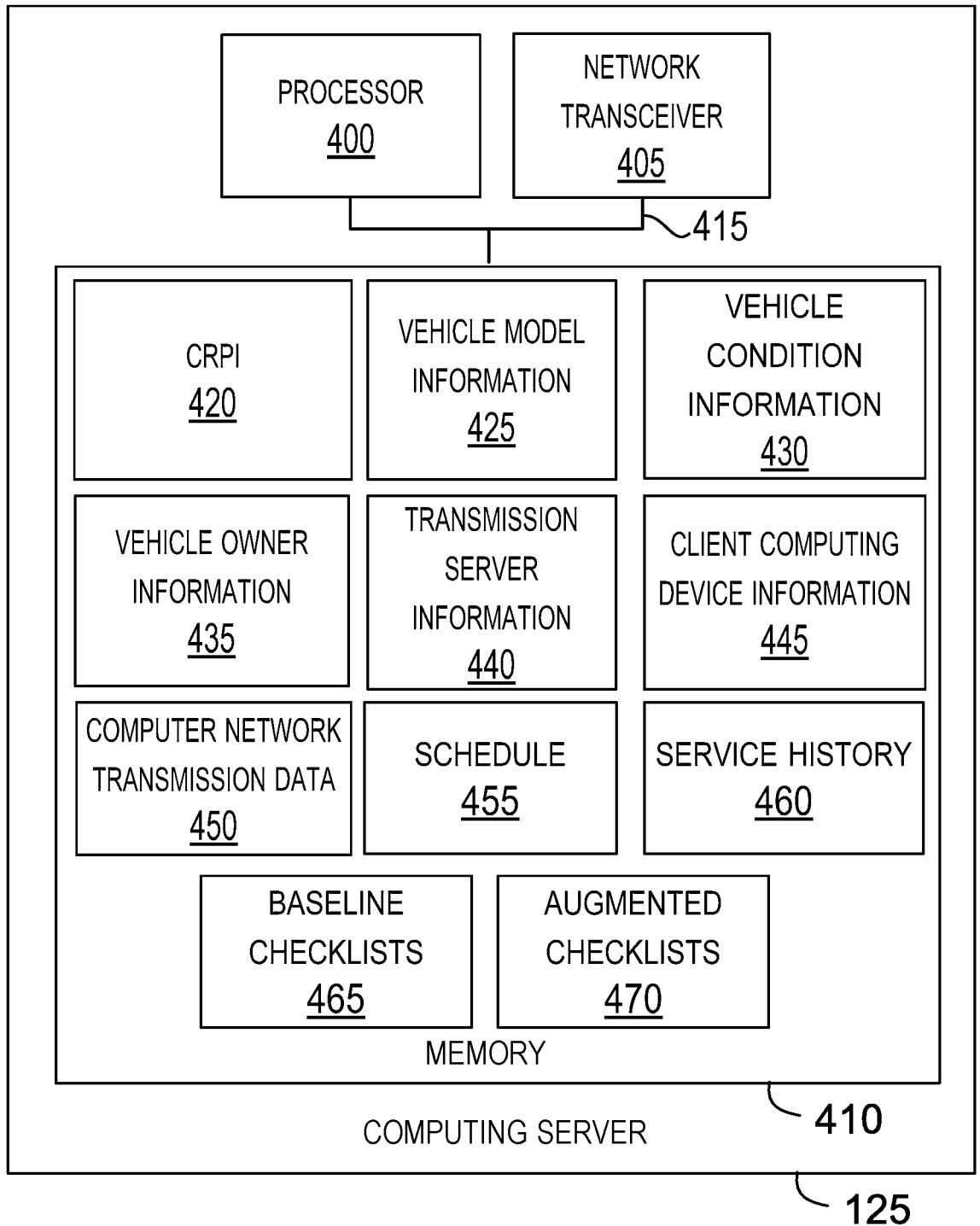

Next, FIG. 4 is a simple block diagram of the computing server 125 in accordance with the example implementations. As shown in FIG. 4, the computing server 125 includes the processor 400, the network transceiver 405, and the memory 410. Two or more of the aforementioned components can be operatively coupled together via a system bus, network, or other connection mechanism 415. Aspects regarding the processor 400, the network transceiver 405, and the memory 410 are discussed above. The computing server 125 can include a component of the computing device 1600 shown in FIG. 16. The computing server 125 can include a component of the computer program product 1700 shown in FIG. 17.

The memory 410 can include CRPI 420, vehicle model information 425, vehicle condition information 430, vehicle owner information 435, transmission server information 440, client computing device information 445, computer network transmission data 450, a schedule 455, a service history 460, baseline checklists 465, and augmented checklists 470.

The CRPI 420 can include program instructions executable by the processor 400 to carry out any one or more functions described herein and/or represented by the figures as being performed, at least in part, by the computing server 125 and/or a component of the computing server 125.

The CRPI 420 can include program instructions executable to receive CNT via the computer network 110 and parse the received CNT to obtain data contained within the received CNT. The data contained within the CNT can include vehicle model information that the processor 400 causes to be stored in the vehicle model information 425, vehicle owner information that the processor 400 causes to be stored in the vehicle owner information 435, and/or vehicle condition information that the processor 400 causes to be stored in the vehicle condition information 430. The CRPI 420 can include program instructions executable to determine a baseline checklist, generate an augmented checklist, and/output a baseline and/or augmented checklist.

The vehicle model information 425 can include a variety of data regarding a vehicle. As an example, the vehicle model information 425 can include any of the vehicle model information 925 shown in FIG. 9, the vehicle model information 1025 shown in FIG. 10, or the vehicle model information 1110 shown in FIG. 11.

As another example, the vehicle model information 425 can include repair data indicating prior repairs made to vehicles. The computing server 125 can determine that repair data from repair orders obtained from repair shops. Moreover, the computing server 125 can analyze the repair data to determine trends in the repair data, such as the highest frequency repairs performed to a group of like vehicles.

FIG. 22 shows a list 426 of highest frequency repairs in accordance with the example implementations. For purposes of this example, the repairs shown in the list 426, from top to bottom, are arranged according to a quantity of occurrences each repair was performed from greatest quantity to lowest quantity. The list 426 includes the acronyms PCV and TPMS. Those acronyms represent "positive crankcase ventilation" and "tire pressure monitor system," respectively. Repair subsets 427, 428, 429 are identified in FIG. 22. The repair subset 427 represents the top five highest frequency repairs in the list 426. The repair subject 428 includes the top five highest frequency repairs in the list 426 that are not represented within the maintenance schedule 1820. The repair subset 429 includes the top five highest frequency repairs in the list 426 that are not represented within the maintenance schedule 1820, but that are associated with a mileage range associated with the maintenance schedule 1820.

FIG. 22 shows mileage values associated with the repairs shown in the list 426. Those mileage values are represented in different configurations. For example, the mileage value 431 can be a mean mileage value representing a mean number of miles between oil changes for vehicles having the YMM 2005 Lexus ES 330. As another example, the mileage value 432 can be a range of mile values representing a range of odometer readings during which all or some amount other than all of the replace license plate light repairs were made. In some implementations, the mileage values 89,000 and 101,000 of the mileage value 432 can be values that are a number of standard deviations away from a mean mileage value of 95,000 miles. As yet another example, the mileage value 433 can be a mean mileage value associated with a threshold mileage value, such as a threshold mileage value equal to 5,000 miles.

The computing server 125 can determine the highest frequency repairs performed to a group of like vehicles having odometer readings within a particular range of odometer readings on vehicles of the group of like vehicles. As an example, the particular range of odometer readings can be based on a mileage range associated with a maintenance schedule and/or a baseline checklist and an odometer reading of the vehicle that is to be serviced. As another example, the particular range of odometer readings can be based on a mileage range based on an odometer reading of the vehicles that is to be serviced plus or minus a threshold quantity of miles.

The vehicle condition information 430 can include a variety of data regarding an operating condition of a vehicle.

As an example, the vehicle condition information 430 can include a DTC identifier reported by an ECU within a vehicle, and/or a PID and PID data value associated with the PID from an ECU within the vehicle. As another example, the vehicle condition information 430 can include a vehicle condition regarding the vehicle reported via a user comment contained in a computer network transmission.

The vehicle owner information 435 can include data regarding a vehicle owner. As an example, the vehicle owner information 435 can include any of the vehicle owner information 920 shown in FIG. 9, the vehicle model information shown in FIG. 10, or the vehicle owner information 1105 shown in FIG. 11.

The transmission server information 440 can include data regarding a transmission server that communicates with the computing server 125, such as the transmission server 120. As an example, the transmission server information 440 can include data (e.g., an IP address and port of the transmission server 120) the processor 400 uses to determine where to send a CNT so that the computing server 125 can send a response to the transmission server, such as a registration request or alert response. The data regarding a transmission server can be associated with vehicle owner information or vehicle model information associated with the vehicle.

The client computing device information 445 can include data the processor 400 uses to determine where to send a CNT destined for the client computing device 130, such as an IP address of the client computing device 130. The client computing device information 445 can be associated with vehicle owner information or vehicle model information associated with the vehicle identified in a CNT the computing server 125 receives from the transmission server 120.

The computer network transmission data 450 can include data of a CNT received by the computing server 125, which can include data contained within a CNT 615, 625 shown in FIG. 6, or a CNT 710, 720 shown in FIG. 7. The computer network transmission data 450 can include data of a CNT to be transmitted by the computing server 125, which can include data contained within a CNT 620, 630 shown in FIG. 6, or a CNT 715, 725 shown in FIG. 7. In other words, computer network transmission data 450 can include data selected from vehicle owner information, vehicle model information, or vehicle condition information. The data of a CNT transmitted to a client computing device can include a baseline checklist or an augmented checklist.

The schedule 455 can include a schedule the computing server 125 generates, maintains, and provides to the client computing device 130 for the repair shop 135. As an example, the schedule 455 can include any of the following schedule data: regular business hours data, holiday setup data, appointment data, appointment state data, shop resource usage data, technician setup data, employee data, calendar data, or customer data. The customer data can include the vehicle condition data reported by the customer's vehicle. The schedule 455 can include schedules for multiple repair shops.

The service history 460 can include service history data for one or more vehicles. The service history data for each vehicle can include data indicative of one or more service procedures performed on that vehicle. The service history 460 can include odometer readings and/or a data indicative of when a service procedure was performed on a vehicle. The service history data for each vehicle can include data indicative of the vehicle, the vehicle being one of a group of like vehicles, and/or a person associated with the vehicle, such as a vehicle owner. The service history 460 can include data indicative of vehicle components replaced, repaired, reset, calibrated, programmed and/or otherwise serviced on the vehicle. The service history 460 can represent a service procedure using a labor operation code or some other descriptor.

Turning to FIG. 20, this figure shows a service history 200 for a vehicle identified with vehicle identification data 202. In FIG. 20, the vehicle identification data 202 includes a YMM identifier, in which a year identifier is "2005," a make identifier is "Lexus" and a model identifier is "ES 330." The vehicle identification data 202 also includes a VIN and engine identification data regarding an engine installed within the vehicle. The service history 200 includes multiple service procedure identifiers 204A, 204B, 204C, 204D, 204E, 204F, 204G, 204H, 204I, 204J, 204K, 204L, 204M. In the example shown in FIG. 20, each of the service procedure identifiers 204A to 204M includes an odometer value in miles, a date, and at least one indicator of as service procedure performed to the identified vehicle. In other implementations, odometer values in a service history can be specified in kilometers or some other units other than or in addition to miles. The processor 400 can use the service history 200 to determine recent service procedures performed to the vehicle within a threshold amount of time and/or a threshold amount of miles driven with respect to a current date and/or current mileage of the vehicle. The processor 400 can use the determination of the recent service procedures when determining supplemental checklist items to include on an augmented checklist being generated by the processor 400.

Returning to FIG. 4, the baseline checklists 465 includes one or more baseline checklists for guiding a person, such as a technician, while servicing a vehicle. A baseline checklist includes original checklist items. The baseline checklists 465 are computer-readable checklists. As an example, a computer-readable checklist can include a mark-up language file, such as an extensible markup language (XML) file. A baseline checklist can, but need not necessarily include a tag to indicate an original checklist item is a checklist item and/or an original checklist item. That baseline checklist or another baseline checklist can include a tag to indicate a section header or category associated with one or more checklist items within the baseline checklist.

Turning to FIG. 21, this figure shows a list of baseline checklists 210 that can be contained within the baseline checklists 465. In FIG. 21, for simplicity, the baseline checklists 210 are identified by a prefix C and numerals 1 to 30. In accordance with the example implementations, more elaborate names could be used to identify each individual baseline checklist. The baseline checklists C1 to C10 are associated with a group of vehicles referred to in FIG. 21 simply as "G1." As an example, the vehicle group "G1" can pertain to a particular group of vehicles identified by a YMM, such as 2005/Lexus/ES 330. As another example, the vehicle group "G1" can pertain to a particular group of vehicles identified by a YMME, such as 2005/Lexus/ES 330/3.3L. The baseline checklists C11 to C20 are associated with a group of vehicles referred to in FIG. 21 simply as "G2." The baseline checklists C21 to C30 are associated with a group of vehicles referred to in FIG. 21 simply as "G3." The vehicle groups G2 and G3 can, but need not necessarily, pertain to vehicle groups identified a first YMM or YMME combination and a second YMM or YMME combination, respectively. The baseline checklists 465 can include baseline checklists for a number of vehicle groups other than three vehicle groups. Moreover, the baseline checklists 465 can include more or fewer baseline checklists than ten baseline checklists for a vehicle group.

Each of the baseline checklists C1 to C10 is associated with a respective odometer range, shown as R1 to R10 in FIG. 21 for simplicity. As an example, odometer range R1 can be 10,000 miles±5,000 miles, odometer range R2 can be 20,000 miles±5,000 miles, odometer range R3 can be 30,000 miles±5,000 miles, odometer range R4 can be 40,000 miles±5,000 miles, odometer range R5 can be 50,000 miles±5,000 miles, odometer range R6 can be 60,000 miles±5,000 miles, odometer range R7 can be 70,000 miles±5,000 miles, odometer range R8 can be 80,000 miles±5,000 miles, odometer range R9 can be 90,000 miles±5,000 miles, and odometer range R10 can be 100,000 miles±5,000 miles. As shown in FIG. 21, the baseline checklists C11 to C20 are also associated with odometer ranges R1 to R10, respectively. The baseline checklists C21 to C30 are associated with odometer ranges R11 to R20, respectively. As an example, odometer range R11 can be 15,000 miles±7,500 miles, odometer range R12 can be 30,000 miles±7,500 miles, odometer range R13 can be 45,000 miles±7,500 miles, odometer range R14 can be 60,000 miles±7,500 miles, odometer range R15 can be 75,000 miles±7,500 miles, odometer range R16 can be 90,000 miles±7,500 miles, odometer range R17 can be 105,000 miles±7,500 miles, odometer range R18 can be 120,000 miles±7,500 miles, odometer range R19 can be 135,000 miles±7,500 miles, and odometer range R20 can be 150,000 miles±7,500 miles. FIG. 21 shows the odometer ranges R1 to R20 in order to show that different vehicle groups can be associated with different odometer ranges.

Turning to FIG. 26, a markup language file 750 in accordance with the example implementations is shown. The markup language file 750 includes a baseline checklist, such as the baseline checklist shown in FIG. 23. The markup language file 750 includes tags 752, 754, 756, 758, 760, and 762. The tag 752 indicates the markup language file includes a baseline checklist. The tag 754 includes vehicle identifying information. The tag 754 indicates the text in the markup language file 750 is in the form of YMM. The tags 756 indicate sections headers within the baseline checklist. The tags 758 indicate the checklist items are original checklist items (OCI). The tags 760 indicate a results indicator for the checklist item is pass/fail. The tags 762 indicate a results indicator for the checklist item is completed.

Returning to FIG. 4, the augmented checklists 470 include one or more augmented checklists. The augmented checklists 470 are computer-readable checklists. Similar to the baseline checklists 465, the augmented checklists can include a mark-up language file, such as an XML file. An augmented checklist can include one or more supplemental checklist items not included within a baseline checklist upon which the augmented checklist is based. An augmented checklist can, but need not necessarily include a tag to indicate an original checklist item is a checklist item and/or an original checklist item. That baseline checklist or another baseline checklist can include a tag to indicate a section header or category associated with one or more checklist items within the baseline checklist. An augmented checklist can, but need not necessarily include a tag to indicate a checklist item in the augmented checklist is a supplemental checklist item.

Turning to FIG. 27, a markup language file 770 in accordance with the example implementations is shown. The markup language file 770 includes an augmented checklist, such as the augmented checklist shown in FIG. 24. The markup language file 770 includes tags 754, 756, 758, 760, 762, 772, 774, and 776. The tags 754, 756, 758, 760 are described above. The tag 772 indicates the markup language file includes an augmented checklist. The tag 774 indicates a footnote pertains to the OCI for Air Cleaner Element. The tags 776 indicate the checklist items are supplemental checklist items (SCI). The SCI associated with the tags 776 are associated with the repairs of the repair subset 428 shown in FIG. 22.

Figure 5A:
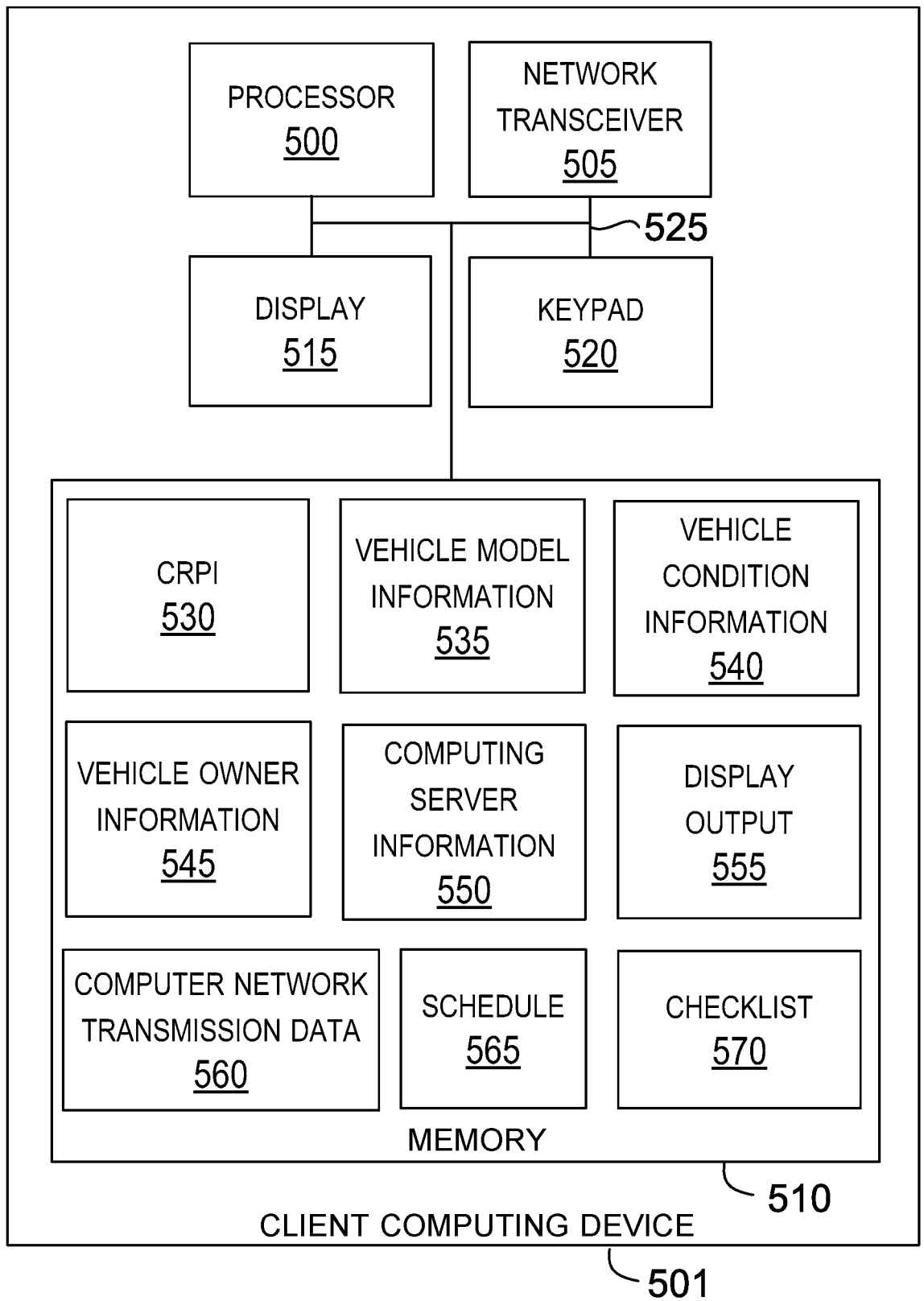
FIG. 5A and FIG. 5B are simple block diagrams of a client computing device in accordance with the example implementations.
Figure 5B:
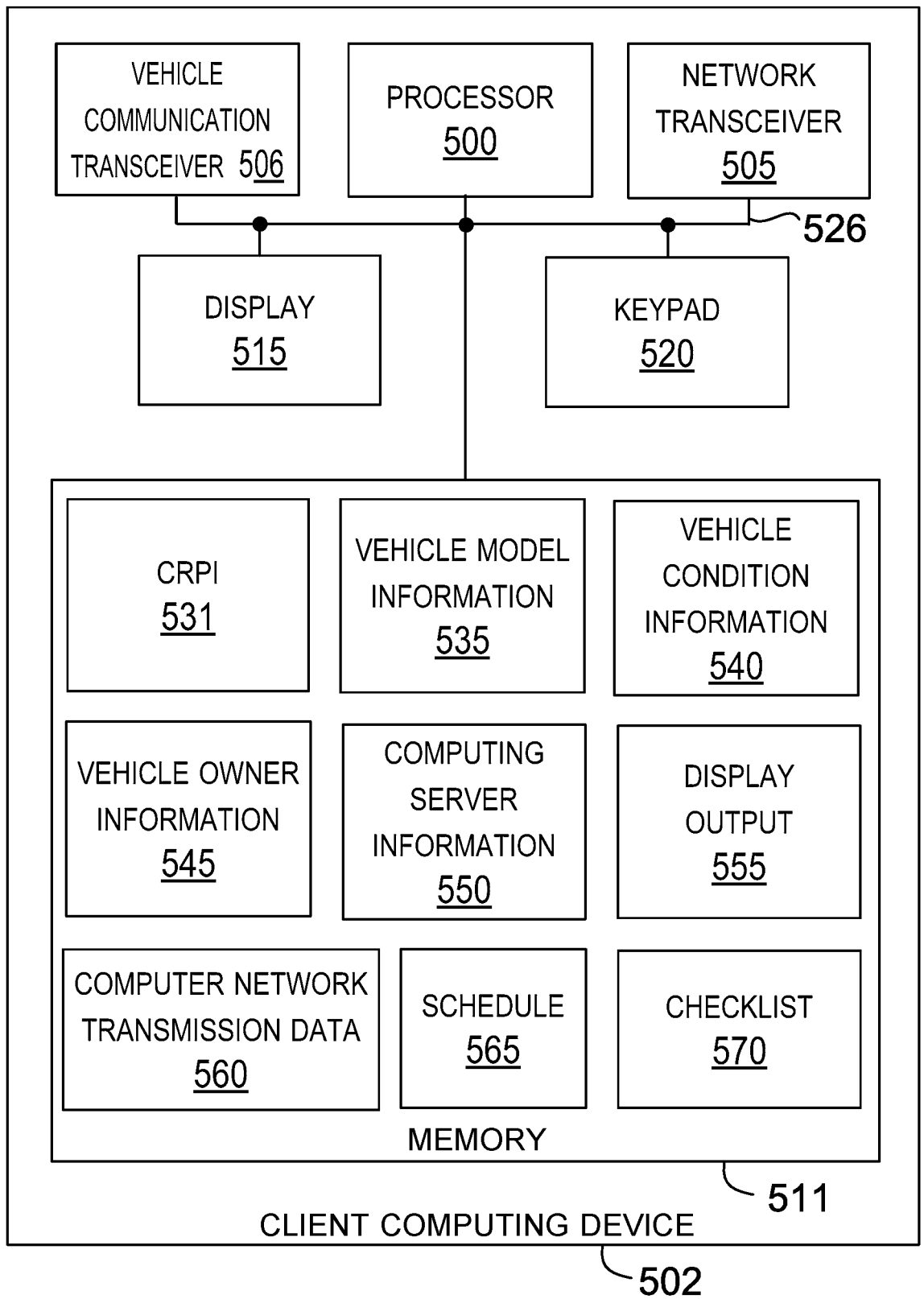

Next, FIG. 5A and FIG. 5B are simple block diagrams of a client computing device 501, 502, respectively, in accordance with the example implementations. As shown in FIG. 5A, the client computing device 501 includes the processor 500, the network transceiver 505, the memory 510, a display 515, and a keypad 520. Two or more of the aforementioned components shown in FIG. 5A can be operatively coupled together via a system bus, network, or other connection mechanism 525. As shown in FIG. 5B, the client computing device 502 includes the processor 500, the network transceiver 505, a vehicle communication transceiver 506, the memory 511, a display 515, and a keypad 520. Two or more of the aforementioned components shown in FIG. 5B can be operatively coupled together via a system bus, network, or other connection mechanism 526. Aspects regarding the processor 500, the network transceiver 505, and the memory 510, 511 are discussed above. The client computing device 501, 502 can include a component of the computing device 1600 shown in FIG. 16. The client computing device 501, 502 can include a component of the computer program product 1700 shown in FIG. 17. The client computing device 130 shown in FIG. 1 can be configured like the client computing device 501, 502.

The memory 510 includes CRPI 530, vehicle model information 535, vehicle condition information 540, vehicle owner information 545, computing server information 550, a display output 555, a computer network transmission data 560, a schedule 565, and a checklist 570. The CRPI 530 include programs instruction executable by the processor 500.

The memory 511 includes CRPI 531, vehicle model information 535, vehicle condition information 540, vehicle owner information 545, computing server information 550, a display output 555, a computer network transmission data 560, a schedule 565, and a checklist 570. The CRPI 530 include programs instruction executable by the processor 500.

As an example, the client computing device 501 can include, or can be configured as, a desktop computing system, such as an OptiPlex® 9020 Mini Tower desktop computing system available from Dell Computer Corporation, Austin, Texas, or some other desktop computing system. The client computing device 501 can include, or can be configured as, a laptop computing system, such as the Dell Chromebook desktop computing system available from Dell Computer Corporation, or some other laptop computing system.

As an example, the client computing device 501 can include, or can be configured as, a smartphone (e.g., an example smartphone listed above). As another example, the client computing device 501 can include, or can be configured as, a tablet device (e.g., an example table device listed above).

The display 515 can include one or more displays. As an example, the display 515 can include a capacitive touch display, a resistive touch display, a plasma display, a light emitting diode (LED) display, a cathode ray tube display, an organic light-emitting diode (OLED) display, such as an active-matrix OLED or a passive-matrix OLED, or a backlit color liquid crystal display (LCD) having a resistive touch or panel. In some implementations, data or selections can be entered at the client computing device 501, 502 by way of a stylus in contact with the display 515 and/or a person touching the display 515.

The keypad 520 can include a keyboard or a pointing device. The keyboard can include, or can be configured as, a wired or wireless QWERTY keyboard or some other keyboard for entering data or selections into the client computing device 501, 502. The pointing device can include, or can be configured as, a wired or wireless computer mouse. As an example, the keypad 520 can select an accept selector 910 (shown in FIG. 9) or a decline selector 915 (shown in FIG. 9). Other examples of entering data or selections using the client computing device 501, 502 are also possible.

The CRPI 530 can include program instructions executable by the processor 500 to carry out any one or more functions described herein and/or represented by the figures as being performed, at least in part, by the client computing device 501 or a component of the client computing device 501.

The CRPI 530 can include program instructions to receive CNT via the computer network 110 and parse the received CNT to obtain data contained within the received CNT. The data contained within the received CNT can include vehicle model information that the processor 500 causes to be stored in the vehicle model information 535, vehicle owner information that the processor 500 causes to be stored in the vehicle owner information 545, or vehicle condition information that the processor 500 causes to be stored in the vehicle condition information 540.

The vehicle model information 535 can include a variety of data regarding a vehicle. As an example, the vehicle model information 535 can include any of the vehicle model information 925 shown in FIG. 9, the vehicle model information 1025 shown in FIG. 10, or the vehicle model information 1110 shown in FIG. 11.

The vehicle condition information 540 can include a variety of data regarding an operating condition of a vehicle. As an example, the vehicle condition information 540 can include a DTC identifier reported by an ECU within a vehicle, or a PID and PID data value associated with the PID from an ECU within the vehicle. As another example, the vehicle condition information 540 can include a vehicle condition regarding the vehicle reported via a user comment contained in a computer network transmission.

The vehicle owner information 545 can include data regarding a vehicle owner. As an example, the vehicle owner information 545 can include any of the vehicle owner information 920 shown in FIG. 9, the vehicle model information shown in FIG. 10, or the vehicle owner information 1105 shown in FIG. 11.

The computing server information 550 can include data the processor 500 uses to determine where to send a CNT destined for the computing server 125, such as an IP address of the computing server 125. The computing server information 550 can include the address information contained within a CNT the client computing device 501, 502 receives from the computing server 125.

The display output 555 can include the data populated in each display output shown in any of the figures. Each display output can include a graphical user interface (GUI). Each display output can include a markup language file (e.g., a hyper-text markup language file including a browser page) transmitted to the client computing device 501, 502 from the computing server 125. The display output 555 can include one or more style sheet files, such as one or more cascading style sheet files having a "css" file type extension for indicating how a display output should be displayed on the display 515.

The computer network transmission data 560 can include data of a CNT received by the client computing device 501, 502, which can include data contained within a CNT 620 shown in FIG. 6, or a CNT 715 shown in FIG. 7. The computer network transmission data 560 can include data of a CNT to be transmitted by the client computing device 501, 502, which can include data contained within a CNT 625 shown in FIG. 6, or a CNT 720 shown in FIG. 7. In other words, computer network transmission data 560 can include data selected from vehicle owner information, vehicle model information, or vehicle condition information.

The schedule 565 can include any portion of the schedule 455 stored in the computing server 125 that the computing server 125 transmits to the client computing device 501, 502 and that the client computing device 501 stores in the memory 510 or the client computing device 502 stores in the memory 511. The schedule 565 can include a single output display (e.g., a single page) of the schedule maintained for the repair shop 135. Alternatively, the schedule can include multiple output displays of the schedule maintained for the repair shop 135. The keypad 520 can be used to cycle through the multiple output displays stored in the schedule 565.

The checklist 570 can include one or more checklists. In particular, the checklist 570 can include one or more baseline checklists and/or one or more augmented checklists. The checklists contained within the checklist 570 can include one or more checklists the client computing device 501, 502 receives from the computing server 125. The checklists 570 can include result indicators selected for checklists output on the display 515.

The CRPI 531 can include program instructions executable by the processor 500 to carry out any one or more functions described herein and/or represented by the figures as being performed, at least in part, by the client computing device 502 or a component of the client computing device 502. The CRPI 531 can include the CRPI 530 or any portion of the CRPI 530. The CRPI 531 can also include program instructions executable by the processor 500 to cause the vehicle communication transceiver 506 to transmit a VDM and/or to cause the vehicle communication transceiver 506 to receive a VDM. The CRPI 531 can include instructions executable by the processor 500 determine content included within a VDM, such as vehicle identifying information, a diagnostic trouble code, and/or a PID and PID value. The CRPI 531 can include instructions executable by the processor 500 to generate a VDM to be transmitted by the vehicle communication transceiver 506, such as a VDM including a request for vehicle identifying information, a diagnostic trouble code, and/or a PID and PID value. The CRPI 531 can include program instructions executable to determine a checklist item result entered via the display 515, the keypad 520, or another component of the client computing device 502.

III. Example Computer Network Transmission Flows

Next, FIG. 6 is a diagram of a computer network transmission flow 600 performed by a request initiator 605, the transmission server 120, the computing server 125 and the client computing device 130. The request initiator 605 can include the vehicle 115, 215A, 215B, 215C, the network communication device 225, 255, or another computing device (not shown) connectable to the computer network 110, such as a smart phone, a tablet device, a desk top computer or some other computing device that can communicate over the computer network 110. The computer network transmission flow 600 includes a computer network transmission (CNT) 610, a CNT 615, a CNT 620, a CNT 625, a CNT 630, and a CNT 635.

The CNT 610 includes a registration request sent by the request initiator 605 to the transmission server 120. The registration request of the CNT 610 can include information regarding a vehicle, information regarding a vehicle owner, and an identifier of the repair shop 135. The CNT 615 includes a registration request sent by the transmission server 120 to the computing server 125. The registration request of the CNT 615 can include the information regarding the vehicle, the information regarding the vehicle owner, and the identifier of the repair shop 135 that are contained within the CNT 610. The registration request of the CNT 620 can include the information regarding the vehicle and the information regarding the vehicle owner that are contained within the CNT 610 and the CNT 615.

The CNT 625 includes a response to the registration request sent by the client computing device 130 to the computing server 125. The CNT 630 includes a response to the registration request sent by the computing server 125 to the transmission server 120. The CNT 635 includes a response to the registration request sent by the transmission server 120 to the request initiator 605. The response to the registration request in each of the CNT 625, 630, and 635 can indicate the registration request is accepted or the registration request is declined.

Next, FIG. 7 is a diagram of a computer network transmission flow 700 performed by a vehicle 735, the transmission server 120, the computing server 125 and the client computing device 130. The computer network transmission flow 700 includes a computer network transmission (CNT) 705, a CNT 710, a CNT 715, a CNT 720, a CNT 725, and a CNT 730. The CNT 705 is transmitted by the vehicle 115 to the transmission server 120 and the CNT 730 is transmitted by the transmission server 120 to the vehicle 115. The vehicle 735 represents any example vehicle described in this description or shown in the figures. Accordingly, the CNT 705 transmitted by the vehicle 735 can be transmitted by the network communication device 225, 255, and the CNT 730 can be received by the network communication device 225, 255.

The CNT 705 includes vehicle data reported by the vehicle 735. The vehicle data reported by the vehicle 735 can include vehicle condition information. The vehicle data reported by the vehicle 735 can, for example, include a DTC identifier reported by an ECU within the vehicle 735, or a PID and PID data value associated with the PID. The CNT 705 can include other data for reporting in an alert to the client computing device 130, such as vehicle owner information and/or vehicle model information.

The CNT 710 includes vehicle data reported by the vehicle 735. The transmission server 120 can determine that the vehicle data reported by the vehicle 735 is to be transmitted to the computing server 125. That determination can, for example, be based on the vehicle owner indicated by the vehicle owner information or the vehicle identified by the vehicle model information being associated with the computing server 125, the client computing device 130, or the repair shop 135 as a result of a registration request of that vehicle owner or vehicle.

The CNT 715 includes vehicle data reported by the vehicle 735. The computing server 125 can determine that the vehicle data reported by the vehicle 735 is to be transmitted to the client computing device 130. That determination can, for example, be based on the vehicle owner indicated by the vehicle owner information or the vehicle identified by the vehicle model information being associated with the client computing device 130 or the repair shop 135 as a result of a registration request of that vehicle owner or vehicle. The client computing device 130 can display a display output, such as the display output 1000, including an alert in response to receiving the CNT 715.

The CNT 720, 725, CNT 730 include an alert response. The client computing device 130 transmits the CNT 720 to the computing server 125. The computing server 125 transmits the CNT 725 to the transmission server 120. The transmission server 120 transmits the CNT 730 to the vehicle 735. The alert response of the CNT 720, 725, 730 can include data indicating the repair shop received the vehicle data the vehicle transmitted via the CNT 705. The data within the alert response of the CNT 720, 725, 730 can indicate the repair shop will contact the vehicle owner.

A method of the example implementations can include performing the computer network transmission flow 600 followed by the computer network transmission flow 700. A method of the example implementations, performed by a vehicle, can include (i) transmitting the CNT 610, receiving the CNT 635, and/or (ii) transmitting the CNT 705 and receiving the CNT 730. A method of the example implementations, performed by the transmission server 120, can include (i) receiving the CNT 610, transmitting the CNT 615, receiving the CNT 630, and transmitting the CNT 635, and/or (ii) receiving the CNT 705, transmitting the CNT 710, receiving the CNT 725, and transmitting the CNT 730. A method of the example implementations, performed by the computing server 125, can include (i) receiving the CNT 615, transmitting the CNT 620, receiving the CNT 625, and transmitting the CNT 630, and/or (ii) receiving the CNT 710, transmitting the CNT 715, receiving the CNT 720, and transmitting the CNT 725. A method of the example implementations, performed by the client computing device 130 can include (i) receiving the CNT 620 and transmitting the CNT 625, and/or (ii) receiving the CNT 717 and transmitting the CNT 720. Other example methods based on at least one CNT of the computer network transmission flow 600 or the computer network transmission flow 700 are also possible.

The data transferred in a CNT shown in the computer network transmission flow 600 or the computer network transmission flow 700 can be formatted in accordance with a JavaScript Object Notation (JSON) format, an extensible markup language (XLM) format, or another data format. In an alternative implementation, an alert response from the client computing device 130 to the vehicle 735 can occur via a direct message bypassing the computing server 125 and transmission server 120, such as a text message or an e-mail message between the client computing device 130 and the vehicle 735 (e.g., the network communication device 225, 255).

IV. Example Operation

Figure 8A:
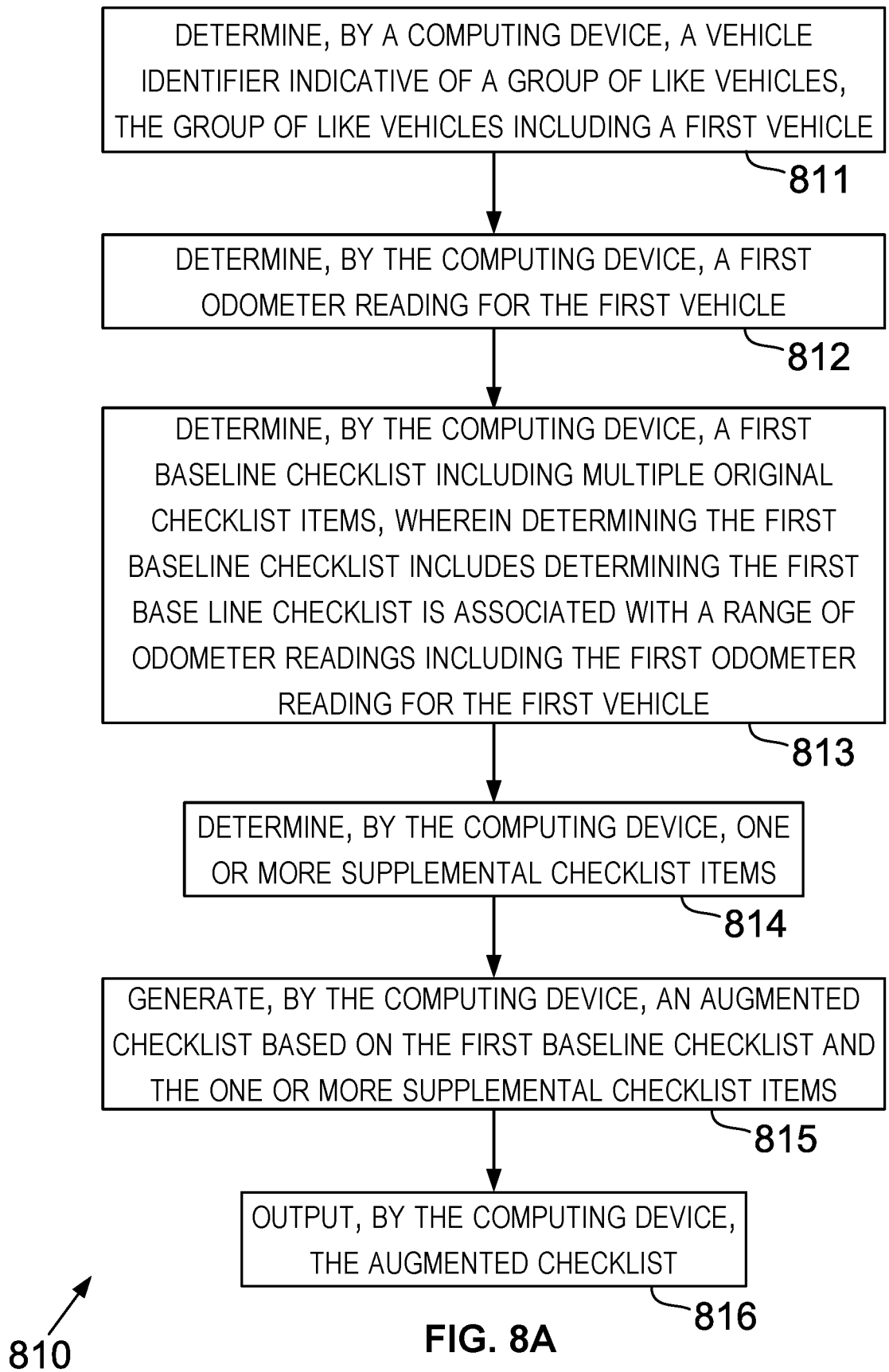
FIG. 8A and FIG. 8B are flowcharts showing sets of functions that can be carried out according to example implementations.

Next, FIG. 8A shows a flowchart showing a set of functions 810 (or more simply "the set 810") that can be carried out in accordance with the example implementations described in this description. The set 810 includes the functions shown in blocks 811, 812, 813, 814, 815, 816. The following description of the set 810 includes references to elements shown in other figures described in this description, but the functions of the set 810 are not limited to being carried out only by the referenced elements. A variety of methods can be performed using all of the functions shown in the set 810 or any proper subset of the functions shown in the set 810. Any of those methods can be performed with other functions such as one or more of the other functions described in this description. A processor can execute CRPI to perform or cause another component to perform a function or some portion of a function of the set 800.

Block 811 determining a vehicle identifier indicative of a group of like vehicles. The group of like vehicles includes a first vehicle. In accordance with the example implementations, the vehicle identifier can be arranged like any of the example vehicle identifying information described in this description. For example, the vehicle identifier can include a VIN or some portion of a VIN, such as a portion of a VIN indicating a YMM or YMME. In particular, the group of like vehicles can be a group of vehicles associated with the YMM 2005/Lexus/ES 330, and the vehicle of that group of like vehicles can be the vehicle associated with the VIN shown in FIG. 9.

In accordance with at least some of the example implementations, determining the vehicle identifier can include a network transceiver receiving a data communication including the vehicle identifier or data representing the vehicle identifier. In accordance with at least some of those implementations, the network transceiver includes the network transceiver 505, and the communication includes a communication transmitted by the client computing device 502.

Block 812 determining a first odometer reading for the first vehicle. In accordance with at least some of the example implementations, determining the first odometer reading can include a network transceiver receiving a data communication including the first odometer reading or data representing the first odometer reading. In accordance with at least some of those implementations, the network transceiver includes the network transceiver 505, and the communication includes a communication transmitted by the client computing device 502.

Block 813 determining a first baseline checklist including multiple original checklist items. Determining the first baseline checklist includes determining the first baseline checklist is associated with a range of odometer readings including the first odometer reading for the first vehicle.

Block 814 determining one or more supplemental checklist items.

Block 815 generating an augmented checklist based on the first baseline checklist and the one or more supplemental checklist items.

Block 816 includes outputting the augmented checklist.

In an example implementation including the method, determining the one or more supplemental checklist items can include determining, for each supplemental checklist item, a respective service procedure among a group of highest frequency service procedures performed to vehicles among the group of like vehicles. Each respective service procedure is different than the multiple original checklist items on the first baseline checklist. In at least some of the example implementations including the method, determining the respective service procedure can include determining the respective service procedure is associated with a range of odometer readings including the first odometer reading for the first vehicle. In at least some of the example implementations including the method, the service procedures of the highest frequency service procedures can be based on action words and components names located on repair orders pertaining to vehicles of the group of like vehicles.

In an example implementation, the method further includes determining, by the computing system, a temporal length of service associated with the first vehicle. Determining the one or more supplemental checklist items includes determining, for each supplemental checklist item, a respective service procedure among a group of service procedures associated with a temporal interval and the group of like vehicles. Each respective service procedure is different than the multiple original checklist items.

As an example, the temporal length of service can be a number of months since the first vehicle was built or put into service. For example, the temporal length of service and be twelve months, twenty-four months, thirty-six month, forty-eight months, sixty months, seventy-two months, eighty-four months, or ninety-six months. As another example, the temporal length of service can be a number of months within a threshold number of months within one of the preceding temporal lengths of service. For instance, the threshold number of months can be three months. In accordance with that example, if the temporal length of service is between ninety-three and ninety-nine months, the computing system will analyze service procedures associated with the ninety-six month temporal length of service to determine whether any of those service procedures should be added as a supplemental checklist item to the augmented checklist being generated.

In accordance with the method of the previous example implementation, the first markup language file can include a tag identifying a first category of checklist items within the first baseline checklist, and the first markup language file can be arranged such that one or more of the original checklist items within the first baseline checklist are associated with the first category of checklist items within the first baseline checklist. This method can further include determining, by the computing system, the first supplemental checklist item is associated with the first category of checklist items within the first baseline checklist. Modifying the first markup language file can further include inserting the first supplemental checklist item within the first markup language file so that the first markup language file is arranged so that the first supplemental checklist item is associated with the first category of checklist items within the first baseline checklist.

In an example implementation, the first baseline checklist is contained within a first markup language file. Each original checklist item within the first markup language file is associated with a tag indicating the original checklist item is a checklist item. Generating the augmented checklist includes modifying the first markup language file to include a first supplemental checklist item of the one or more supplemental checklist items and a tag indicating the first supplemental checklist item is a checklist item. In accordance with at least some of these implementations, the markup language file includes an XML file.

In an example implementation, the multiple original checklist items on the first baseline checklist are contained on a maintenance schedule for the group of like vehicles. The maintenance schedule can be developed by a vehicle manufacturer that manufactured the group of like vehicles.

In an example implementation, the first baseline checklist is one of multiple baseline checklists configured for inspecting any vehicle among the group of like vehicles. Each baseline checklist of the multiple baseline checklists is tailored for a different range of odometer readings.

In an example implementation, a first supplemental checklist item of the one or more supplemental checklist items is associated with a threshold odometer value. Determining the one or more supplemental checklist items includes determining that a vehicle history associated with the first vehicle does not indicate a service associated with the first supplemental checklist item was performed to the first vehicle while a second odometer reading for the first vehicle was between the first odometer reading for the first vehicle and a reference odometer reading equal to the first odometer reading for the first vehicle minus the threshold odometer value.

In an example implementation, the first baseline checklist is contained within a first markup language file. Each original checklist item within the first markup language file is associated with a tag indicating the original checklist item is a checklist item. In accordance with this implementation, the method can further include determining, by the computing system, the multiple original checklist items includes a first original checklist item associated with supplemental information not contained within the first baseline checklist. Generating the augmented checklist can include modifying the first markup language file to include the supplemental information. Moreover, modifying the first markup language file to include the supplemental information can include associating the first original checklist item with a footnote tag and adding the supplemental information as a footnote associated with the footnote tag.

In an example implementation, the first baseline checklist includes a user-selected checklist.

In at least some of the example implementations, outputting the augmented checklist includes outputting the checklist on a display, such as the display 515. Additionally or alternatively, outputting the augmented checklist includes transmitting the augmented checklist to the display and/or to a computing device including the display. Furthermore, outputting the augmented checklist includes transmitting the augmented checklist to a printer and/or printing the augmented checklist.

Figure 8B:
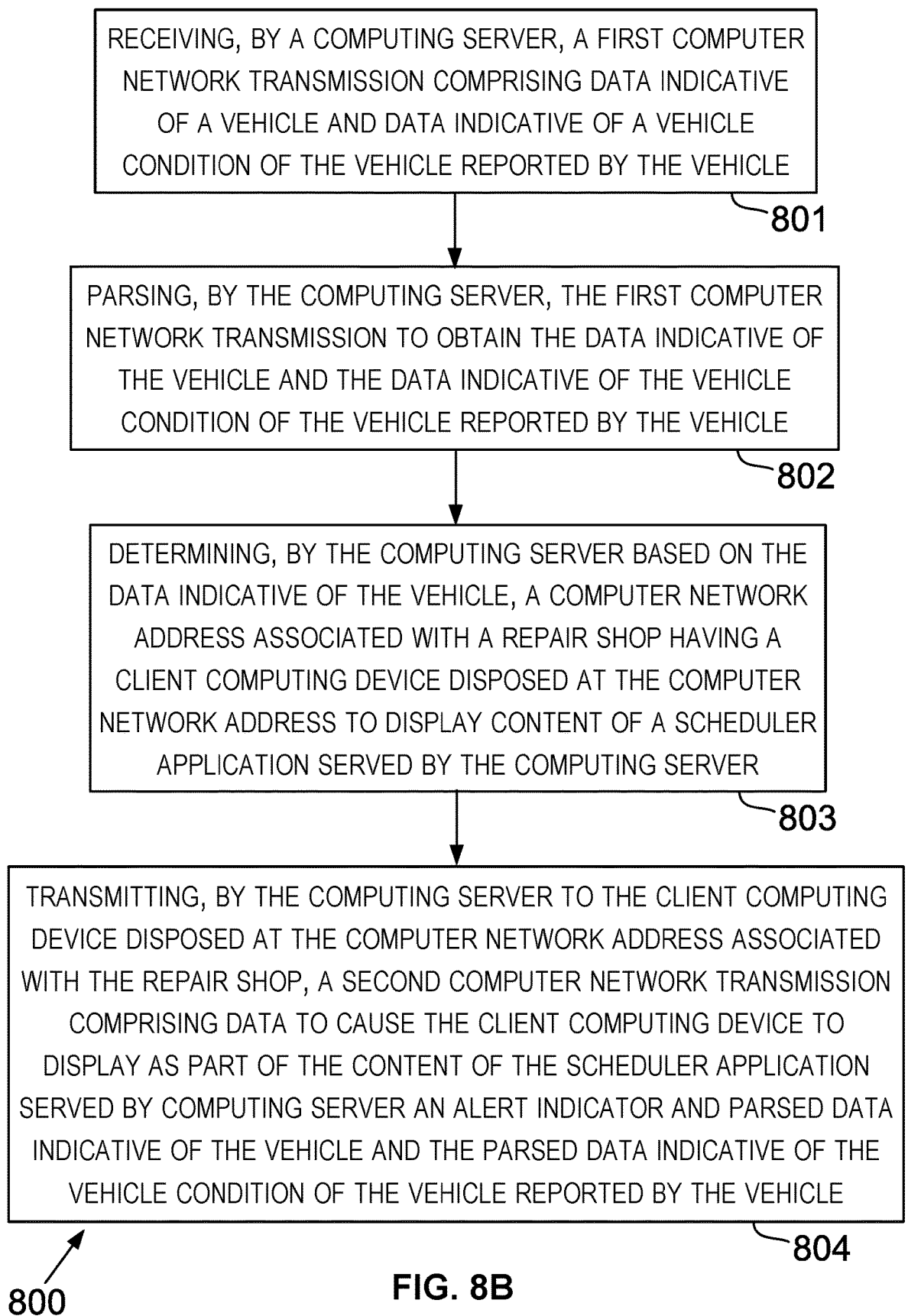

Next, FIG. 8B shows a flowchart showing a set of functions 800 (or more simply "the set 800") that can be carried out in accordance with the example implementations described in this description. The set 800 includes the functions shown in blocks 801, 802, 803, 804. The following description of the set 800 includes references to elements shown in other figures described in this description, but the functions of the set 800 are not limited to being carried out only by the referenced elements. A variety of methods can be performed using all of the functions shown in the set 800 or any proper subset of the functions shown in the set 800. Any of those methods can be performed with other functions such as one or more of the other functions described in this description. A processor can execute CRPI to perform or cause another component to perform a function or some portion of a function of the set 800.

Block 801 includes receiving, by the computing server 125, a first computer network transmission (CNT) including data indicative of a vehicle and data indicative of a vehicle condition of the vehicle reported by the vehicle. As an example, receiving the first CNT can include receiving the CNT 710. The first CNT can include a communication transmitted over an internet protocol network. An internet protocol message can be transmitted according to a transmission control protocol. The internet protocol message can include a source port of the transmitter of the message and a destination port of the message destination.

The data indicative of the vehicle can include any vehicle model information described in this description. The data indicative of the vehicle can include any vehicle owner information described in this description. The data indicative of the vehicle condition can include any vehicle condition information described in this description. As an example, the data indicative of the vehicle can include a VIN or at least a portion of a VIN. As another example, the data indicative of the vehicle can include an account identifier associated with the vehicle or an owner of the vehicle.

The data indicative of the vehicle condition of the vehicle reported by the vehicle can include data indicative of an odometer reading (e.g., a vehicle mileage or kilometer reading) and/or data indicative of a vehicle symptom. As an example, the data indicative of the vehicle symptom can include a diagnostic trouble code set within the vehicle. As another example, the data indicative of the vehicle symptom can include a parameter and a parameter identifier, such as a parameter indicative of a voltage and a PID indicative of a mass air flow sensor. As another example, the data indicative of the vehicle condition of the vehicle reported by the vehicle can include data indicative of an odometer reading reported by the vehicle.

The first CNT can be transmitted to the computing server 125 from the transmission server 120 via the computer network 110. The transmission sever can transmit the first CNT in response to receiving a CNT (e.g., the CNT 705) from a vehicle and/or a network communication device associated with the vehicle, such as the network communication device 225, 255. The network transceiver 405 can receive the first CNT and provide the first CNT to the processor 400 and/or the memory 410 for storing the first CNT within the computer network transmission data 450.

As an example, the transmission server can be operatively coupled to the network communication device operatively coupled to an electronic control unit in the vehicle, or a network communication device operatively coupled to a vehicle interface device removably connected to an on-board diagnostic connector in the vehicle. The network communication device operatively coupled to an electronic control unit in the vehicle or the network communication device operatively coupled to a vehicle interface device can include a cellular communication device.

Next, block 802 includes parsing, by the computing server 125, the first computer network transmission to obtain the data indicative of the vehicle and the data indicative of the vehicle condition of the vehicle reported by the vehicle. The data indicative of the vehicle can include various data, such vehicle model information and vehicle owner information.

Parsing the first CNT can include parsing the first CNT to obtain one or more data elements regarding a vehicle model and/or one or more data elements regarding the vehicle owner. Parsing the first CNT can include determining what each data element represents. The data elements regarding the vehicle model can, for example, include a data element representing a vehicle identification number, a vehicle manufacturer name, a vehicle model year, a vehicle model name, a vehicle component (e.g., a vehicle engine), a license plate number, or a vehicle color. The data elements regarding the vehicle condition can, for example, include a data element representing a DTC, PID, or PID data value reported by the vehicle or a non-DTC symptom entered via an application executing on the network communication device 225, 255. The processor 400 can cause the data elements parsed from the first CNT to be stored in the vehicle model information 425, the vehicle condition information 430, or the vehicle owner information 435. Each parsed data element includes data.

Next, block 803 includes determining, by the computing server 125 based on the data indicative of the vehicle, a computer network address associated with a repair shop having a client computing device disposed at the computer network address to display content of a scheduler application served by the computing server 125. The computer network address associated with the determined shop identifier can include an internet protocol address.

Table 1 shows examples of various data elements that can be stored in the memory 410. The row numbers in Table 1 are provided for reference purposes. Row 1, 2, 3, 4 include a name of an owner listed in an order of a family name followed by a given name for the vehicle owner information. Row 5 includes a customer identifier for the vehicle owner information. Rows 1, 3, 4, and 5 include a VIN for the vehicle model information. Row 2 includes a license plate number for the vehicle model information. Row 1 to row 5 show names of repair shops to represent the repair shops. Row 1 to row 3 show example IP addresses associated with the repair shops listed in those same rows. Row 4 and row 5 show the repair shop address as null to indicate the client computing device at Pat's Tire Shop is not connected to the computing server 125. The repair shop addresses shown in Table 1 can be stored in the client computing device information 445. A repair shop address for Pat's Tire Shop can be stored with the client computing device information 445 upon a user logging into the computing server 125 from a client computing device located at or associated with Pat's Tire Shop.

TABLE 1

| Vehicle Owner | Vehicle Model | Repair Shop | Repair Shop Address | Row |
|---|---|---|---|---|
| Williams, Monica | JTHBA30G955087040 | Johnson's Repair | 192.165.1.45 | 1 |
| Perez, Juan | WA 845 333X | Mitchell's Repair | 124.45.83.0 | 2 |
| Smithers, Brenda | 3FADP4EJ9BM0123456 | ACME Repair | 209.64.34.31 | 3 |
| Jefferson, Tom | 1GKDRSKDXHJ592700 | Pat's Tire Shop | Null | 4 |
| PTS01004 | 1G1KAJ2ERXEJ704841 | Pat's Tire Shop | Null | 5 |

As an example, the processor 400 can search the memory 410 to determine the vehicle owner information or vehicle model information contained within the CNT 710 is associated with the repair shop address shown in row 1 of Table 1.

Next, block 804 includes transmitting, by the computing server 125 to the client computing device 130 disposed at the computer network address associated with the repair shop 135, a second computer network transmission including data to cause the client computing device 130 to display as part of the content of the scheduler application served by computing server 125 an alert indicator and parsed data indicative of the vehicle and the parsed data indicative of the vehicle condition of the vehicle reported by the vehicle. The second CNT can include a communication transmitted over an internet protocol network.

Additional functions can be performed as part of a method that includes performing any function of the set 800. Examples of these additional functions pertaining to a function of the set 800 are described in the following five paragraphs.

An additional function pertaining to a function of the set 800 can include (i) receiving, by the computing server 125, data indicating an identifier of the odometer reading (e.g. a quantity of miles or kilometers) displayed by the client computing device 130 was selected, and (ii) transmitting, by the computing server 125, a maintenance schedule (e.g., the maintenance schedule 1820) based on the odometer reading displayed by the client computing device 130 and based on the data indicative of the vehicle to cause the client computing device 130 to display the maintenance schedule.

An additional function pertaining to a function of the set 800 can include receiving, by the computing server 125 from the client computing device 130, an input to populate a schedule of the content of the scheduler application served by the computing server 125.

An additional function pertaining to a function of the set 800 can include receiving, by the computing server 125, a third computer network transmission including a request to register the vehicle, wherein the request includes data indicative of a vehicle owner of the vehicle and data pertaining to the repair shop, and (ii) transmitting, by the computing server 125 to the client computing device 130, a fourth computer network transmission including data to cause the client computing device 130 to display a request identifier indicating the vehicle owner requested to register the vehicle with the schedule application for the repair shop. Furthermore, this additional function pertaining to a function of the set 800 can include receiving, by the computing server from the client computing device, a selection indicator indicating the request to register the vehicle is accepted by the repair shop, and storing, by the computing server, data mapping the vehicle to the repair shop. The data pertaining to the repair shop can, for example, shop include data indicating a name of the repair shop.

An additional function pertaining to a function of the set 800 can include the computing server 125 transmitting a user comment entered via a network communication device (e.g., network communication device 225, 255) operatively coupled to the transmission server 120. The user comment can be contained within the first computer network transmission.

An additional function pertaining to a function of the set 800 can include the computing server 125 receiving a geolocation identifier of the vehicle within the first computer network transmission, and transmitting the geolocation identifier of the vehicle to the client computing device 130 via the second computer network transmission.

V. Example Checklist Display Outputs

Figure 18:
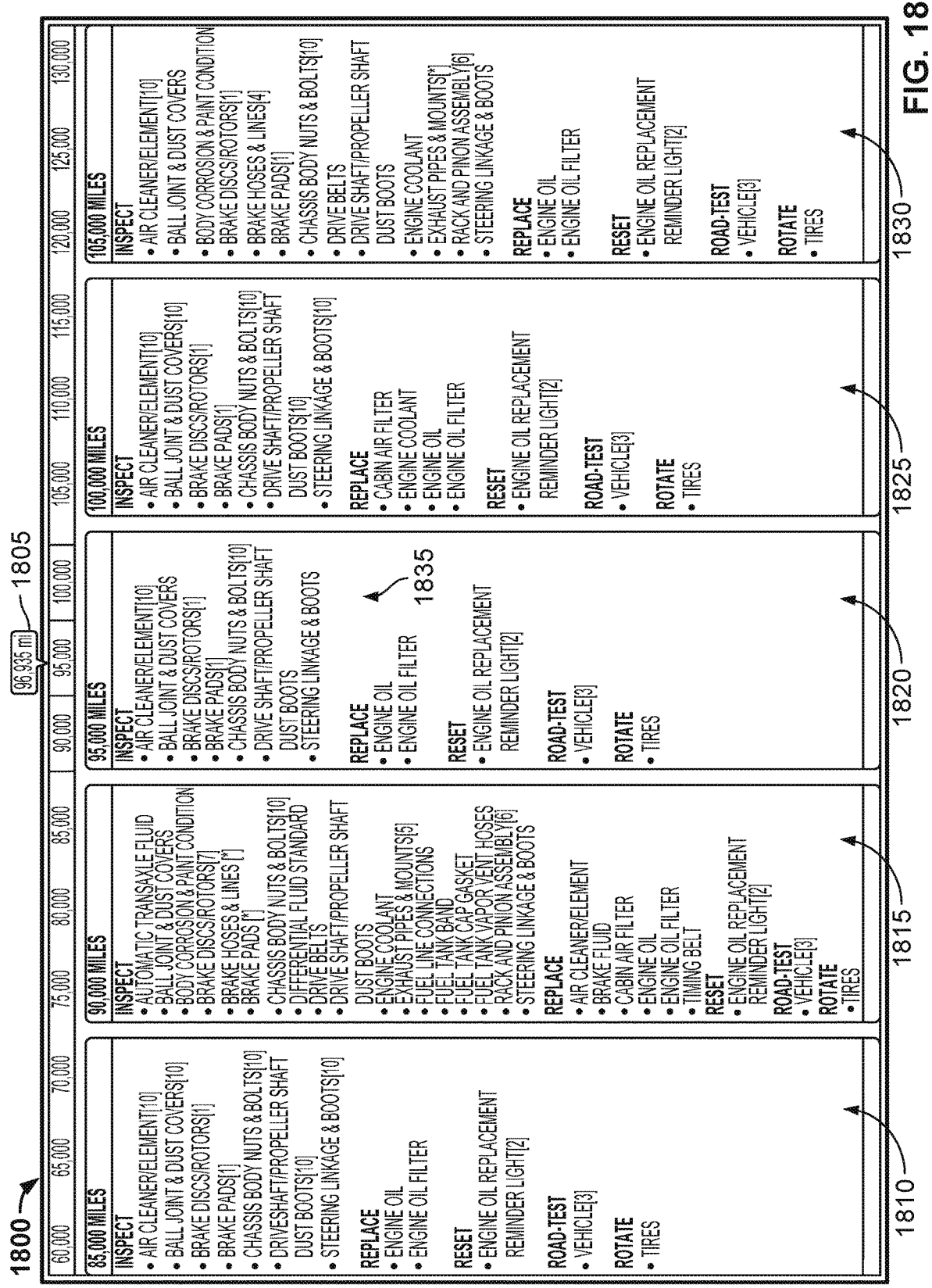
FIG. 18 and FIG. 19 show display outputs in accordance with the example implementations.

Next, FIG. 18 shows a display output 1800 in accordance with the example implementations. The client computing device 130 can display the display output 1800 on the display 515 in response to selection of the odometer reading identifier 1230. The display output includes an odometer reading identifier 1805 showing a mileage shown in the odometer reading identifier 1230. The odometer reading identifier 1805 is positioned in the display output 1800 proximate a maintenance schedule 1820 pertaining to a mileage range 85,000 to 100,000 miles. The display output 1800 can include other maintenance schedules for other mileage ranges, such as the maintenance schedule 1810 for the mileage range 60,000 to 70,000 miles, the maintenance schedule 1815 for the mileage range 70,000 to 85,000 miles, the maintenance schedule 1825 for the mileage range 100,000 to 115,000 miles, and the maintenance schedule 1830 for the mileage range 115,000 to 130,000 miles. A repair job in a displayed maintenance schedule, such as the repair job 1835 for an oil and oil filter replacement job, can be selected and added to a schedule for the vehicle identified in the display output 1200. In implementations in which the odometer reading identifier 1230 is displayed in kilometers, the ranges pertaining to the maintenance schedules can be based on kilometers instead of miles.

Figure 23:
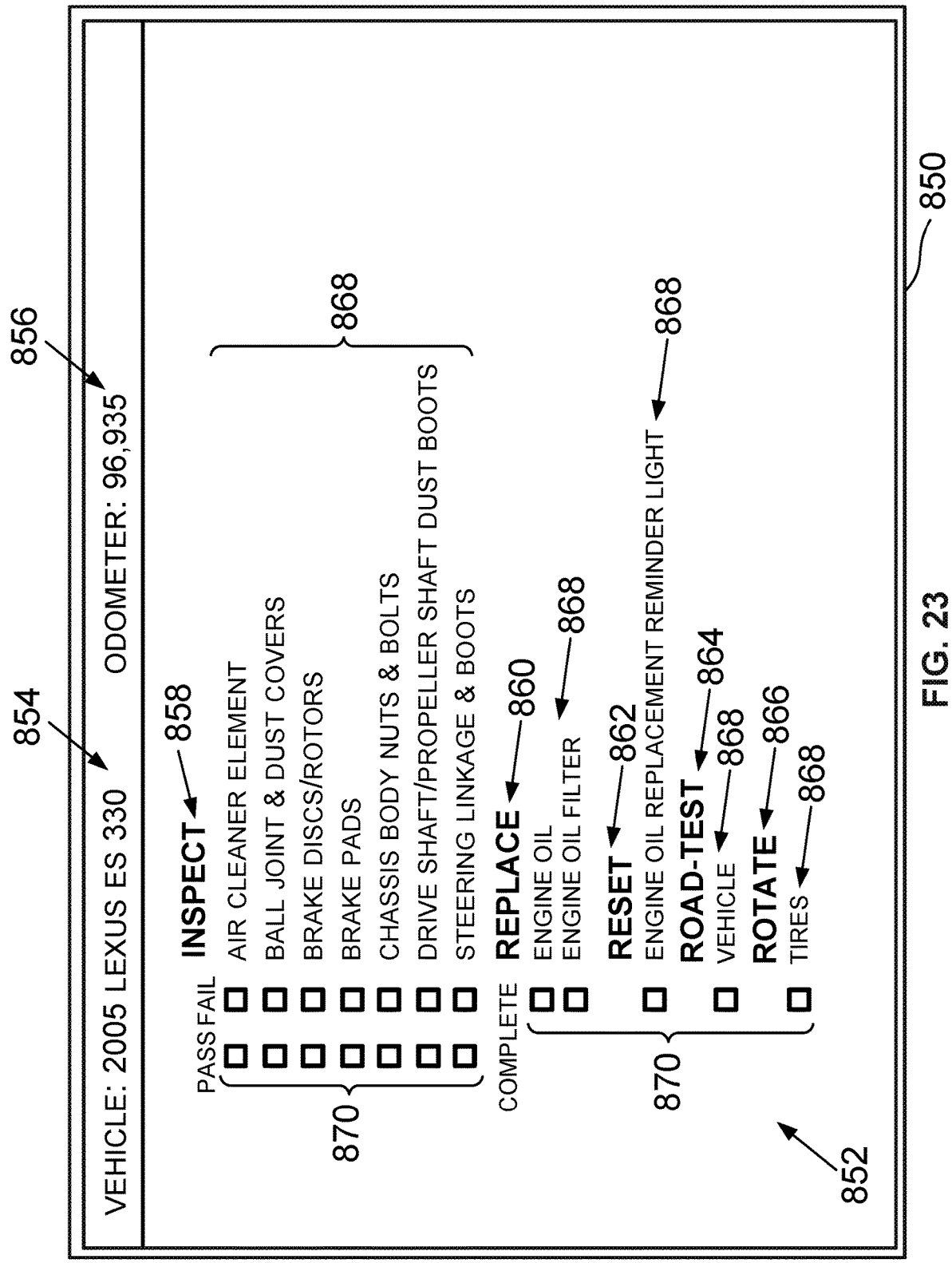
FIG. 23 shows a display output including a baseline checklist in accordance with the example implementations.

Next, FIG. 23 shows a display output 850 including a baseline checklist 852. The display output 850 includes a vehicle identifier 854 and an odometer value 856. The baseline checklist 852 can be based on a maintenance schedule for a group of vehicles including the vehicle identified by the vehicle identifier 854. The odometer value 856 shows an odometer value within the mileage range 85,000 to 100,000 miles shown on the display output. Accordingly, the baseline checklist 852 can be based on the maintenance schedule 1820. The odometer value 856 can represent an odometer reading of a vehicle that is in a repair shop to be serviced.

Figure 24:
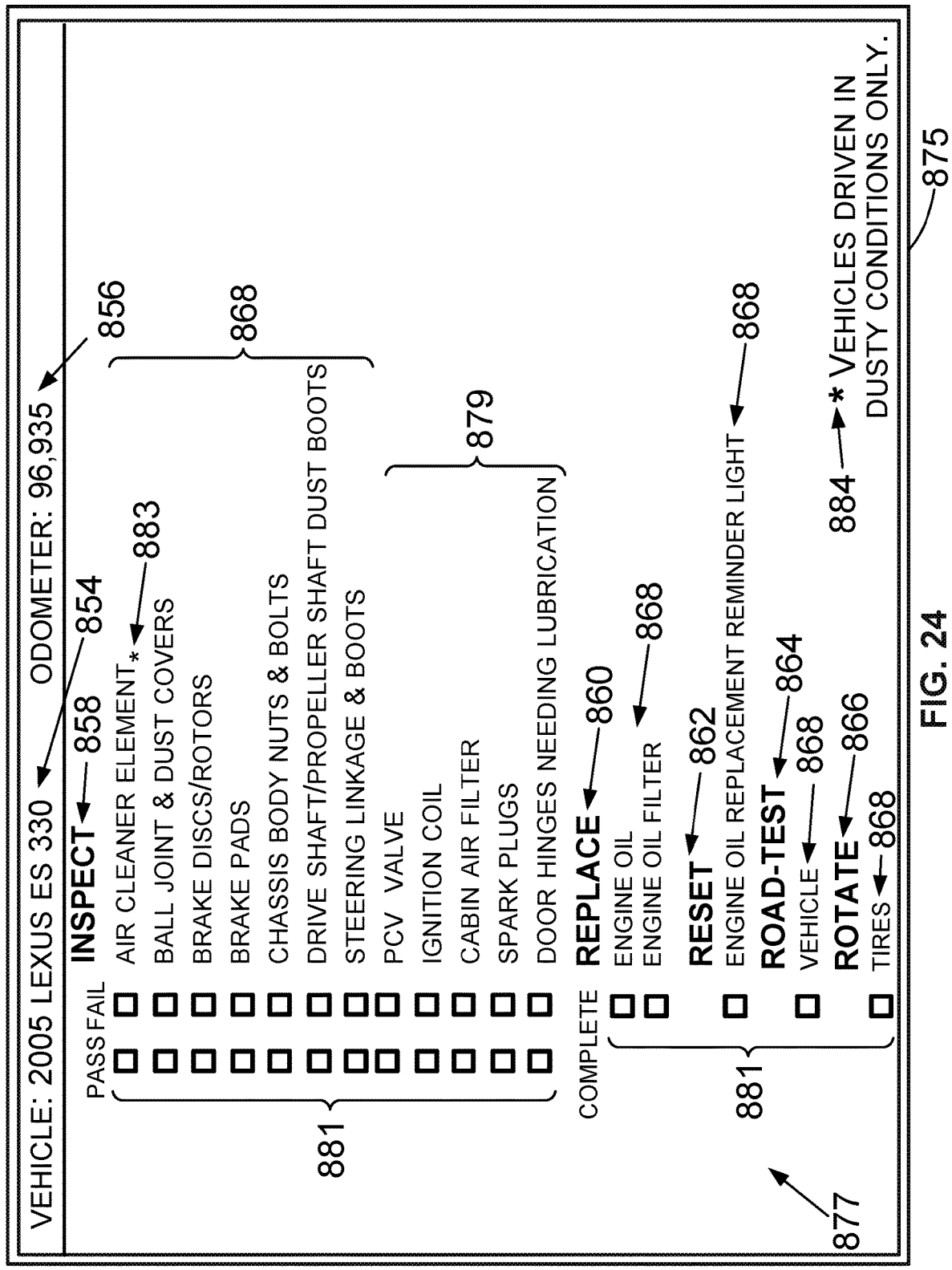
FIG. 24 and FIG. 25 show display outputs including an augmented checklist in accordance with the example implementations.
Figure 25:
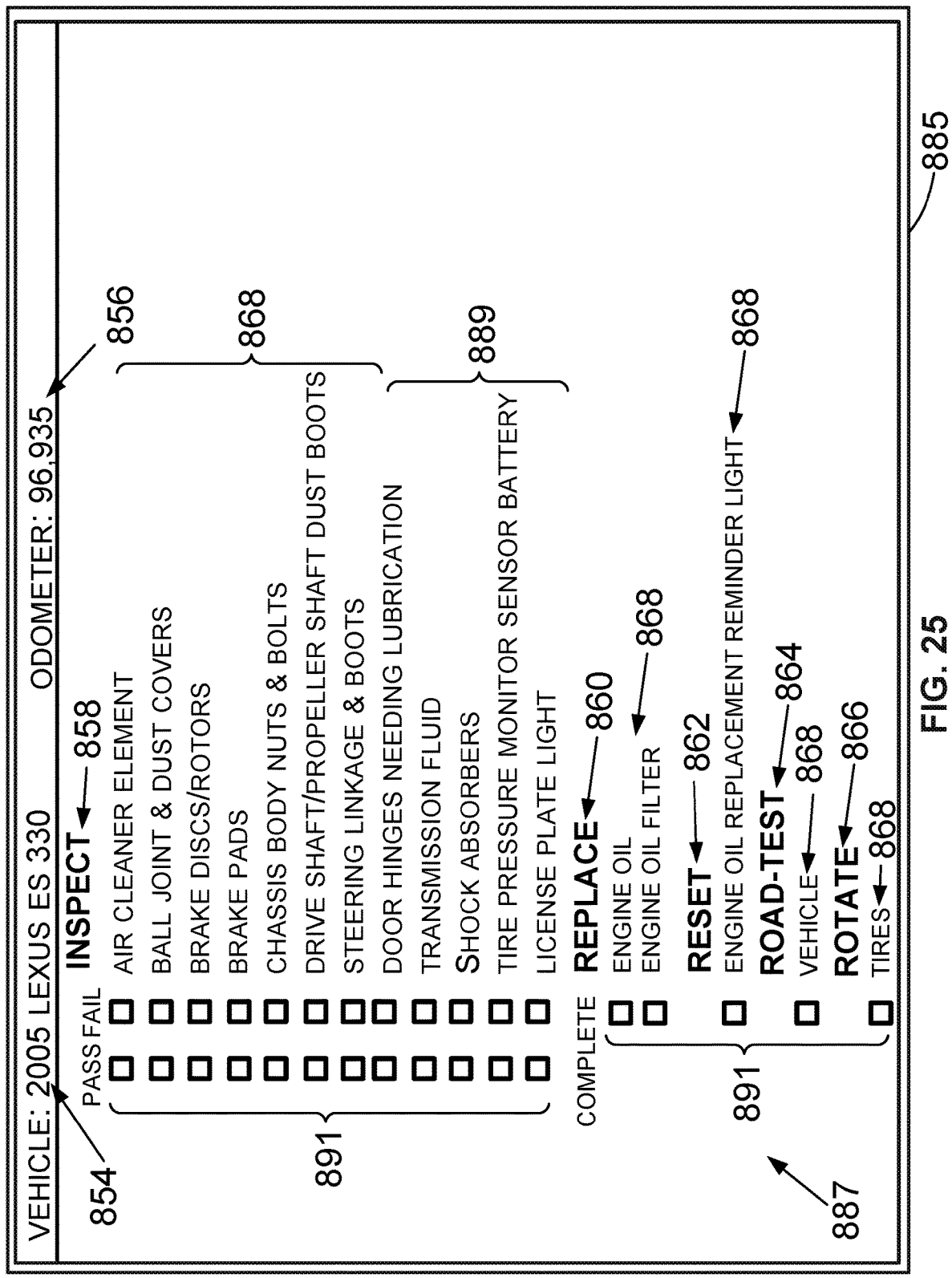

The baseline checklist 852 includes section headers 858, 860, 862, 864, 866, original checklist items 868, and result indicators 870. In some implementation, at least one checklist item, such as an original checklist item is associated with each section header. The result indicators 870 are selectable to indicate a result pertaining to each checklist item. The result can, but need not necessarily, be indicated by a checkmark, an "x", or filing in a result indicator 870. In some implementations, a section header indicates a verb (e.g., a service action). In those or in other implementations, a second header indicates a vehicle system and/or a vehicle component. In some implementations, the checklist item includes a verb (e.g., a service action) and an identifier of a vehicle system and/or vehicle component. The results indicators 870, similar to result indicators 881, 891 shown in FIG. 24 and FIG. 25 can include one or more types of result indicators. As shown in FIG. 23 to FIG. 25, the result indicators 870, 881, 891 include result indicators to indicate pass/fail or completed. Other examples of a result indicator associated with a checklist item can be included within a baseline checklist and/or an augmented checklist.

Next, FIG. 24 shows a display output 875 including an augmented checklist 877. The display output 875 includes the vehicle identifier 854 and the odometer value 856. The augmented checklist 877 can be based on the baseline checklist 852. Similar to FIG. 23, the odometer value 856 shows an odometer value within the mileage range 85,000 to 100,000 miles shown on the display output. Accordingly, the augmented checklist 877 can further be based on the maintenance schedule 1820. The augmented checklist 877 includes section headers 858, 860, 862, 864, 866, original checklist items 868, supplemental checklist items 879, and result indicators 881. In some implementation, one or more checklist items, such as an original checklist item and/or a supplemental checklist item is associated with each section header. An augmented checklist can include a section header not included within a baseline checklist upon which the augmented checklist is based. The computing server 125 can determine a new section header based on the repair data included within the vehicle model information 425 or otherwise. The supplemental checklist items 879 are associated with the repairs of the repair subset 428 shown in FIG. 22.

In some implementations, generating an augmented checklist includes adding a note regarding an original checklist item or a supplemental checklist item. FIG. 24 shows the augmented checklist includes a footnote indicator 883 and a footnote 884 for an original checklist item indicating to inspect an air cleaner element.

Next, FIG. 25 shows a display output 885 including an augmented checklist 887. The display output 885 includes the vehicle identifier 854 and the odometer value 856. The augmented checklist 877 can be based on the baseline checklist 852. Similar to FIG. 23, the odometer value 856 shows an odometer value within the mileage range 85,000 to 100,000 miles shown on the display output. Accordingly, the augmented checklist 887 can further be based on the maintenance schedule 1820. The augmented checklist 887 includes section headers 858, 860, 862, 864, 866, original checklist items 868, supplemental checklist items 889, and result indicators 891. In some implementation, one or more checklist items, such as an original checklist item and/or a supplemental checklist item is associated with each section header. The supplemental checklist items 889 are associated with the repairs of the repair subset 429 shown in FIG. 22.

VI. Example Scheduler Display Outputs

Figure 9:
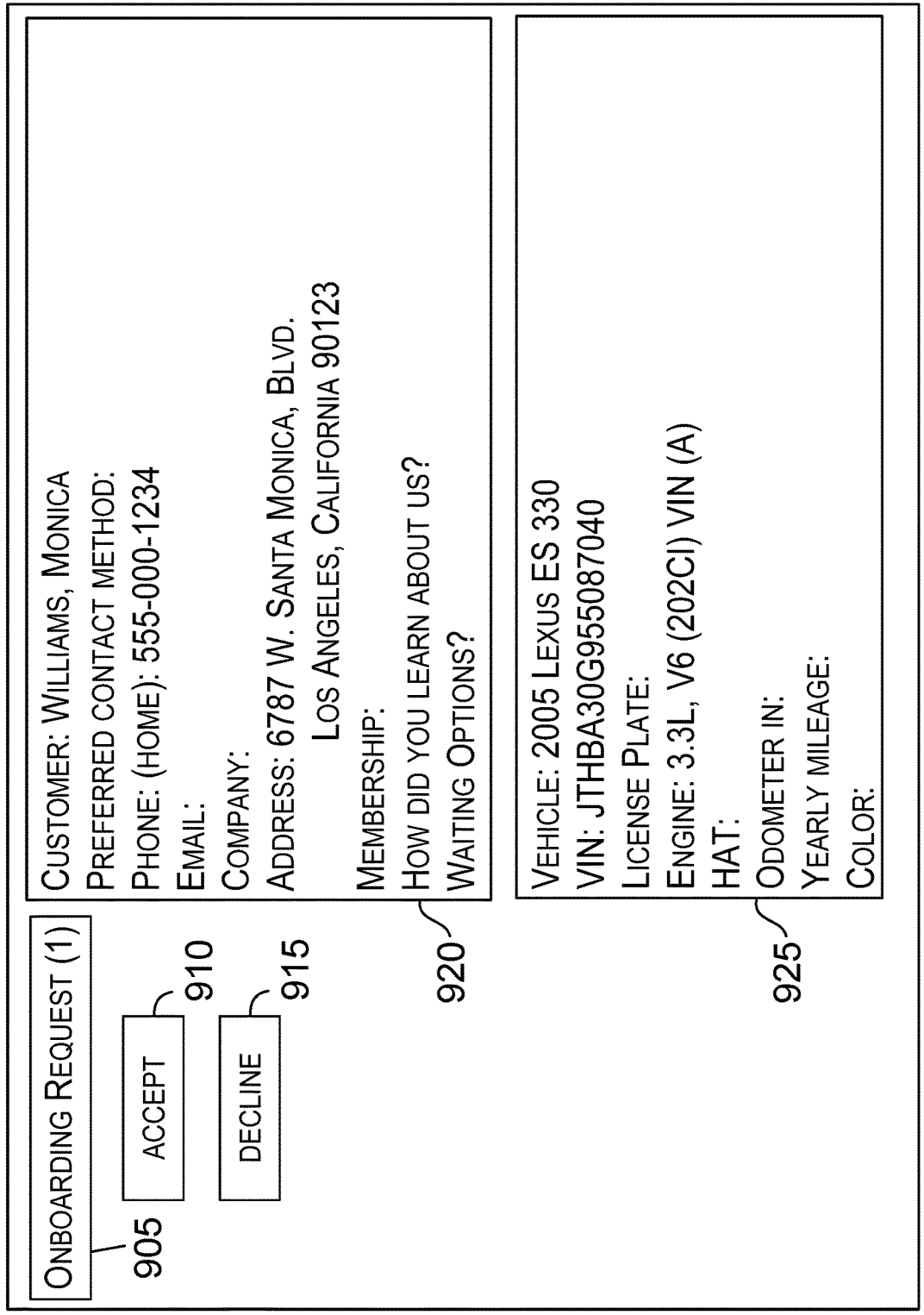

Next, FIG. 9 shows a display output 900 in accordance with the example implementations. The client computing device 130 can display the display output 900 on the display 515 in response to receiving the CNT 620. In particular, the processor 500 can parse the registration request of the CNT 620 to populate the display output 900 with a request identifier 905, vehicle owner information 920, and vehicle model information 925. The request identifier 905 can include text such as "Onboarding Request" or some other text. The request identifier 905 can include a numeric identifier indicative of how many registration requests are pending for accepting or declining. The display output 900 can include an accept selector 910 selectable by use of the keypad 520 to provide an indication to the processor 500 that the registration request has been accepted. The display output 900 can include a decline selector 915 selectable by use of the keypad 520 to provide an indication to the processor 500 that the registration request has been declined.

In response to determining the registration request of the CNT 620 is accepted, the processor 500 can cause the vehicle owner information 920 to be stored in the memory 510 as at least part of the vehicle owner information 545, and the vehicle model information 925 to be stored in the memory 510 as at least part of the vehicles model information 535.

Figure 10:
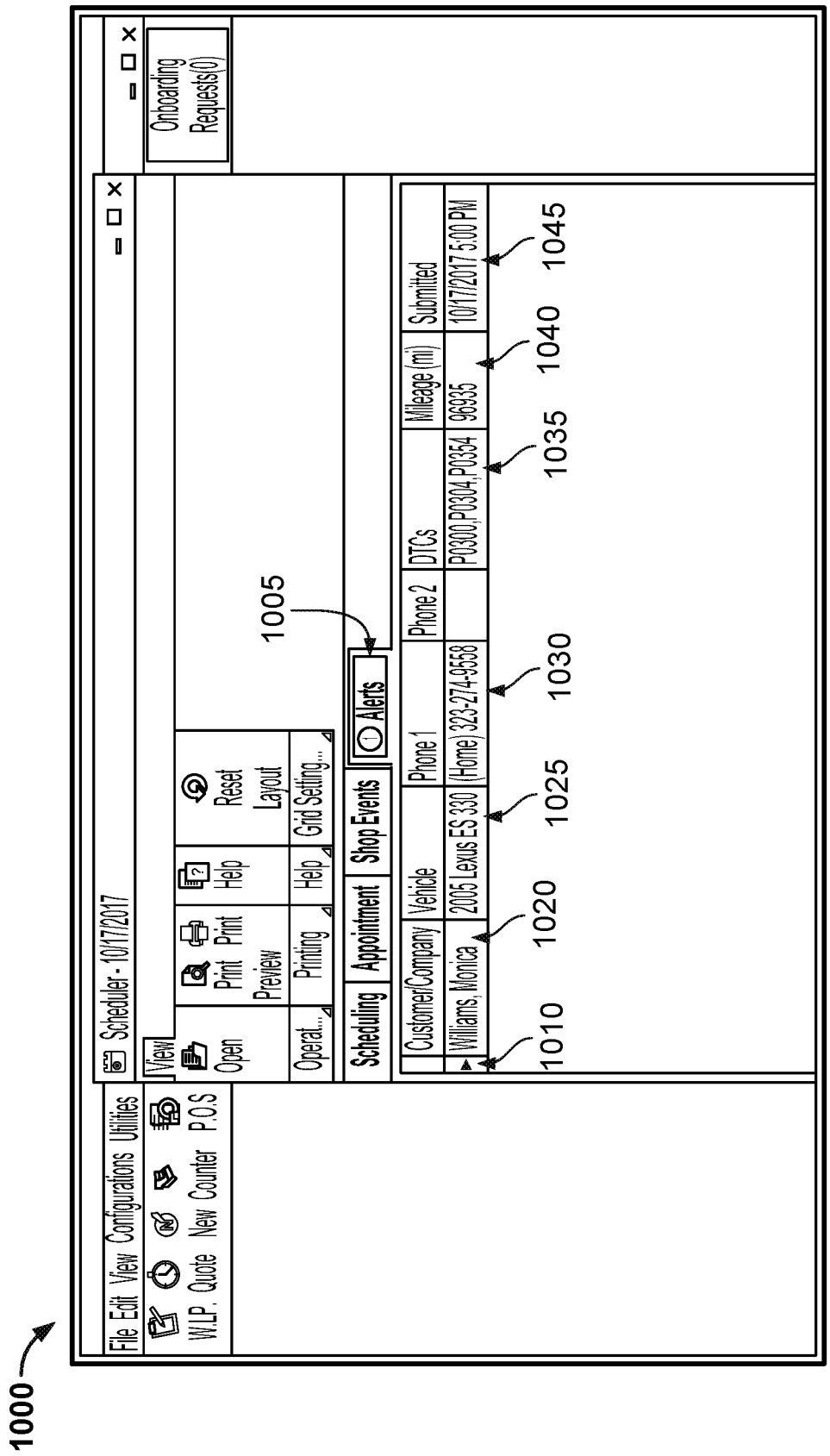

Next, FIG. 10 shows a display output 1000 in accordance with the example implementations. The client computing device 130 can display the display output 1000 on the display 515 in response to receiving the vehicle data of the CNT 715. The display output 1000 includes an alert indicator 1005 and an alert 1010 including vehicle owner information (e.g., a vehicle owner name 1020 and a vehicle owner telephone number 1030), vehicle model information 1025, vehicle condition information (e.g., a DTC identifier 1035 and an odometer reading indicator 1040 indicating how many miles or kilometers the vehicle owner's vehicle has been driven), and a vehicle alert submission date and time 1045.

Figure 11:
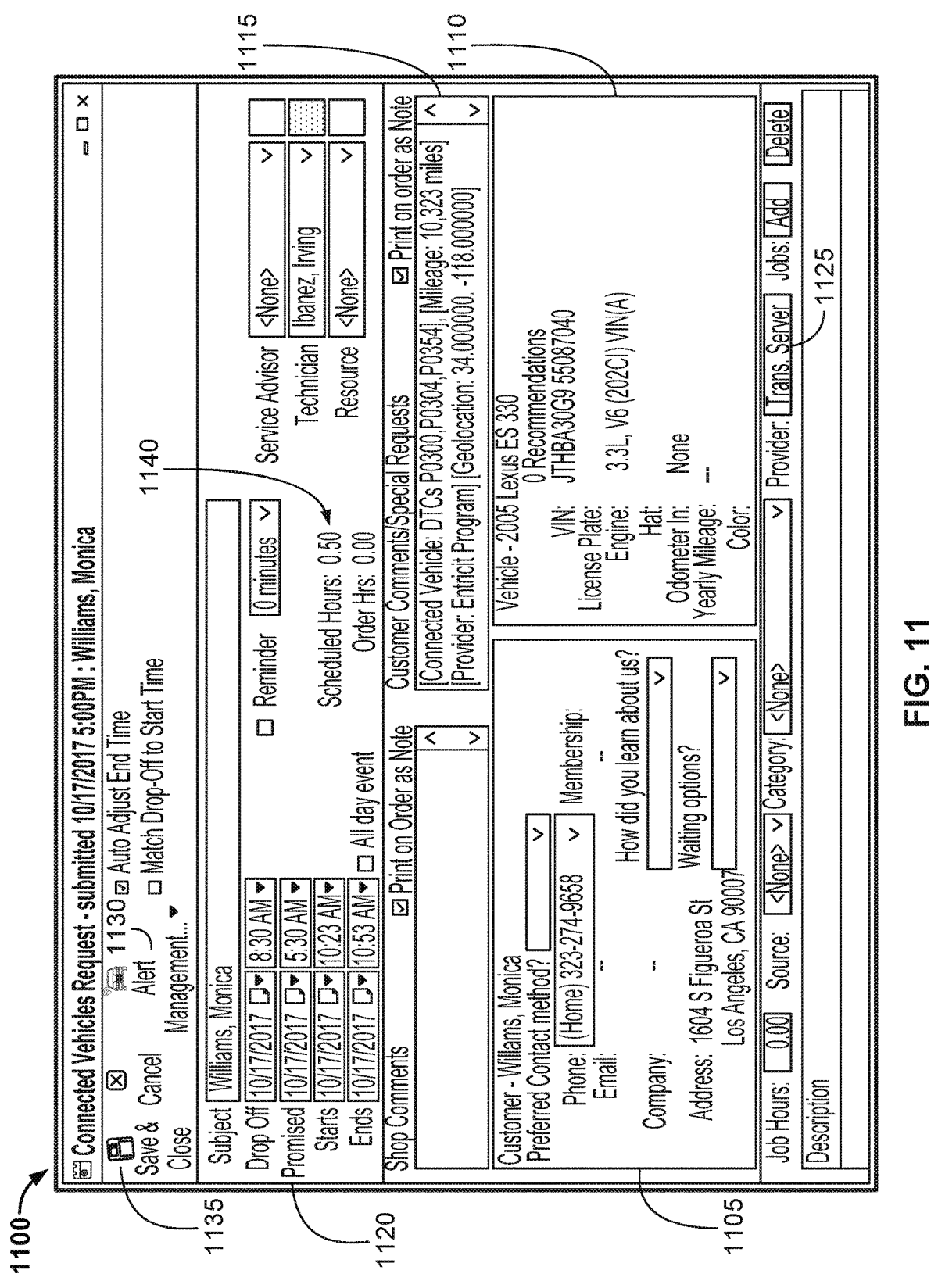

Next, FIG. 11 shows a display output 1100 in accordance with the example implementations. The client computing device 130 can display the display output 1100 on the display 515 in response to receiving the alert 1010 or one of the items of the alert 1010. In particular, the processor 500 can parse the vehicle data of the CNT 715 to populate the display output 1100 with vehicle owner information 1105, vehicle model information 1110, and vehicle condition information 1115. The display output 1100 can include a schedule selection segment 1120 at which the keypad 520 can be used to select schedule information for modifying the schedule maintained for the repair shop 135. The display output 1100 can include a provider segment 1125 for indicating a provider of information displayed in the display output 1100. The information populated into the provider segment 1125 can be determined from the vehicle data of the CNT 715. The display output 1100 can include an alert management selector 1130 to access options for modifying a schedule based on the vehicle data of the CNT 715. The display output 1100 can include a save and close selector 1135 for saving the vehicle data of the CNT 715 and closing the display output 1100. Closing the display output 1100 can cause the display 515 to display a different display output of the schedule application.

The schedule selection segment 1120 can include a drop off date and time indicating when the vehicle is expected to be dropped off at the repair shop 135, a promised date and time indicating when the vehicle will be ready for the customer after being repaired, a start date and time indicating when the repairs to the vehicle are expected to begin, and an ends date and time indicating when the repairs to the vehicle are expected to be complete. The drop off, promised, start, and ends dates and times can be default times and dates until one of the drop off, promised, start, and ends dates and times is modified. The schedule selection segment 1120 includes a scheduled hours-time 1140 indicative of an projected amount of time it will take to repair the vehicle.

Figure 12:
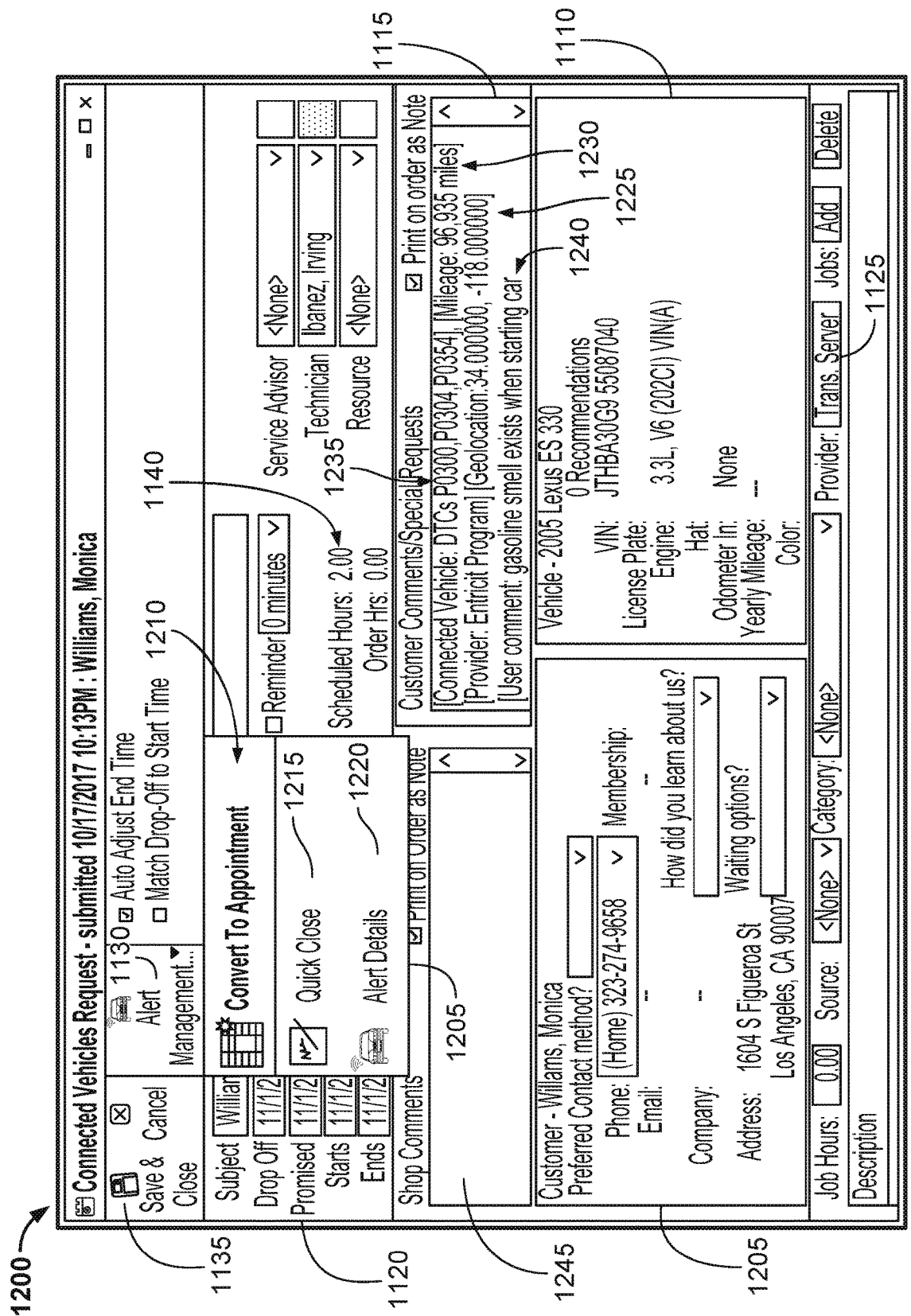

Next, FIG. 12 shows a display output 1200 in accordance with the example implementations. The client computing device 130 can display the display output 1200 on the display 515 in response to selection of the alert management selector 1130 (shown in FIG. 11). The display output 1200 includes an expanded alert management selector 1205 including selectors such as a convert to appointment selector 1210, a quick close selector 1215, or an alert details selector 1220 selectable to provide further details regarding the vehicle data of the CNT 715 or to access a diagnostics display output pertaining to the vehicle condition indicated by the vehicle data of the CNT 715.

Selection of the quick close selector 1215 can cause the display output 1200 to highlight the shop comments field 1245 to prompt a user to enter a comment regarding the vehicle condition. In some implementations, the processor 500 may require the comment to be entered before the display output 1200 is closed if the quick close selector 1215 is selected. Selection of the quick close selector 1215 may be desirable when the vehicle condition does not require immediate service. The comment entered into the shop comments field 1245 can memorialize any decisions made regarding the vehicle condition for consideration the next time the vehicle is brought to the repair shop 135.

The drop off, promised, start, and ends dates and times were modified prior to selection of the alert management selector 1130. FIG. 12 shows the ends time and date as 10:00 AM, Nov. 1, 2017 (i.e., Nov. 1, 2017). Although not shown in FIG. 12, drop off, promised and start dates were changed to Nov. 1, 2017, the start time was changed to 8:00 AM, the drop off time was changed to a time no later than 8:00 AM, and the promised time was changed to a time no earlier than 10:00 AM. In FIG. 12, the projected amount of time it will take to repair the vehicle in the scheduled hours-time 1140 is indicative an amount of time (i.e., 2.00 hours) based on adjustments made in the schedule selection segment 1120.

The display output 1200 can include an identifier selectable to cause the display 515 to display a different display output. As an example, the display output 1200 can include a symptom identifier 1235 selectable to cause the display output to display a display output such as the display output 1400 or the display output 1500, both of which include information regarding the symptom shown in the symptom identifier 1235 or diagnostics selectors selectable to cause the display 515 to display information regarding the symptom shown in the symptom identifier 1235. As an example, the symptom identifier 1235 includes a DTC identifier. Multiple symptom identifiers can be selected from the vehicle condition information 1115 to obtain relevant to each of the multiple symptoms identified by those identifiers.

As another example, the display output 1200 can include an odometer reading identifier 1230. Selection of the odometer reading identifier 1230 can cause the display 515 to display content regarding the vehicle identified in the vehicle model information 1110 and the identified odometer reading, such as the maintenance schedule 1820 shown in FIG. 18. As another example, the display output 1200 can include a geolocation identifier 1225 identifying a location of the vehicle reported via the CNT 715. Selection of the geolocation identifier 1225 can cause the display 515 to display the display output 1900 shown in FIG. 19.

The display output 1200 can include a vehicle owner comment 1240 sent via the CNT 715. As an example, the vehicle owner comment 1240 can include a non-DTC symptom identifier. The vehicle owner can input the vehicle owner comment 1240 via the network communication device 225, 255 prior to transmission of the CNT 705.

Figure 13:
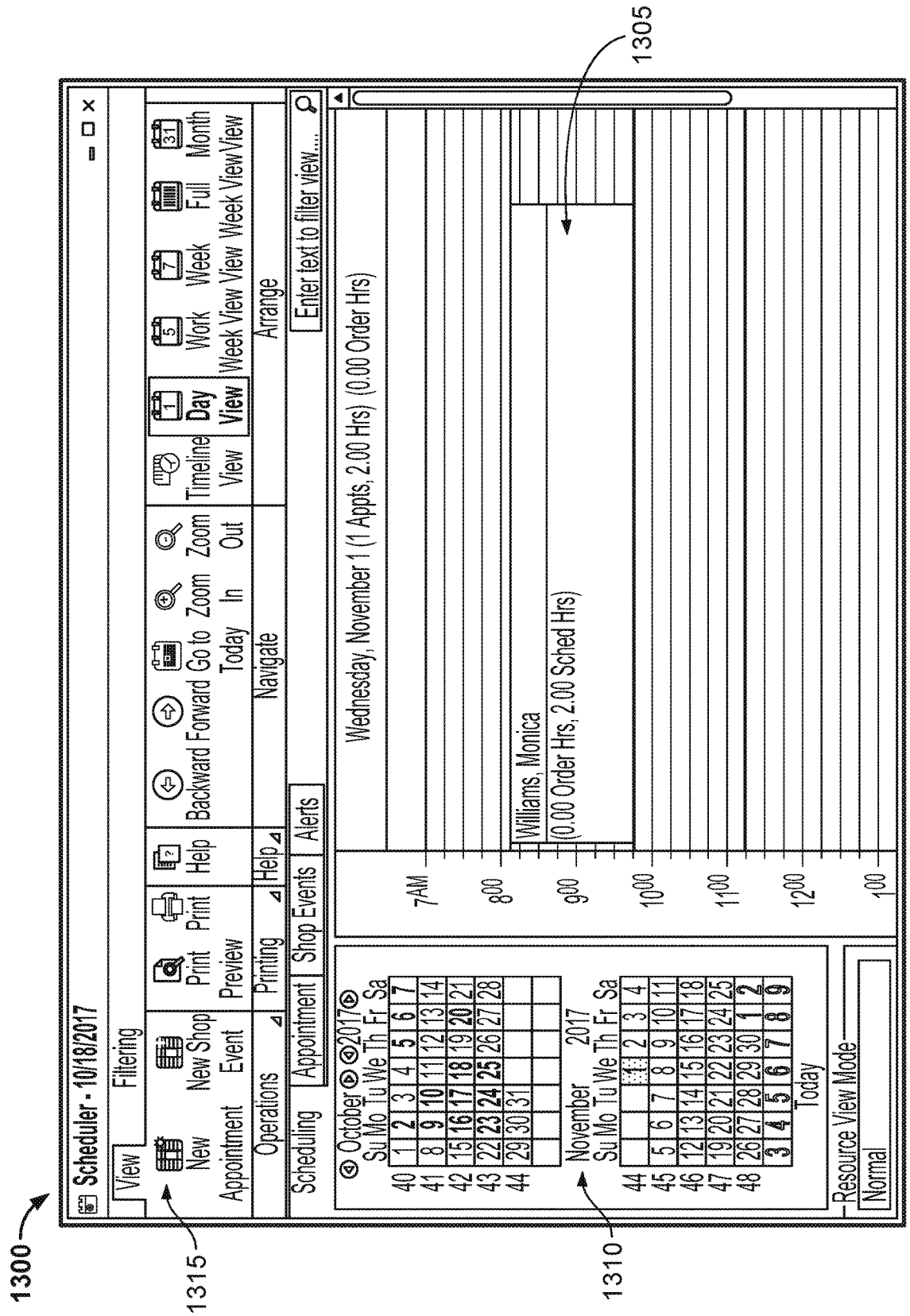

Next, FIG. 13 shows a display output 1300 in accordance with the example implementations. The client computing device 130 can display the display output 1300 on the display 515 in response to selection of the convert to appointment selector 1210 (shown in FIG. 12). The display output 1300 includes a schedule entry 1305 based on the start date and time and the ends date and time selected via the schedule selection segment 1120 shown in FIG. 12. The display output 1300 includes a calendar 1310 and a scheduling menu 1315.

Figure 14:
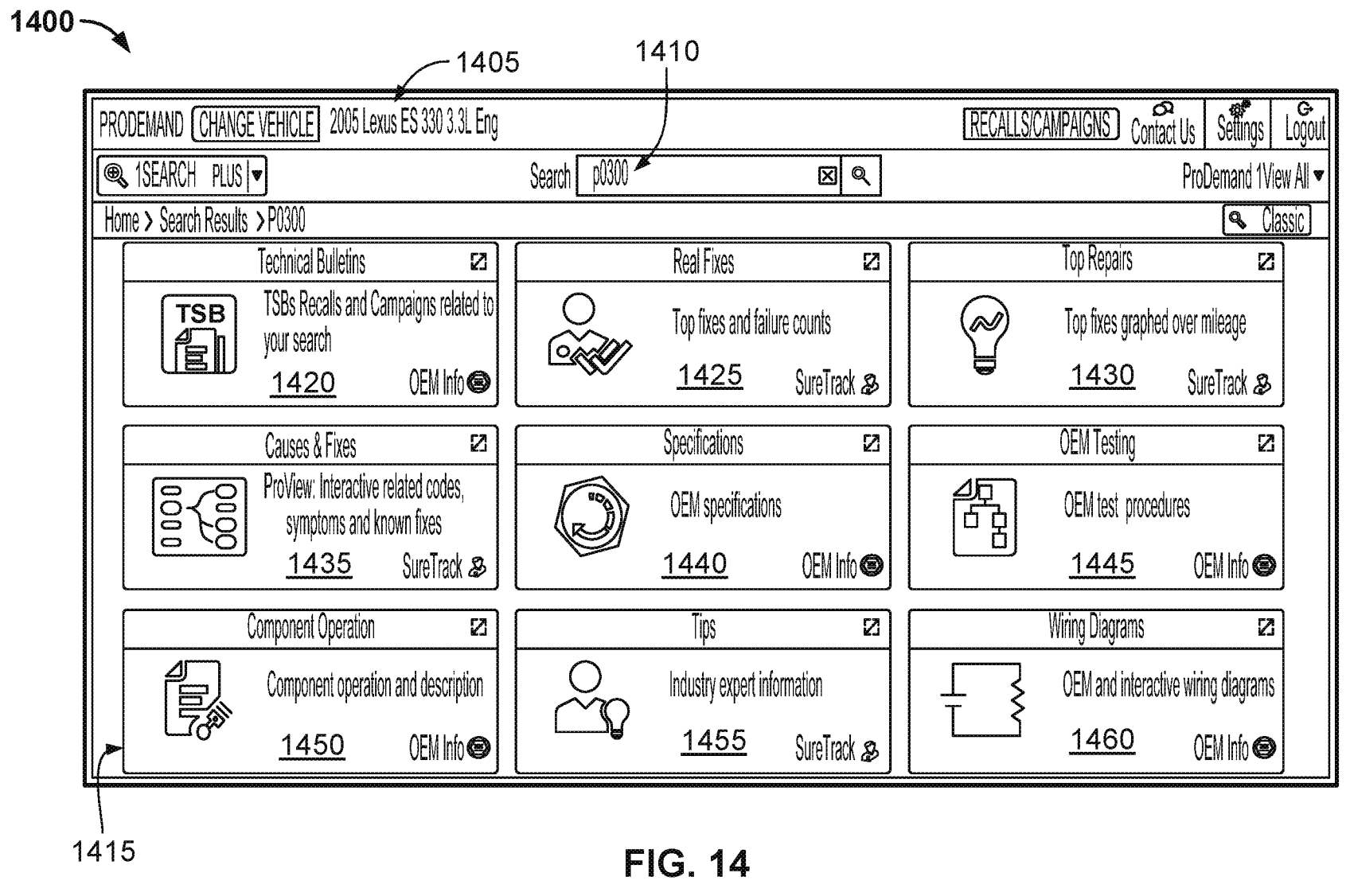

Next, FIG. 14 shows a display output 1400 in accordance with the example implementations. The client computing device 130 can display the display output 1400 on the display 515 in response to selection from the scheduling menu 1315, selection of the alert details selector 1220, selection of a DTC from the vehicle condition information, or some other selection. The display output 1400 includes a vehicle model identifier 1405, a search identifier selection segment 1410, and search content 1415. The search content 1415 can include search content selectors such as a technical bulletins content selector 1420, a real fixes content selector 1425, a top repairs content selector 1430, a causes-and-fixes content selector 1435, a specifications content selector 1440, an original equipment manufacturer testing content selector 1445, a component operation content selector 1450, a tips content selector 1455, and a wiring diagrams content selector 1460. Each of the search content selectors is selectable to cause the client computing device 130 to display content related to the search criteria entered into the search identifier selection segment 1410.

Figure 15:
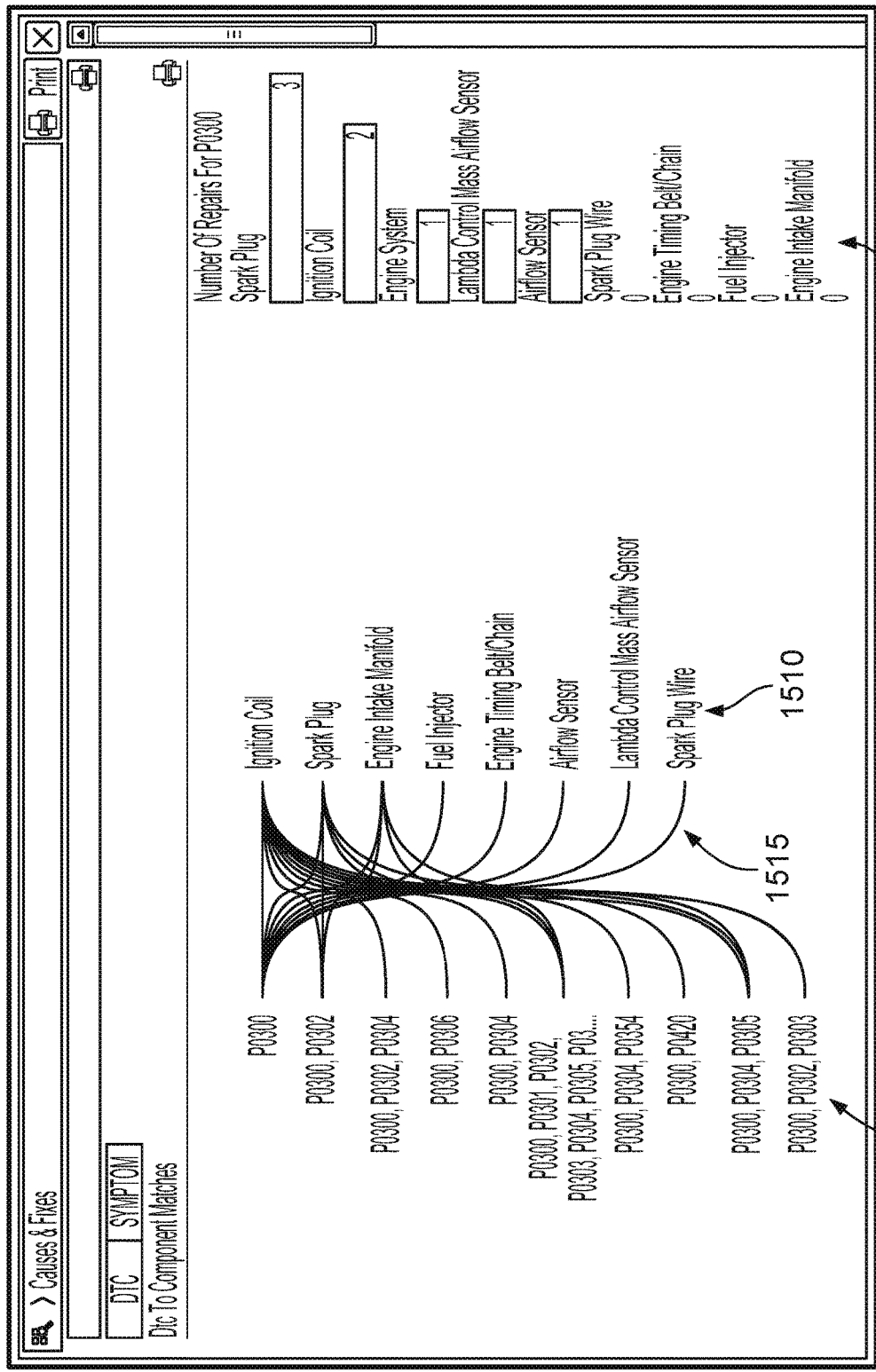

Next, FIG. 15 shows a display output 1500 in accordance with the example implementations. FIG. 15 shows that the client computing device 130 can display diagnostic data transmitted to the client computing device 130 from the computing server 125. The client computing device 130 can display the display output 1500 on the display 515 in response to a selection from another display output displayed by the display, such as a selection of the symptom identifier 1235 shown in FIG. 12 or the causes-and-fixes content selector 1435 shown in FIG. 14. The display output 1500 includes DTC identifiers 1505, related component identifiers 1510, links 1515 that link each DTC identifier or group of DTC identifiers with a related component identifier. The display output 1500 includes a chart 1520 showing a number of known occurrences of performing various repairs for a given DTC, such as the DTC identifier P0300.

Figure 19:
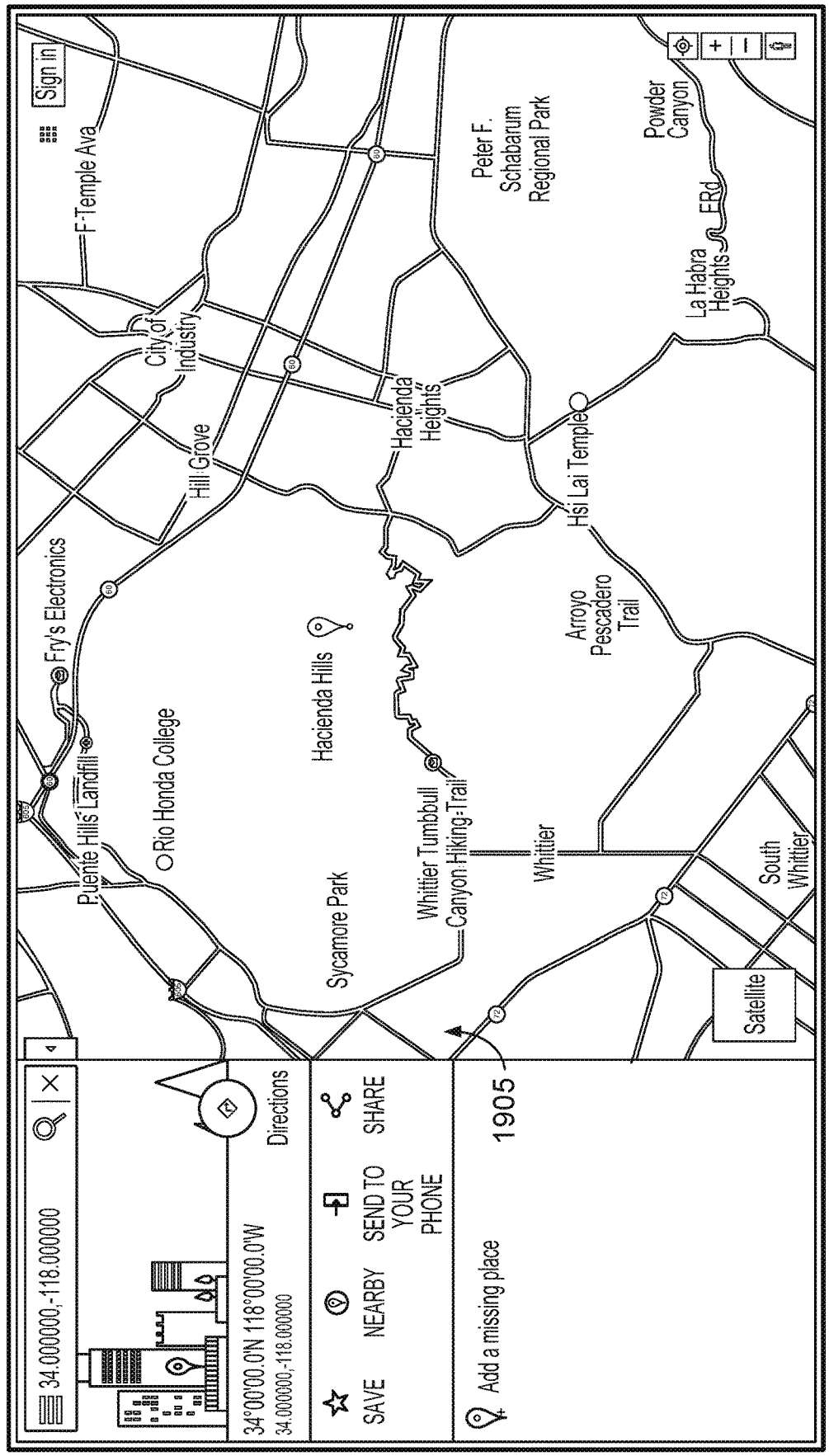

Next, FIG. 19 shows a display output 1900 in accordance with the example implementations. The client computing device 130 can display the display output 1900 on the display 515 in response to selection of the geolocation identifier 1225. The display output 1900 includes a map 1905 showing a geolocation identified by the geolocation identifier 1225.

VII. Example Computing Devices

Figure 16:
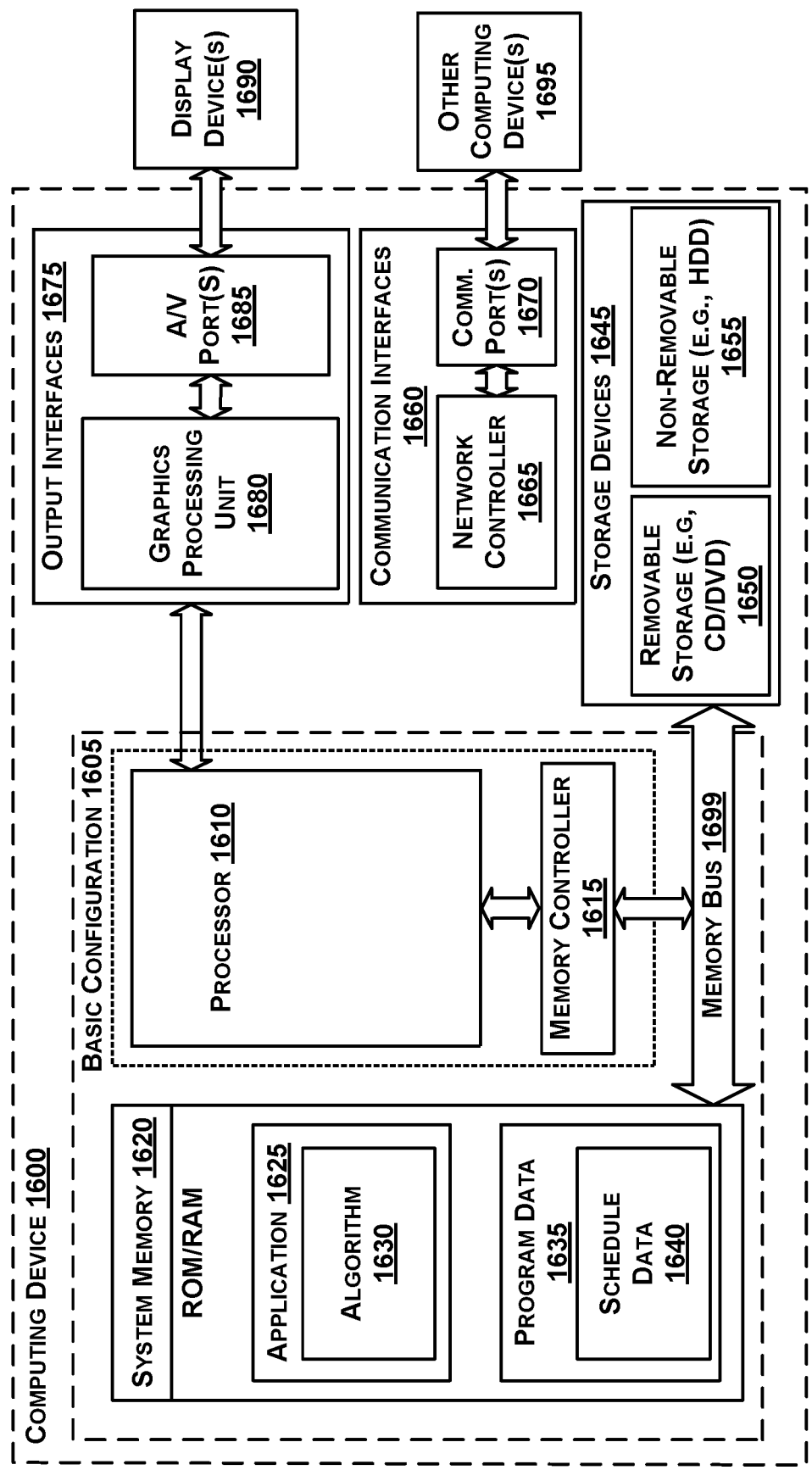
FIG. 16 is a functional block diagram illustrating a computing system that is arranged in accordance with at least some example implementations.

FIG. 16 is a functional block diagram illustrating a computing device 1600 used in a computing system in accordance with the example implementations described herein. The computing device 1600 can be implemented to output a display output as shown in FIG. 9 to FIG. 15, FIG. 18, FIG. 19, and/or FIG. 23 to FIG. 25. In a basic configuration 1605, the computing device 1600 can include a processor 1610 and system memory 1620. A memory bus 1699 can be used for communicating between the processor 1610 and the system memory 1620. Depending on the desired configuration, the processor 1610 can be any type of processor including but not limited to a microprocessor (µP), a microcontroller (µC), a digital signal processor (DSP), or any combination thereof. A memory controller 1615 can also be used with the processor 1610, or in some implementations, the memory controller 1615 can be an internal part of the processor 1610.

Depending on the desired configuration, the system memory 1620 can be any type of computer-readable memory including but not limited to volatile memory (such as RAM), non-volatile memory (such as ROM, flash memory, etc.) or any combination thereof. The system memory 1620 can include an application 1625, and program data 1635. The application 1625 can include an algorithm 1630 that is arranged to receive data described with respect to FIG. 1 to FIG. 15, FIG. 18, FIG. 19, and/or FIG. 23 to FIG. 25 and provide a schedule in accordance with the present disclosure. Program data 1635 can include schedule data 1640 used to generate the schedule. In some example implementations, the application 1625 can be arranged to operate with the program data 1635 on an operating system.

The computing device 1600 can have additional features or functionality, and additional interfaces to facilitate communications between the basic configuration 1605 and any devices and interfaces. For example, the storage devices 1645 cam include removable storage devices 1650, non-removable storage devices 1655, or a combination thereof. Examples of removable storage and non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Computer storage media can include volatile and non-volatile, non-transitory, removable and non-removable media implemented in any method or technology for storage of information, such as computer-readable instructions, data structures, program modules, or other data.

The system memory 1620 and the storage devices 1645 are examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 1600. Any such computer storage media can be part of the computing device 1600.

The computing device 1600 can also include output interfaces 1675 that can include a graphics processing unit 1680, which can be configured to communicate to various external devices such as display devices 1690 or speakers via one or more A/V ports 1685 or a communication interface 1660. The communication interface 1660 can include a network controller 1665, which can be arranged to facilitate communications with one or more other computing devices over the computer network 110 via one or more communication ports 1670. The communication connection is one example of a communication media. Communication media can be embodied by computer-readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

The computing device 1600 can be implemented as a portion of a small-form factor portable (or mobile) electronic device such as a cell phone, a smartphone, a personal data assistant (PDA), a tablet device, a personal media player device, a wireless web-watch device, a personal headset device, an application specific device, or a hybrid device that include any of the above functions. The computing device 1600 can also be implemented as a personal computer, including both laptop computer and non-laptop computer configurations, or a server.

Figure 17:
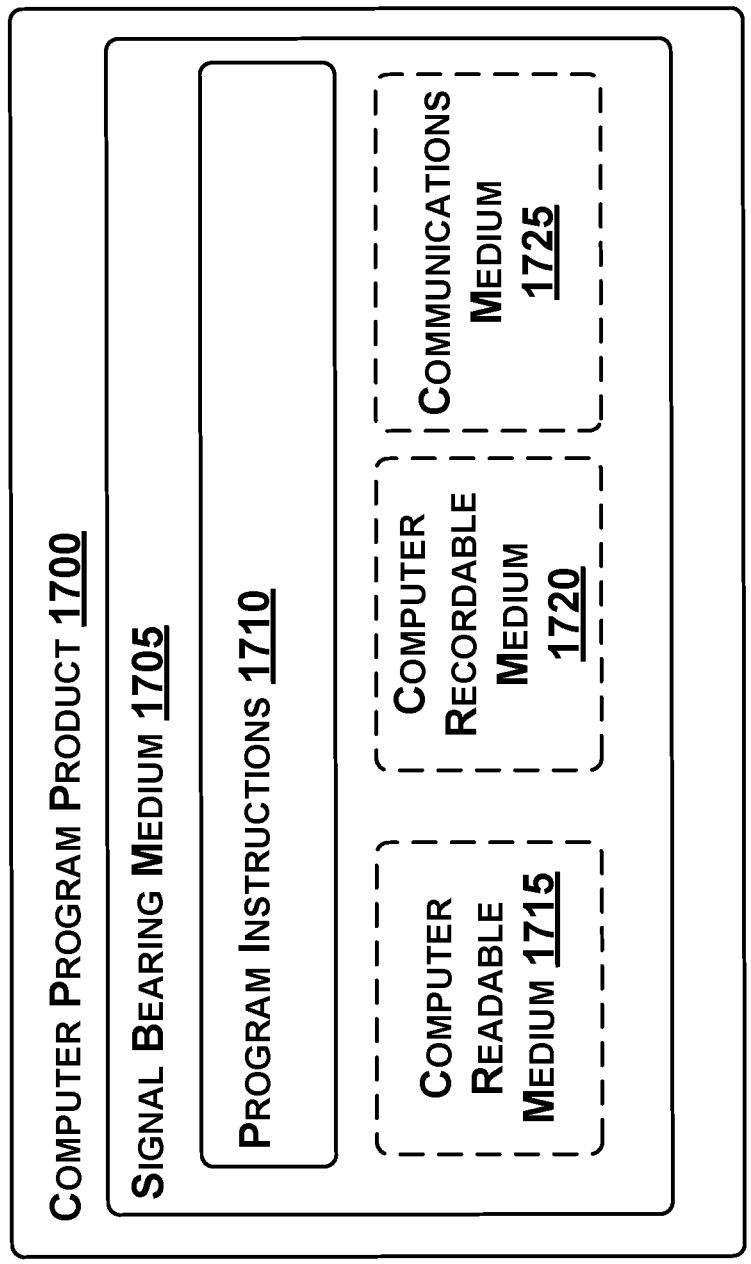
FIG. 17 is a schematic illustrating a conceptual partial view of a computer program product for executing a computer process on a computing system, according to the example implementations.

In some implementations, the disclosed methods can be implemented as computer program instructions encoded on a non-transitory computer-readable storage media in a machine-readable format, or on other non-transitory media or articles of manufacture. FIG. 17 is a schematic illustrating a conceptual partial view of a computer program product 1700 that includes a computer program for executing a computer process on a computing device, arranged according to at least some implementations presented herein.

In one implementation, the computer program product 1700 is provided using a signal bearing medium 1705. The signal bearing medium 1705 can include one or more programming instructions 1710 that, when executed by one or more processors can provide functionality or portions of the functionality described above with respect to FIG. 1 to FIG. 16 and/or FIG. 18 to FIG. 25. In some examples, the signal bearing medium 1705 can encompass a computer readable medium 1715, such as, but not limited to, a hard disk drive, a Compact Disc (CD), a Digital Video Disk (DVD), a digital tape, memory, etc. In some implementations, the signal bearing medium 1705 can encompass a computer recordable medium 1720, such as, but not limited to, memory, read/write (R/W) CDs, R/W DVDs, etc. In some implementations, the signal bearing medium 1705 can encompass a communications medium 1725, such as, but not limited to, a digital or an analog communication medium (e.g., a fiber optic cable, a waveguide, a wired communications link, a wireless communication link, etc.). Thus, for example, the signal bearing medium 1705 can be conveyed by a wireless form of the communications medium 1725 (e.g., a wireless communications medium conforming to the IEEE 802.11 standard or some other transmission protocol).

The one or more programming instructions 1710 can be, for example, computer executable or logic implemented instructions. In some examples, a computing device such as the computing device 1600 of FIG. 16 can be configured to provide various operations, functions, or actions in response to the programming instructions 1710 conveyed to the computing device 1600 by one or more of the computer readable medium 1715, the computer recordable medium 1720, or the communications medium 1725.

VIII. Definitions

It should be understood that the implementations described herein or shown in the drawings are for purposes of example only. As such, those skilled in the art will appreciate that other implementations and/or elements (e.g., machines, interfaces, functions, orders, or groupings of functions) can be used instead, and some elements can be omitted altogether according to the desired results. The diagrams and other data shown in the figures are provided merely as examples and are not intended to be limiting. Many of the elements illustrated in the figures or described herein are functional elements that may be implemented as discrete or distributed components or in conjunction with other components, and in any suitable combination and location. Furthermore, various functions described or shown in the drawings as being performed by one or more elements can be carried out by a processor executing computer-readable program instructions or by a combination of hardware, firmware, and/or software. For purposes of this description, execution of CRPI contained in some computer readable medium to perform some function can include executing all of the program instructions of those CRPI or only a portion of those CRPI.

The term "data" within this description can be used interchangeably with the term "information" or similar terms, such as "content." The data described herein can be transmitted and received. As an example, any transmission of the data described herein can occur directly from a transmitting device (e.g., a transmitter) to a receiving device (e.g., a receiver). As another example, any transmission of the data described herein can occur indirectly from the transmitter to a receiver via one of one or more intermediary network devices, such as an access point, an antenna, a base station, a hub, a modem, a relay, a router, a switch, or some other network device. The transmission of any of the data described herein can include transmitting the data over an air interface (e.g., using radio signals (i.e., wirelessly)). The transmission of any of the data described herein can include transmitting the data over a wire (e.g., a single wire, a twisted pair of wires, a fiber optic cable, a coaxial cable, a wiring harness, a power line, a printed circuit, a CAT5 cable, or CAT6 cable). The wire can be referred to as a "conductor" or by another term. As an example, transmission of the data over the conductor can occur electrically or optically.

The data can represent various things such as objects and conditions. The objects and conditions can be mapped to a data structure (e.g., a table). A processor can refer to the data structure to determine what object or condition is represented by the data. As an example, the data received by a processor can represent a calendar date. The processor can determine the calendar date by comparing the data to a data structure that defines calendar dates. As another example, data received by a processor can represent a vehicle identifier. The processor can determine what type of vehicle is represented by the data by comparing the data to a structure that defines a variety of vehicle makes and models. As another example, data received by a processor can represent an odometer reading. The processor can determine an appropriate baseline checklist and/or supplemental checklist items to add to a baseline checklist based on the odometer reading.

A data element is some portion of data. The data received via a computer network transmission can include multiple data elements. A processor can parse the received data to determine the data element or data elements within the received data. The received data can include field names and/or field lengths defining a data element and size of the data element. The processor can be programmed with instructions based on a definition of a CNT that indicates, for example a field name and field length of data within the CNT.

In this description, the articles "a," "an," and "the" are used to introduce elements or functions of the example implementations. The intent of using those articles is that there is one or more of the introduced elements or functions. The word "next" is used to transition from paragraphs or aspects described in the description and is not intended to indicate an order of occurrence of any functions of method.

In this description, the intent of using the term "and/or" within a list of at least two elements or functions and the intent of using the terms "at least one of," "at least one of the following," "one or more of," or "one or more of the following" immediately preceding a list of at least two components or functions is to cover each implementation including a listed component or function independently and each implementation including a combination of the listed components or functions. For example, an implementation described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible implementations: (i) an implementation including A, but not B and not C, (ii) an implementation including B, but not A and not C, (iii) an implementation including C, but not A and not B, (iv) an implementation including A and B, but not C, (v) an implementation including A and C, but not B, (v) an implementation including B and C, but not A, and/or (vi) an implementation including A, B, and C. For the implementations including component or function A, the implementations can include one A or multiple A. For the implementations including component or function B, the implementations can include one B or multiple B. For the implementations including component or function C, the implementations can include one C or multiple C. The use of ordinal numbers such as "first," "second," "third" and so on is to distinguish respective elements rather than to denote a particular order of those elements unless the context of using those terms explicitly indicates otherwise. The use of the symbol "$" as prefix to a number indicates the number is a hexadecimal number.

While various aspects and implementations are described herein, other aspects and implementations will be apparent to those skilled in the art. The various aspects and implementations disclosed herein are for purposes of illustration and are not intended to be limiting, with the true scope being indicated by the claims, along with the full scope of equivalents to which such claims are entitled. It is also to be understood that the terminology used herein for the purpose of describing particular implementations only, and is not intended to be limiting.

Implementations of the present disclosure may thus relate to one of the enumerated example embodiments (EEEs) listed below. EEE 1 to EEE 54 are contained within U.S. patent application Ser. No. 15/798,371.

EEE 55 is a method comprising: determining, by a computing system, a vehicle identifier indicative of a group of like vehicles, the group of like vehicles including a first vehicle; determining, by the computing system, a first odometer reading for the first vehicle; determining, by the computing system, a first baseline checklist including multiple original checklist items, wherein determining the first baseline checklist includes determining the first baseline checklist is associated with a range of odometer readings including the first odometer reading for the first vehicle; determining, by the computing system, one or more supplemental checklist items; generating, by the computing system, an augmented checklist based on the first baseline checklist and the one or more supplemental checklist items; and outputting, by the computing system, the augmented checklist.

EEE 56 is the method of EEE 55, wherein determining the one or more supplemental checklist items includes determining, for each supplemental checklist item, a respective service procedure among a group of highest frequency service procedures performed to vehicles among the group of like vehicles, wherein each respective service procedure is different than the multiple original checklist items on the first baseline checklist.

EEE 57 is the method of EEE 56, wherein determining the respective service procedure includes determining the respective service procedure is associated with a range of odometer readings including the first odometer reading for the first vehicle.

EEE 58 is the method of EEE 56, wherein the service procedures of the highest frequency service procedures are based on action words and components names located on repair orders pertaining to vehicles of the group of like vehicles.

EEE 59 is the method of EEE 55, further comprising: determining, by the computing system, a temporal length of service associated with the first vehicle, wherein determining the one or more supplemental checklist items includes determining, for each supplemental checklist item, a respective service procedure among a group of service procedures associated with a temporal interval and the group of like vehicles, wherein each respective service procedure is different than the multiple original checklist items.

EEE 60 is the method of any one of EEE 55 to 59, wherein the first baseline checklist is contained within a first markup language file, wherein each original checklist item within the first markup language file is associated with a tag indicating the original checklist item is a checklist item, and wherein generating the augmented checklist includes modifying the first markup language file to include a first supplemental checklist item of the one or more supplemental checklist items and a tag indicating the first supplemental checklist item is a checklist item.

EEE 61 is the method of EEE 60, wherein the first markup language file includes a tag identifying a first category of checklist items within the first baseline checklist, wherein the first markup language file is arranged such that one or more of the original checklist items within the first baseline checklist are associated with the first category of checklist items within the first baseline checklist, wherein the method further includes: determining, by the computing system, the first supplemental checklist item is associated with the first category of checklist items within the first baseline checklist, and wherein modifying the first markup language file further includes inserting the first supplemental checklist item within the first markup language file so that the first markup language file is arranged so that the first supplemental checklist item is associated with the first category of checklist items within the first baseline checklist.

EEE 62 is the method of any one of EEE 55 to 61, wherein the multiple original checklist items on the first baseline checklist are contained on a maintenance schedule for the group of like vehicles, the maintenance schedule developed by a vehicle manufacturer that manufactured the group of like vehicles.

EEE 63 is the method of any one of EEE 55 to 62, wherein the first baseline checklist is one of multiple baseline checklists configured for inspecting any vehicle among the group of like vehicles, and wherein each baseline checklist of the multiple baseline checklists is tailored for a different range of odometer readings.

EEE 64 is the method of any one of EEE 55 to 63, wherein a first supplemental checklist item of the one or more supplemental checklist items is associated with a threshold odometer value, and wherein determining the one or more supplemental checklist items includes determining that a vehicle history associated with the first vehicle does not indicate a service associated with the first supplemental checklist item was performed to the first vehicle while a second odometer reading for the first vehicle was between the first odometer reading for the first vehicle and a reference odometer reading equal to the first odometer reading for the first vehicle minus the threshold odometer value.

EEE 65 is the method of any one of EEE 55 to 59, wherein the first baseline checklist is contained within a first markup language file, wherein each original checklist item within the first markup language file is associated with a tag indicating the original checklist item is a checklist item, the method further comprising: determining, by the computing system, the multiple original checklist items includes a first original checklist item associated with supplemental information not contained within the first baseline checklist, wherein generating the augmented checklist includes modifying the first markup language file to include the supplemental information.

EEE 66 is the method of EEE 65, wherein modifying the first markup language file to include the supplemental information includes associating the first original checklist item with a footnote tag and adding the supplemental information as a footnote associated with the footnote tag.

EEE 67 is the method of any one of EEE 55 to 59, wherein the first baseline checklist includes a user-selected checklist.

EEE 68 is a computing system comprising: a computer-readable memory having stored thereon a first baseline checklist including multiple original checklist items; one or more processors; and program instructions stored on the computer-readable memory and executable by the one or more processors to perform the method of any one of EEE 55 to 67.

EEE 69 is a non-transitory computer-readable memory having stored thereon instructions executable by one or more processors to cause a computing system to perform functions to perform the method of any one of EEE 55 to 67.

We claim:
1. A method comprising:
receiving, at a processor of a computing system, a computer-network transmission, wherein the processor is programmed with field names and field lengths for data within the computer-network transmission;
parsing, at the processor based on the field names and field lengths, the computer-network transmission to determine a vehicle identifier embodied within the computer-network transmission, wherein the vehicle identifier is indicative of a group of like vehicles that includes a first vehicle;
determining, by the computing system, a temporal length of service indicating how long the first vehicle has been used;
determining, by the computing system, a computer-readable file corresponding to the group of like vehicles, wherein the computer-readable file includes a baseline checklist including multiple original checklist items from a maintenance schedule developed by a vehicle manufacturer that manufactured the group of like vehicles, and wherein each original checklist item includes text and a tag indicating the text is a checklist item;
determining, by the computing system from within repair data contained on vehicle repair orders including a service procedure that corresponds to a temporal interval containing the temporal length of service indicating how long the first vehicle has been used, a particular supplemental checklist item that corresponds to the group of like vehicles and to the temporal interval and that is not duplicative of any checklist item within the multiple original checklist items,
wherein the temporal interval extends from
a fixed number of months minus a threshold number of months
to
the fixed number of months plus the threshold number of months;
generating, by the computing system, an augmented checklist, wherein generating the augmented checklist includes adding the particular supplemental checklist item into the baseline checklist, wherein the particular supplemental checklist item includes text and a tag indicating the text is a checklist item;
outputting, by the computing system, the augmented checklist on a display at a client device, wherein outputting the augmented checklist on the display includes displaying the text of the multiple original checklist items and the text of the particular supplemental checklist item;
transmitting, by a vehicle communication transceiver at the client device electrically or optically over a vehicle communication link to an electronic control unit within the first vehicle:
a first vehicle data message to cause performance of a functional test to operate a solenoid, vehicle battery, sensor, fuel injector, or fuel pump connected to the electronic control unit in the first vehicle via an electrical or optical circuit, wherein the solenoid, vehicle battery, sensor, fuel injector, or fuel pump corresponds to a parameter identifier, and wherein a parameter data value associated with the parameter identifier represents a voltage, and
a second vehicle data message including the parameter identifier to request the parameter data value associated with the parameter identifier, wherein:
the client device connects to the vehicle communication link via an onboard diagnostic connector in the first vehicle, and
the electronic control unit is configured to control a powertrain, an engine, or a malfunction indicator lamp in the first vehicle;
receiving, by the vehicle communication transceiver electrically or optically over the vehicle communication link in response to transmitting the second vehicle data message, a third vehicle data message including the parameter identifier and the parameter data value representing the voltage;
parsing, at the processor based on programmed field names and field lengths corresponding to a vehicle data message, the third vehicle data message to determine the parameter data value associated with the parameter identifier, the voltage represented by the parameter data value being indicative of a condition of the solenoid, vehicle battery, sensor, fuel injector, or fuel pump during performance of the functional test to operate the solenoid, vehicle battery, sensor, fuel injector, or fuel pump;
determining, by the computing system based on the parameter data value being indicative of the condition of the solenoid, vehicle battery, sensor, fuel injector, or fuel pump, a checklist item result on the augmented checklist for the particular supplemental checklist item; and
outputting, by the computing system on the display, the augmented checklist showing the checklist item result on the augmented checklist for the particular supplemental checklist item.

2. The method of claim 1, further comprising:
parsing, at the processor based on the field names and field lengths, the computer-network transmission to determine a first odometer reading embodied within the computer-network transmission, wherein: the first odometer reading is for the first vehicle, and the computer-readable file further corresponds to a range of odometer readings including the first odometer reading;
determining, by the computing system from within repair data contained on vehicle repair orders including a service procedure and an odometer value, an additional supplemental checklist item that corresponds to the group of like vehicles and the range of odometer readings and that is not duplicative of any checklist item within the multiple original checklist items;
determining the additional supplemental checklist item that corresponds to the group of like vehicles and to the range of odometer readings and that is not duplicative of any checklist item within the multiple original checklist items includes determining one or more supplemental checklist items that correspond to the group of like vehicles and to the range of odometer readings and that are not duplicative of any checklist item within the multiple original checklist items,
determining one or more supplemental checklist items includes determining, for each supplemental checklist item of the one or more supplemental checklist items, a respective service procedure among a group of highest frequency service procedures performed on vehicles among the group of like vehicles, and each respective service procedure is different than the multiple original checklist items on the baseline checklist.

3. The method of claim 2, wherein determining the respective service procedure includes determining the respective service procedure is associated with a range of odometer readings including the first odometer reading for the first vehicle.

4. The method of claim 2, wherein service procedures of the group of highest frequency service procedures are based on action words and component names located on repair orders pertaining to vehicles of the group of like vehicles.

5. The method of claim 1, wherein the computer-readable file includes a computer-readable markup language file.

6. The method of claim 5, wherein:
the computer-readable markup language file includes a tag identifying a first category of checklist items within the baseline checklist,
the computer-readable markup language file is arranged such that one or more of the multiple original checklist items within the baseline checklist are associated with the first category of checklist items within the baseline checklist,
the method further includes determining, by the computing system, the particular supplemental checklist item is associated with the first category of checklist items within the baseline checklist, and
modifying the computer-readable markup language file further includes inserting the particular supplemental checklist item within the computer-readable markup language file so that the computer-readable markup language file is arranged so that the particular supplemental checklist item is associated with the first category of checklist items within the baseline checklist.

7. The method of claim 1, wherein:
the multiple original checklist items on the baseline checklist are contained on a maintenance schedule for the group of like vehicles, and
the maintenance schedule was developed by a vehicle manufacturer that manufactured the group of like vehicles.

8. The method of claim 2, wherein:
the baseline checklist is one of multiple baseline checklists configured for inspecting any vehicle among the group of like vehicles, and
each baseline checklist of the multiple baseline checklists is tailored for a different range of odometer readings.

9. The method of claim 2, wherein:
the additional supplemental checklist item is associated with a threshold odometer value, and
determining the additional supplemental checklist item includes determining that a vehicle history associated with the first vehicle does not indicate a service associated with the additional supplemental checklist item was performed to the first vehicle while a second odometer reading for the first vehicle was between the first odometer reading for the first vehicle and a reference odometer reading equal to the first odometer reading for the first vehicle minus the threshold odometer value.

10. The method of claim 1, wherein:
the computer-readable file includes a computer-readable markup language file,
each original checklist item of the multiple original checklist items is associated with a tag indicating the original checklist item is a checklist item,
the method further comprises determining, by the computing system, the multiple original checklist items include a first original checklist item associated with supplemental information not contained within the baseline checklist, and
generating the augmented checklist includes modifying the computer-readable markup language file to include the supplemental information.

11. The method of claim 10, wherein modifying the computer-readable markup language file to include the supplemental information includes associating the first original checklist item with a footnote tag and adding the supplemental information as a footnote associated with the footnote tag.

12. The method of claim 1, wherein the baseline checklist includes a user-selected checklist.

13. A computing system comprising:
a non-transitory computer-readable memory having stored thereon a first baseline checklist including multiple original checklist items;
a vehicle communication transceiver at a client device;
one or more processors; and
program instructions stored on the non-transitory computer-readable memory and executable by the one or more processors to cause the computing system to:
receive a computer-network transmission, wherein the one or more processors are programmed with field names and field lengths for data within the computer-network transmission;
parse, at the one or more processors based on the field names and field lengths, the computer-network transmission to determine a vehicle identifier embodied within the computer-network transmission, wherein the vehicle identifier is indicative of a group of like vehicles that includes a first vehicle;
determine, at the one or more processors, a temporal length of service indicating how long the first vehicle has been used;
determine a computer-readable file corresponding to the group of like vehicles, wherein the computer-readable file includes a baseline checklist including multiple original checklist items from a maintenance schedule developed by a vehicle manufacturer that manufactured the group of like vehicles, and wherein each original checklist item includes text and a tag indicating the text is a checklist item;
determine, from within repair data contained on vehicle repair orders including a service procedure that corresponds to a temporal interval containing the temporal length of service indicating how long the first vehicle has been used, a particular supplemental checklist item that corresponds to the group of like vehicles and the temporal interval and that is not duplicative of any checklist item within the multiple original checklist items,
wherein the temporal interval extends from
a fixed number of months minus a threshold number of months
to
the fixed number of months plus the threshold number of months;
generate an augmented checklist, wherein generating the augmented checklist includes adding the particular supplemental checklist item into the baseline checklist, wherein the particular supplemental checklist item includes text and a tag indicating the text is a checklist item; and output the augmented checklist on a display at the client device, wherein outputting the augmented checklist on the display includes displaying the text of the multiple original checklist items and the text of the particular supplemental checklist item;

transmit, by the vehicle communication transceiver at the client device electrically or optically over a vehicle communication link to an electronic control unit within the first vehicle:
- a first vehicle data message to cause performance of a functional test to operate a solenoid, vehicle battery, sensor, fuel injector, or fuel pump connected to the electronic control unit in the first vehicle via an electrical or optical circuit, wherein the solenoid, vehicle battery, sensor, fuel injector, or fuel pump corresponds to a parameter identifier, and wherein a parameter data value associated with the parameter identifier represents a voltage, and
- a second vehicle data message including the parameter identifier to request the parameter data value associated with a parameter identifier, wherein:
  - the client device connects to a vehicle communication link via an onboard diagnostic connector in the first vehicle, and
  - the electronic control unit is configured to control a powertrain, an engine, or a malfunction indicator lamp in the first vehicle;

receive, by the vehicle communication transceiver electrically or optically over the vehicle communication link in response to a transmission of the second vehicle data message, a third vehicle data message including the parameter identifier and the parameter data value representing the voltage;

parse, based on programmed field names and field lengths corresponding to a vehicle data message, the third vehicle data message to determine the parameter data value associated with the parameter identifier, the voltage represented by the parameter data value being indicative of a condition of the solenoid, vehicle battery, sensor, fuel injector, or fuel pump during performance of the functional test to operate the solenoid, vehicle battery, sensor, fuel injector, or fuel pump;

determine, based on the parameter data value being indicative of the condition of the solenoid, vehicle battery, sensor, fuel injector, or fuel pump, a checklist item result on the augmented checklist for the particular supplemental checklist item; and output, on the display, the augmented checklist showing the checklist item result on the augmented checklist for the particular supplemental checklist item.

14. The computing system of claim 13, further comprising:
the display.

15. The computing system of claim 13, further comprising:
a network transceiver to transmit the augmented checklist to the display.

16. The computing system of claim 13, wherein:
the program instructions are executable by the one or more processors to further cause the computing system to:
parse, based on the field names and field lengths, the computer-network transmission to determine a first odometer reading embodied within the computer-network transmission, the first odometer reading is for the first vehicle, and the computer-readable file further corresponds to a range of odometer readings including the first odometer reading; and determine, from within repair data contained on vehicle repair orders including a service procedure and an odometer value, an additional supplemental checklist item that corresponds to the group of like vehicles and the range of odometer readings and that is not duplicative of any checklist item within the multiple original checklist items;

determining the additional supplemental checklist item that corresponds to the group of like vehicles and to the range of odometer readings and that is not duplicative of any checklist item within the multiple original checklist items includes determining one or more supplemental checklist items that correspond to the group of like vehicles and to the range of odometer readings and that are not duplicative of any checklist item within the multiple original checklist items, determining one or more supplemental checklist items includes determining, for each supplemental checklist item of the one or more supplemental checklist items, a respective service procedure among a group of highest frequency service procedures performed on vehicles among the group of like vehicles, and each respective service procedure is different than the multiple original checklist items on the baseline checklist.

17. The computing system of claim 13, wherein the computer-readable file includes a computer-readable markup language file.

18. Non-transitory computer-readable media having stored thereon instructions executable by one or more processors to cause a computing system to perform functions comprising:

receiving, at the one or more processors, a computer-network transmission, wherein the one or more processors are programmed with field names and field lengths for data within the computer-network transmission;

parsing, at the one or more processors based on the field names and field lengths, the computer-network transmission to determine a vehicle identifier embodied within the computer-network transmission, wherein the vehicle identifier is indicative of a group of like vehicles that includes a first vehicle;

determining, at the one or more processors, a temporal length of service indicating how long the first vehicle has been used;

determining a computer-readable file corresponding to the group of like vehicles, wherein the computer-readable file includes a baseline checklist including multiple original checklist items from a maintenance schedule developed by a vehicle manufacturer that manufactured the group of like vehicles, and wherein each original checklist item includes text and a tag indicating the text is a checklist item;

determining, from within repair data contained on vehicle repair orders including a service procedure that corresponds to a temporal interval containing the temporal length of service indicating how long the first vehicle has been used, a particular supplemental checklist item that corresponds to the group of like vehicles and the temporal interval and that is not duplicative of any checklist item within the multiple original checklist items, wherein the temporal interval extends from
a fixed number of months minus a threshold number of months to the fixed number of months plus the threshold number of months;

generating an augmented checklist, wherein generating the augmented checklist includes adding the particular supplemental checklist item into the baseline checklist, wherein the particular supplemental checklist item includes text and a tag indicating the text is a checklist item;

outputting the augmented checklist on a display at a client device, wherein outputting the augmented checklist on the display includes displaying the text of the multiple original checklist items and the text of the particular supplemental checklist item;

transmitting, by a vehicle communication transceiver at the client device electrically or optically over a vehicle communication link to an electronic control unit within the first vehicle:
- a first vehicle data message to cause performance of a functional test operate a solenoid, vehicle battery, sensor, fuel injector, or fuel pump connected to the electronic control unit in the first vehicle via an electrical or optical circuit, wherein the solenoid, vehicle battery, sensor, fuel injector, or fuel pump corresponds to a parameter identifier, and wherein a parameter data value associated with the parameter identifier represents a voltage, and
- a second vehicle data message including the parameter identifier to request the parameter data value associated with a parameter identifier, wherein:
  - the client device connects to the vehicle communication link via an onboard diagnostic connector in the first vehicle, and
  - the electronic control unit is configured to control a powertrain, an engine, or a malfunction indicator lamp in the first vehicle;

receiving, by the vehicle communication transceiver electrically or optically over the vehicle communication link in response to transmitting the second vehicle data message, a third vehicle data message including the parameter identifier and the parameter data value representing the voltage;

parsing, at the one or more processors based on programmed field names and field lengths corresponding to a vehicle data message, the third vehicle data message to determine the parameter data value associated with the parameter identifier, the voltage represented by the parameter data value being indicative of a condition of the solenoid, vehicle battery, sensor, fuel injector, or fuel pump during performance of the functional test to operate the solenoid, vehicle battery, sensor, fuel injector, or fuel pump;

determining, by the computing system based on the parameter data value being indicative of the condition of the solenoid, vehicle battery, sensor, fuel injector, or fuel pump, a checklist item result on the augmented checklist for the particular supplemental checklist item; and outputting, by the computing system on the display, the augmented checklist showing the checklist item result on the augmented checklist for the particular supplemental checklist item.

19. The method of claim 1, wherein:

the computer-readable file includes, for each original checklist item of the multiple original checklist items, a result indicator including text of the result indicator and a tag of the result indicator, and outputting the augmented checklist on the display includes displaying the text of the result indicator for each original checklist item of the multiple original checklist items without displaying the tag of the result indicator for each original checklist item of the multiple original checklist items.

20. The method of claim 19, wherein the tag of the result indicator indicates a checklist item corresponding to the result indicator is a pass or fail result or a completed result.

21. The method of claim 1, wherein:

the baseline checklist includes a first section starting with a tag indicative of a first checklist category and a second section starting with a tag indicative of a second checklist category, the multiple original checklist items include a first set of checklist items corresponding to the first checklist category, and the first set of checklist items is located between the tag indicative of a first checklist category and the tag indicative of the second checklist category.

22. The method of claim 1, wherein the computer-readable file is arranged in a JavaScript Object Notation (JSON) format.

23. The method of claim 1, wherein the temporal length of service indicates a number of months since the first vehicle was built or since the first vehicle was put into service.

24. The method of claim 1, wherein outputting the augmented checklist on the display includes displaying the text of the multiple original checklist items and the text of the particular supplemental checklist item without displaying any tag indicating the multiple original checklist items or the particular supplemental checklist item is a checklist item.

* * * * *